United States Patent [19]
Papanicolaou

[11] Patent Number: 6,119,539
[45] Date of Patent: Sep. 19, 2000

[54] INFINITELY AND CONTINUOUSLY VARIABLE TRANSMISSION SYSTEM

[75] Inventor: John Paul Papanicolaou, Piraeus, Greece

[73] Assignee: Galaxy Shipping Enterprises, Inc., Monrovia, Liberia

[21] Appl. No.: 09/131,644

[22] Filed: Aug. 10, 1998

Related U.S. Application Data

[63] Continuation-in-part of application No. 09/112,605, Jul. 9, 1998, abandoned, which is a continuation-in-part of application No. 09/019,930, Feb. 6, 1998, abandoned.

[51] Int. Cl.[7] .................................................. F16H 29/08
[52] U.S. Cl. ............................................. 74/112; 74/123
[58] Field of Search .................................. 74/63, 112, 123

[56] References Cited

U.S. PATENT DOCUMENTS

| | | | |
|---|---|---|---|
| 1,193,728 | 8/1916 | Staude | 74/123 |
| 1,417,398 | 5/1922 | Lhermitte . | |
| 2,073,284 | 3/1937 | Muehlenbruch . | |
| 2,492,071 | 12/1949 | Svensson | 74/112 X |
| 3,449,972 | 6/1969 | Wicenec . | |
| 3,881,367 | 5/1975 | Call . | |
| 3,968,699 | 7/1976 | van Beukering . | |
| 4,279,177 | 7/1981 | Yamashita . | |
| 4,411,293 | 10/1983 | Santucci . | |
| 4,418,586 | 12/1983 | Maki et al. . | |
| 4,487,085 | 12/1984 | Collins . | |
| 4,538,474 | 9/1985 | Dzjuba et al. . | |
| 4,665,762 | 5/1987 | Russell . | |
| 4,922,788 | 5/1990 | Greenwood . | |
| 5,007,147 | 4/1991 | Imai et al. . | |
| 5,090,951 | 2/1992 | Greenwood . | |
| 5,242,337 | 9/1993 | Greenwood . | |
| 5,273,497 | 12/1993 | Wallace . | |
| 5,308,297 | 5/1994 | Greenwood . | |
| 5,338,268 | 8/1994 | Greenwood . | |
| 5,395,292 | 3/1995 | Fellows et al. . | |
| 5,395,664 | 3/1995 | Gogins . | |
| 5,440,945 | 8/1995 | Penn . | |
| 5,643,121 | 7/1997 | Greenwood . | |
| 5,860,320 | 1/1999 | Crabb | 74/112 |

FOREIGN PATENT DOCUMENTS

| | | |
|---|---|---|
| 27 52 937 A1 | 8/1978 | Germany . |
| 195 09 577 A1 | 9/1995 | Germany . |
| 195 10 772 A1 | 10/1996 | Germany . |
| WO 95/06829 | 3/1995 | WIPO . |
| WO 95/33146 | 12/1995 | WIPO . |

*Primary Examiner*—Allan D. Herrmann
*Attorney, Agent, or Firm*—Skadden, Arps, Slate, Meagher & Flom LLP

[57] ABSTRACT

An infinitely and continuously variable transmission system capable of gradually multiplying TORQUE while decreasing RPM and vice-versa. For a given input shaft TORQUE and RPM, the system delivers to the output shaft such increases or reductions in TORQUE with inversely corresponding increases or reductions in RPM as may be desired across a predetermined and very wide range of transmission ratios. The range can include zero RPM for the output shaft while the input shaft continues to rotate at any RPM, thus eliminating the need for an input shaft disengaging clutch. The invention includes a main assembly consisting of one or more pairs of co-axial diametrically opposed one-way clutches and corresponding pairs of diametrically opposed carrying shafts which are interconnected through a central hub assembly. The axes of the carrying shafts share the same plane with each other and with the central hub's multi-directional center around which they are radially and symmetrically mounted. The freewheels are engaged in one rotational direction and disengaged in the opposite rotational direction of their carrying shafts and are in turn continuously and interactionally meshed to a common rotatable output gear. The infinitely and continuously variable TORQUE and RPM ratios are produced by causing the freewheel carrying shafts to rotatably oscillate at gradually variable oscillation arcs thereby causing their respective freewheels to smoothly rotate the common output gear at correspondingly variable rotation speeds through a simultaneous combination of the oscillation arc magnitude of their carrying shaft rotatable oscillations and their corresponding engagement/disengagement action.

59 Claims, 35 Drawing Sheets

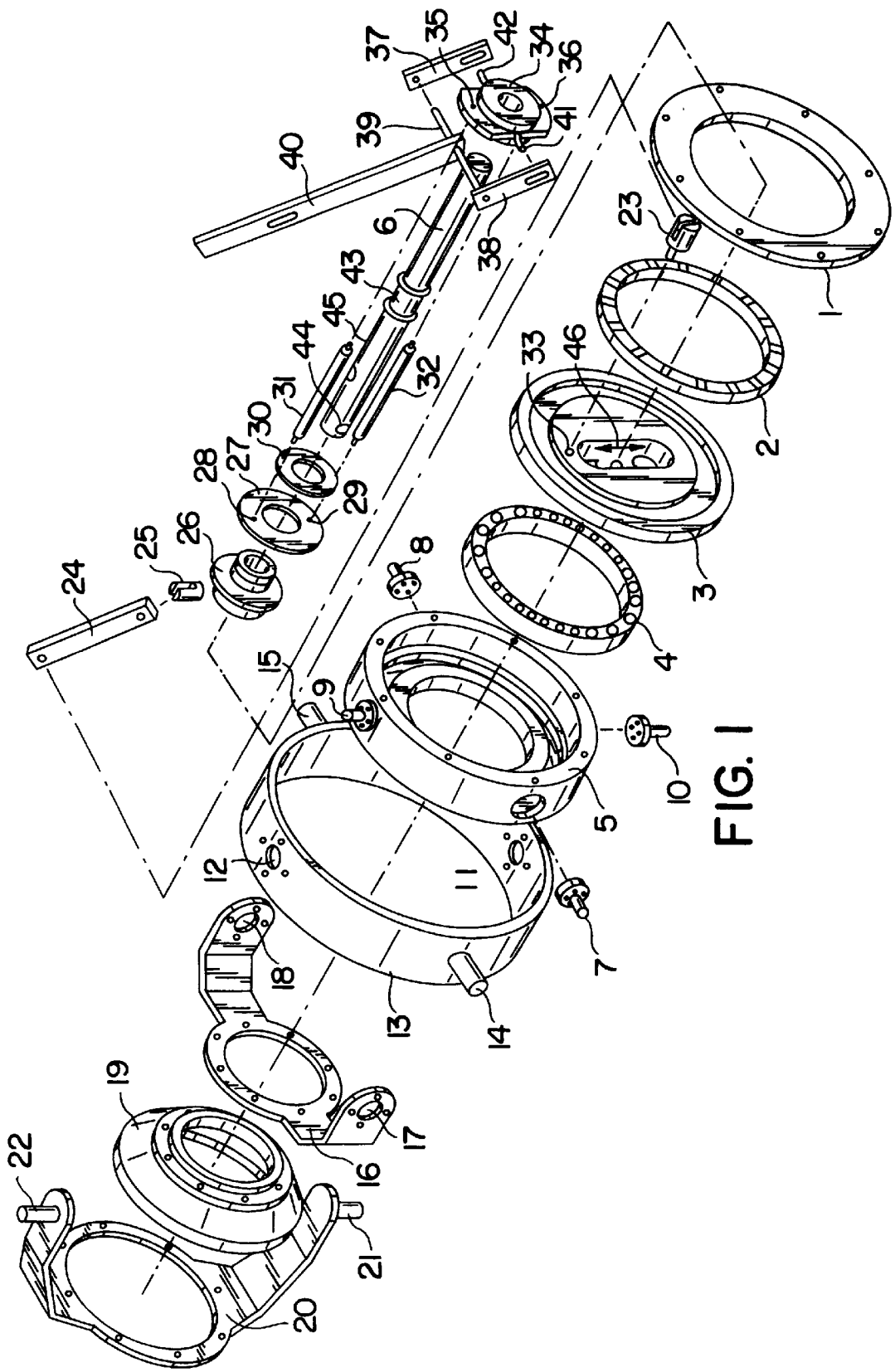

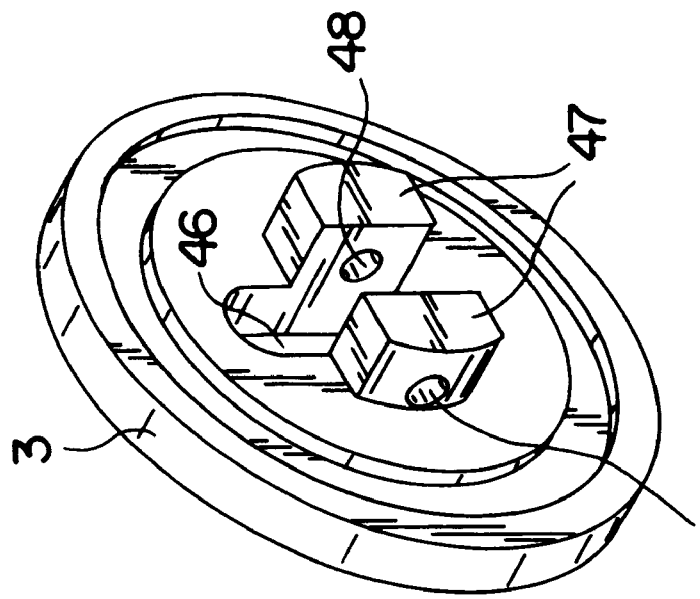
FIG. IC
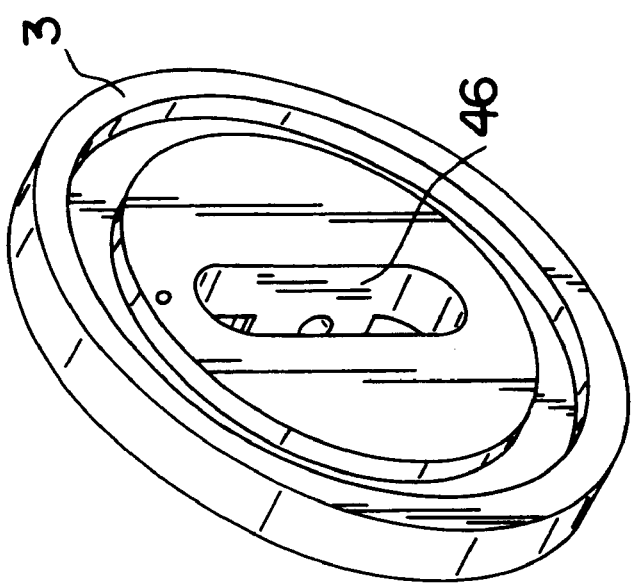
FIG. IB

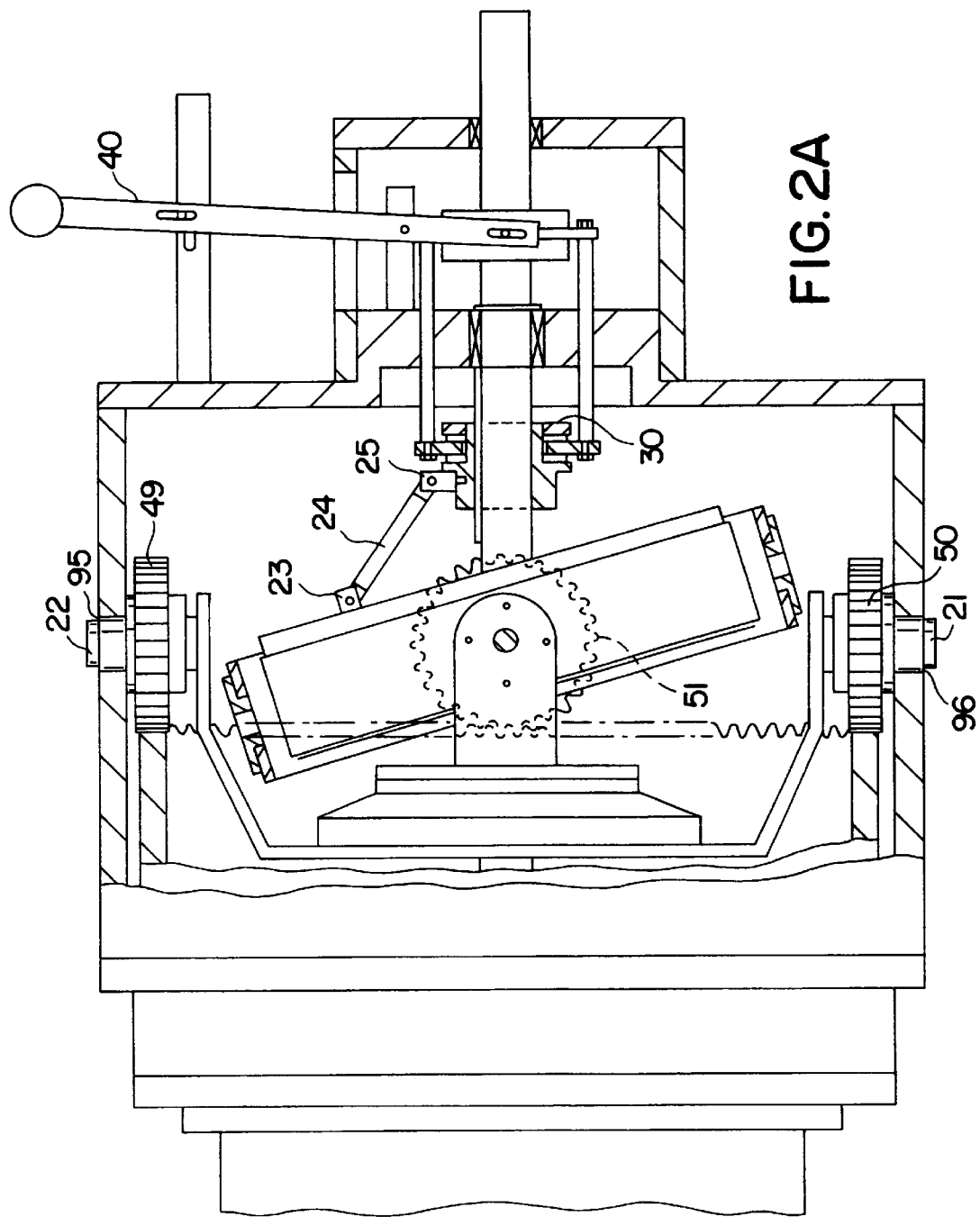

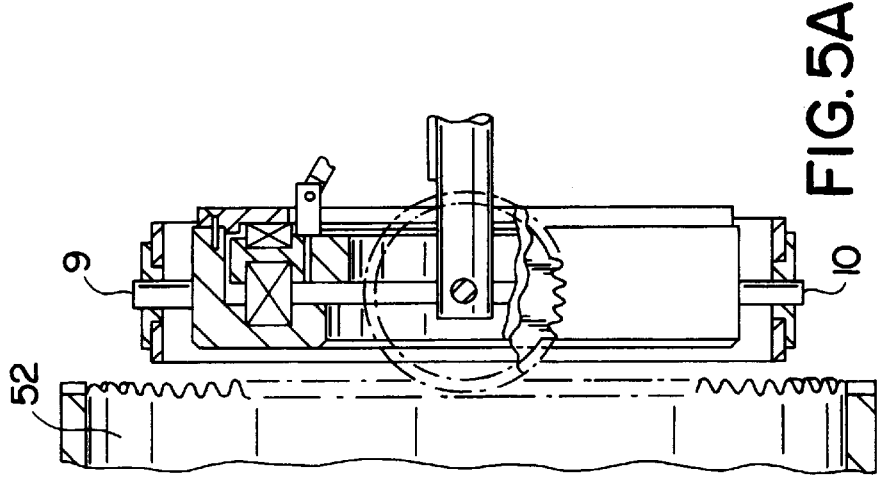
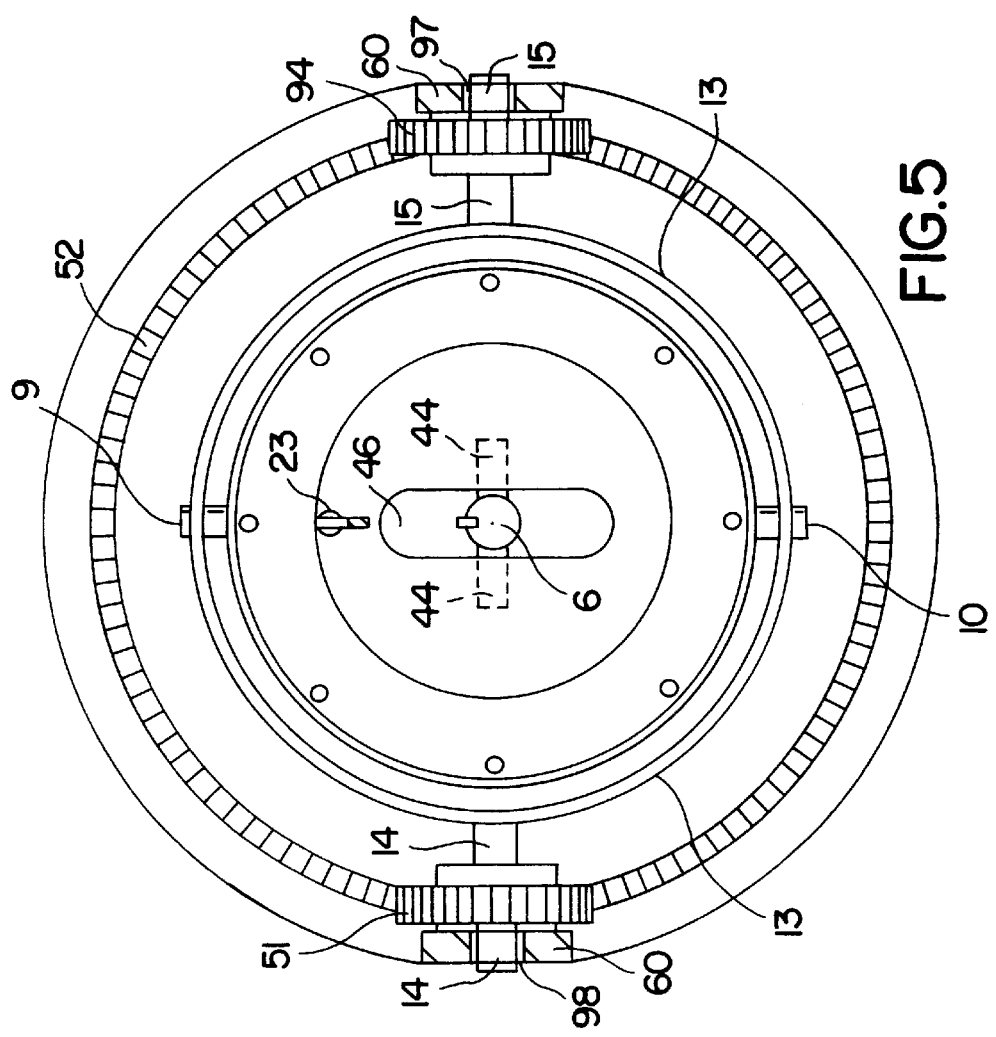

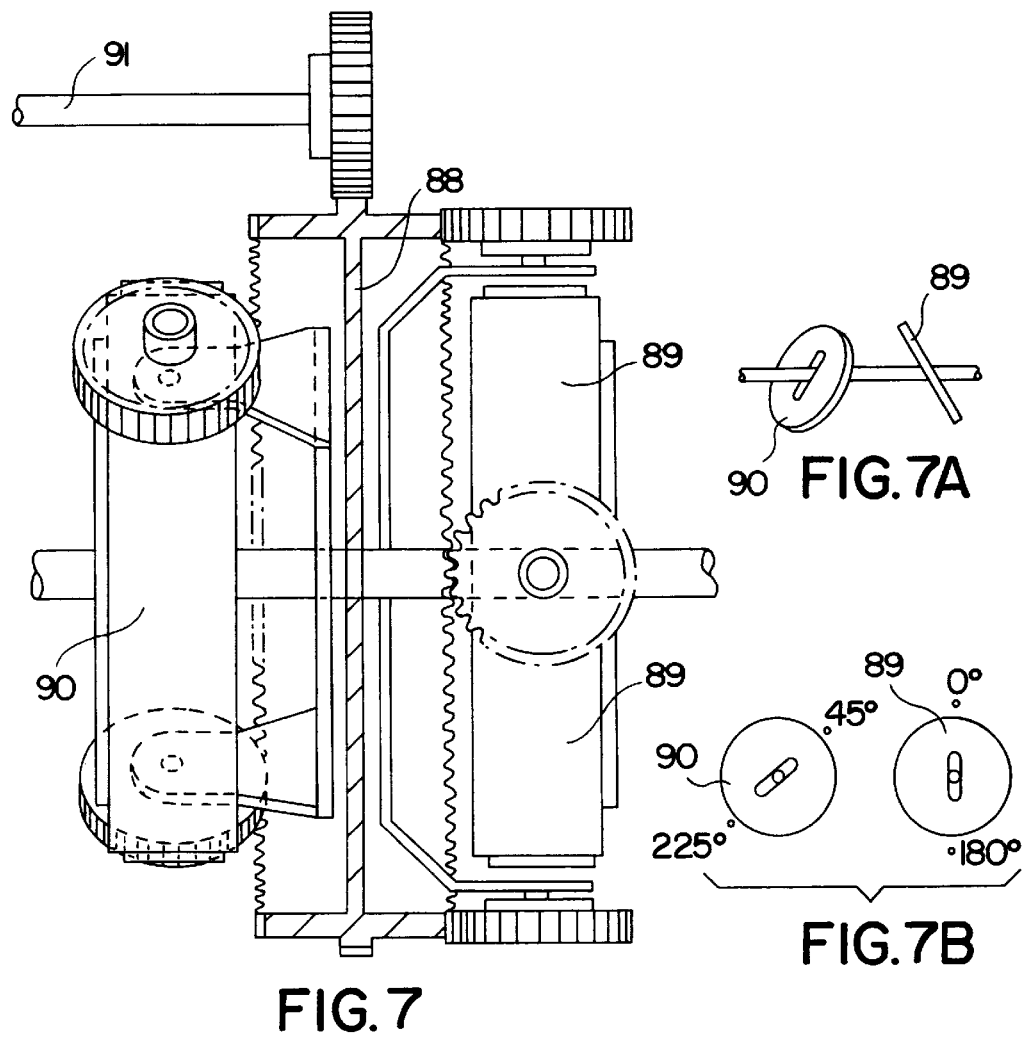

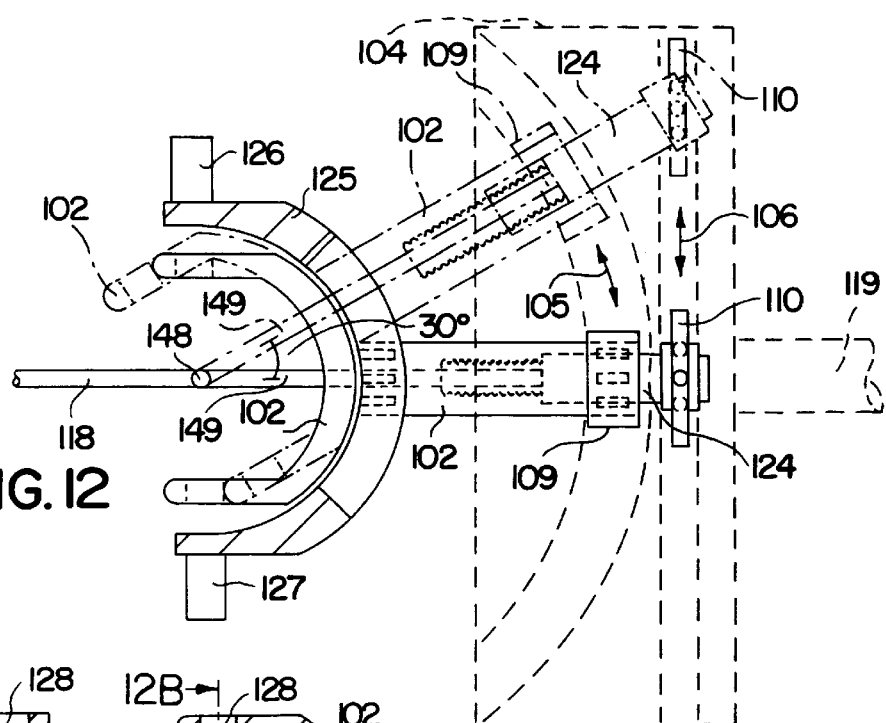
FIG. 12
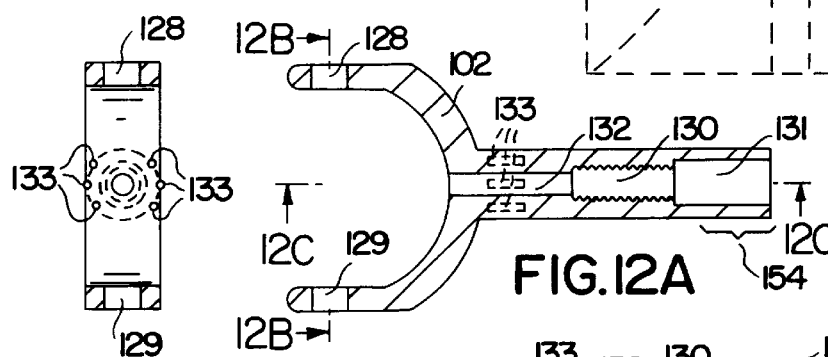
FIG. 12A
FIG. 12B
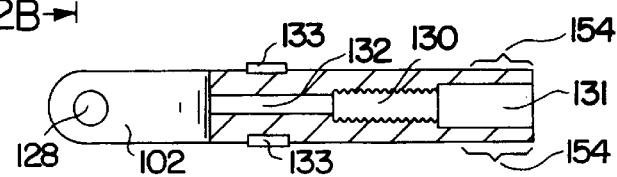
FIG. 12C
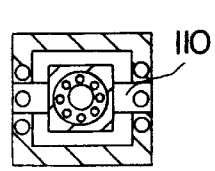
FIG. 14
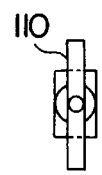
FIG. 14A
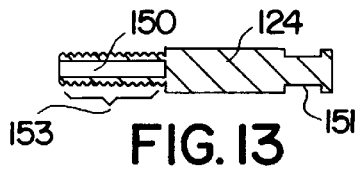
FIG. 13
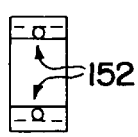
FIG. 14B
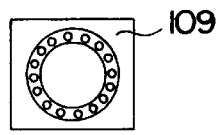
FIG. 14C

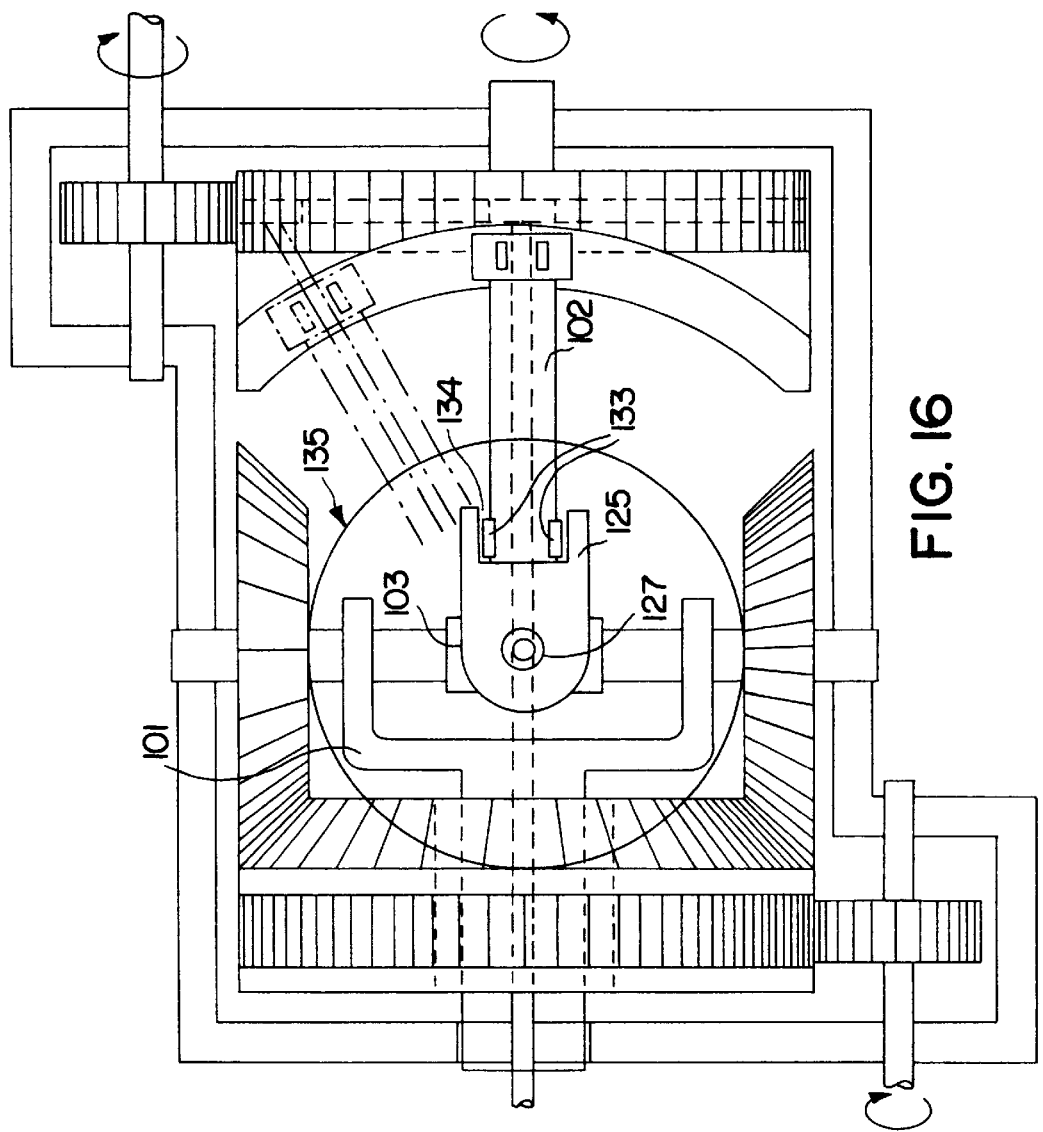

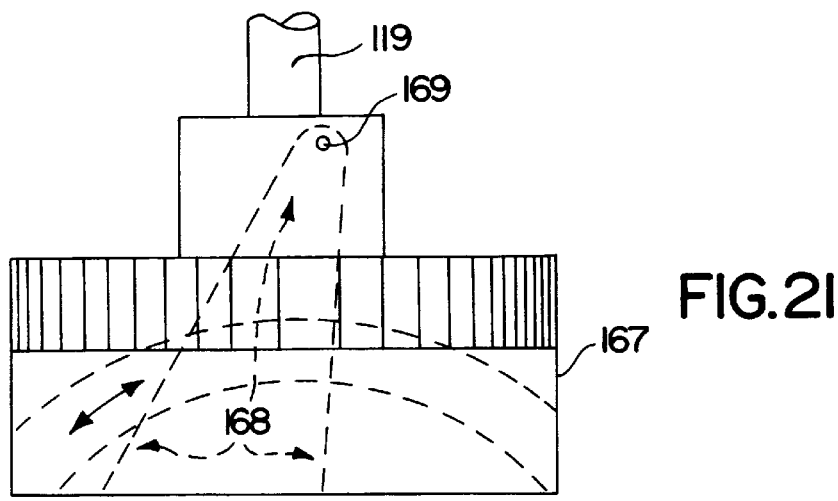
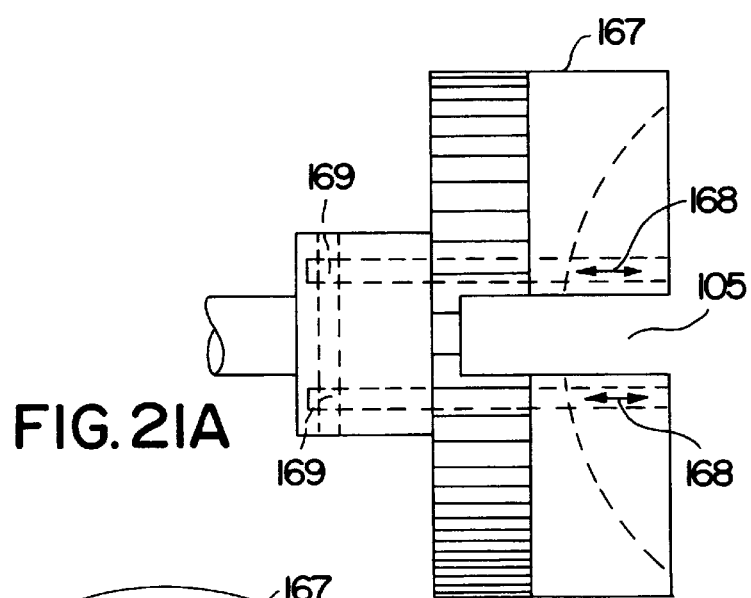
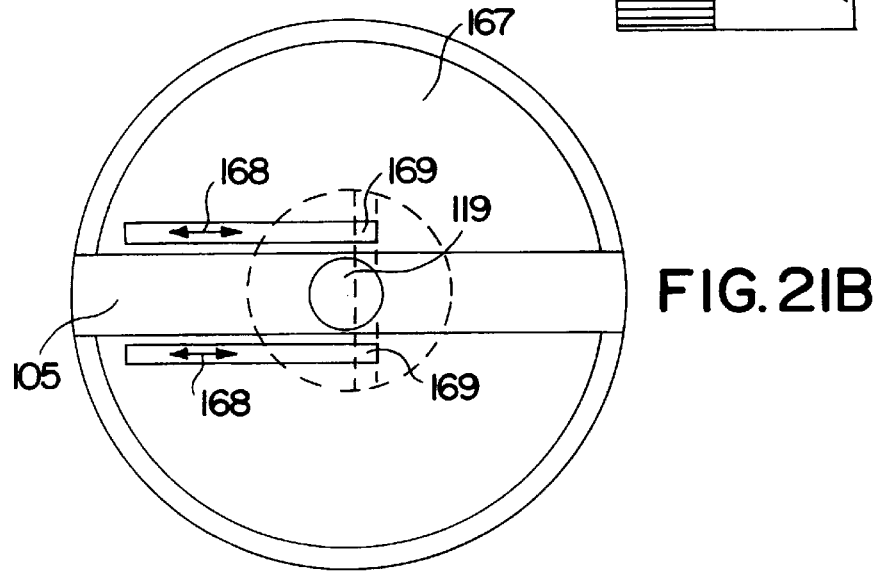

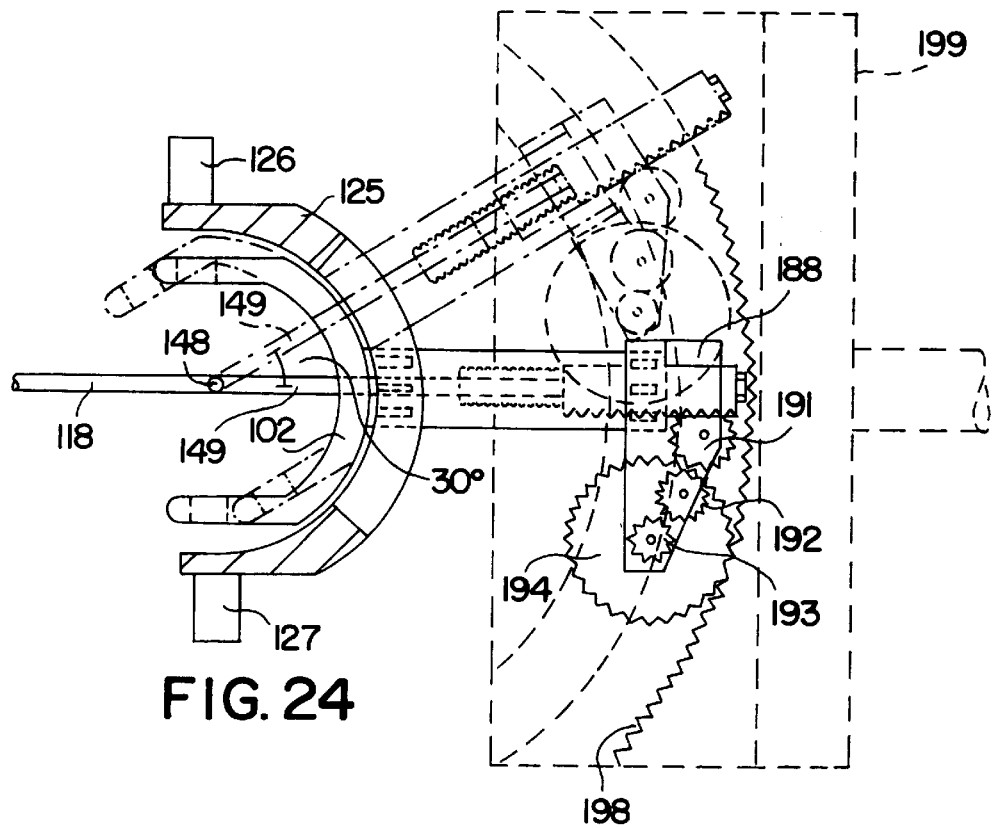
FIG. 24
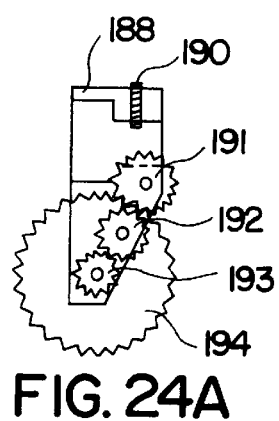
FIG. 24A
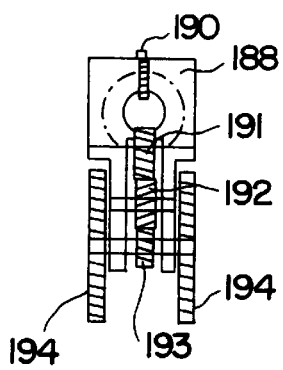
FIG. 24B
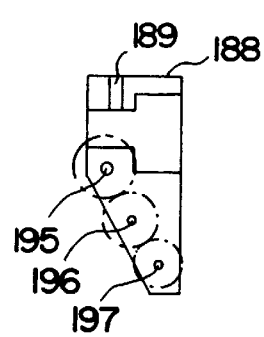
FIG. 24C
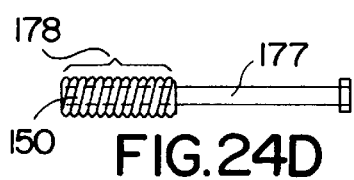
FIG. 24D
FIG. 24E
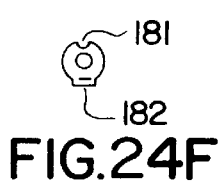
FIG. 24F
FIG. 24G

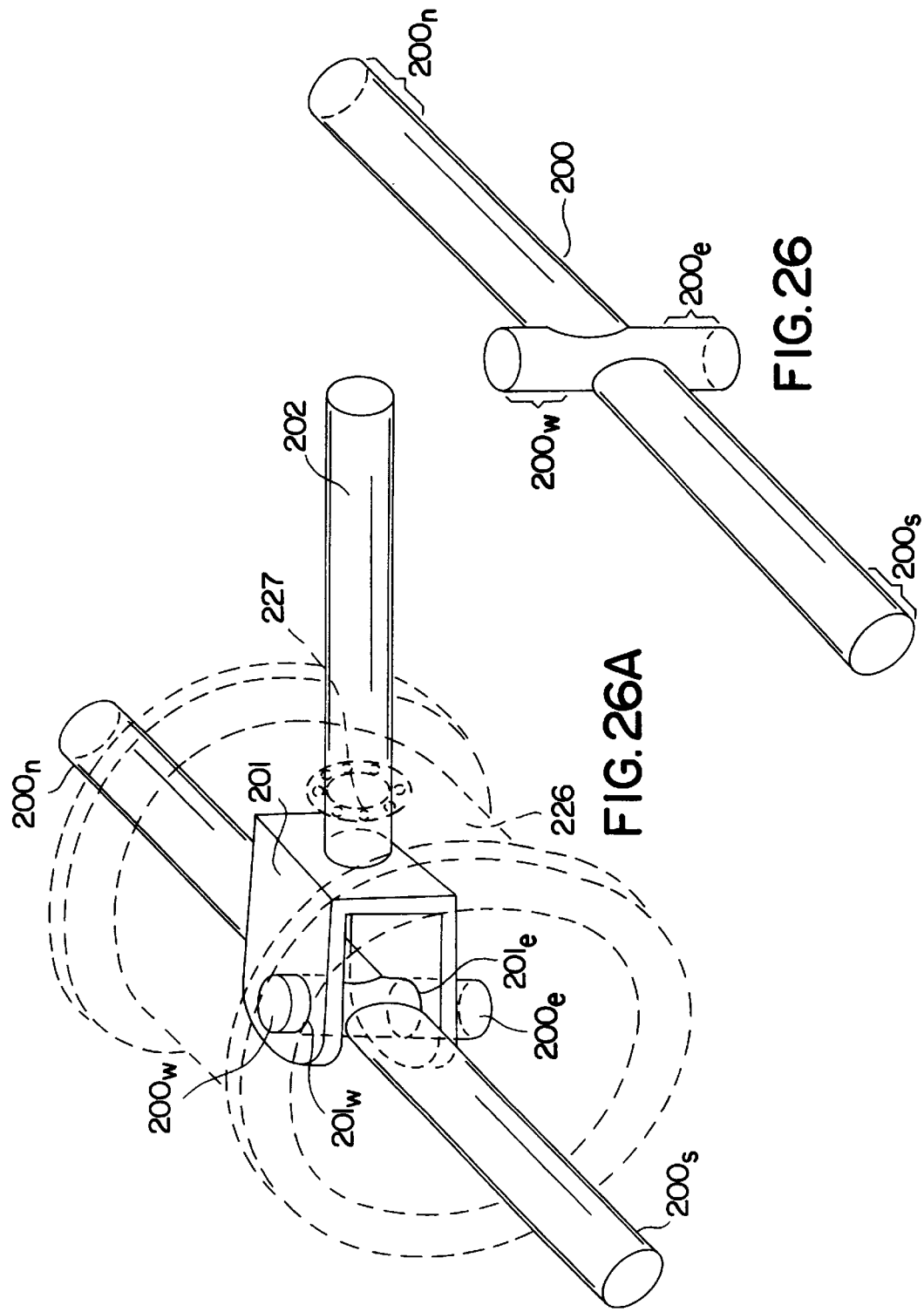

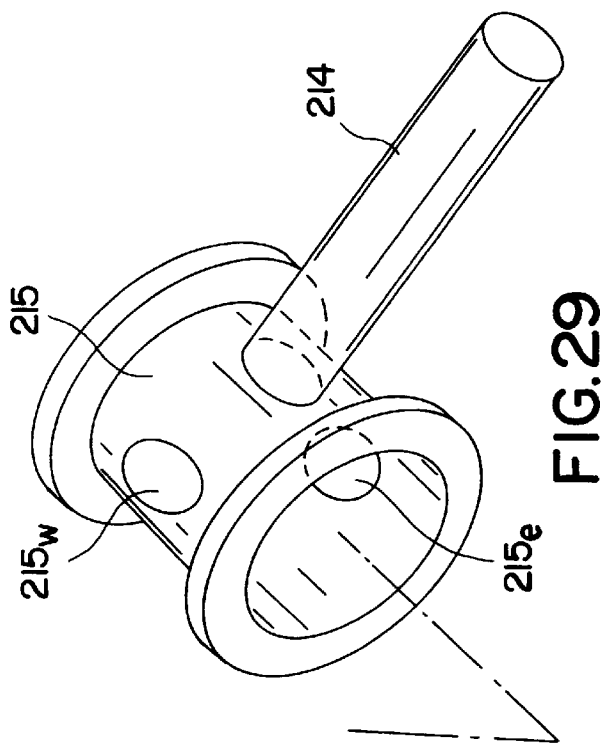
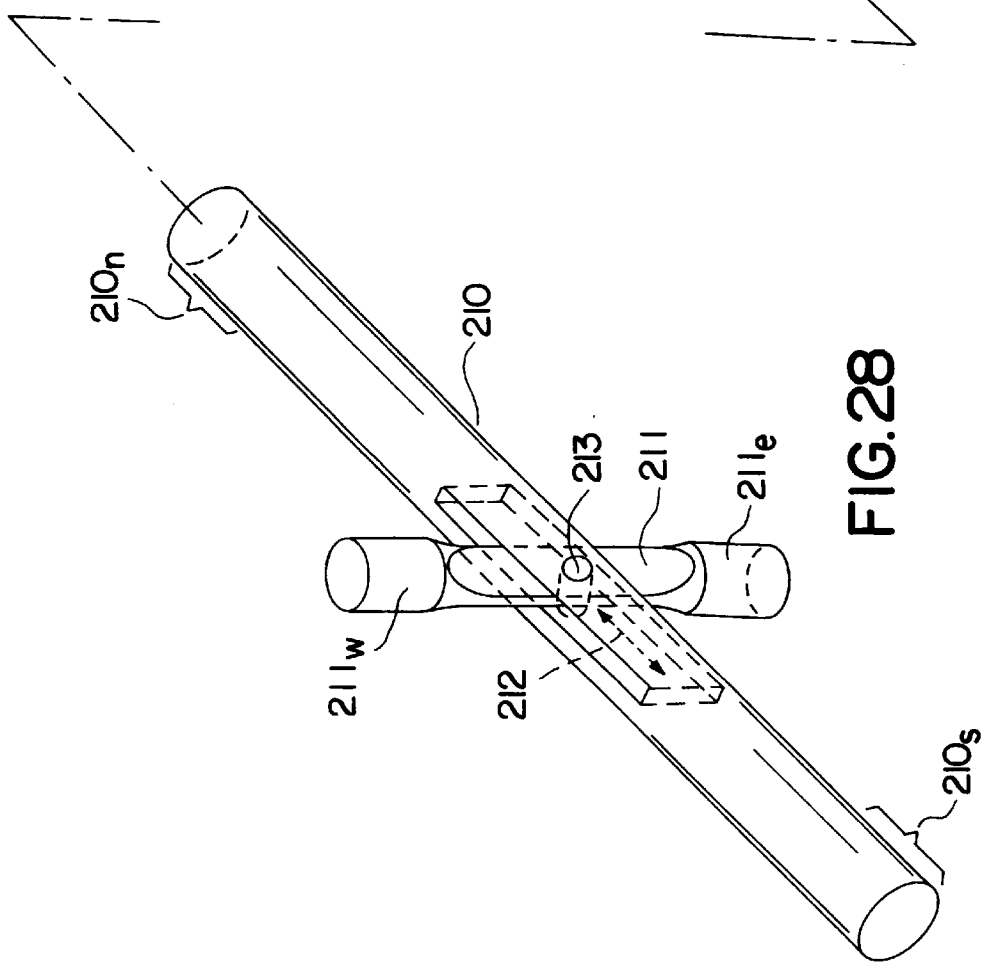

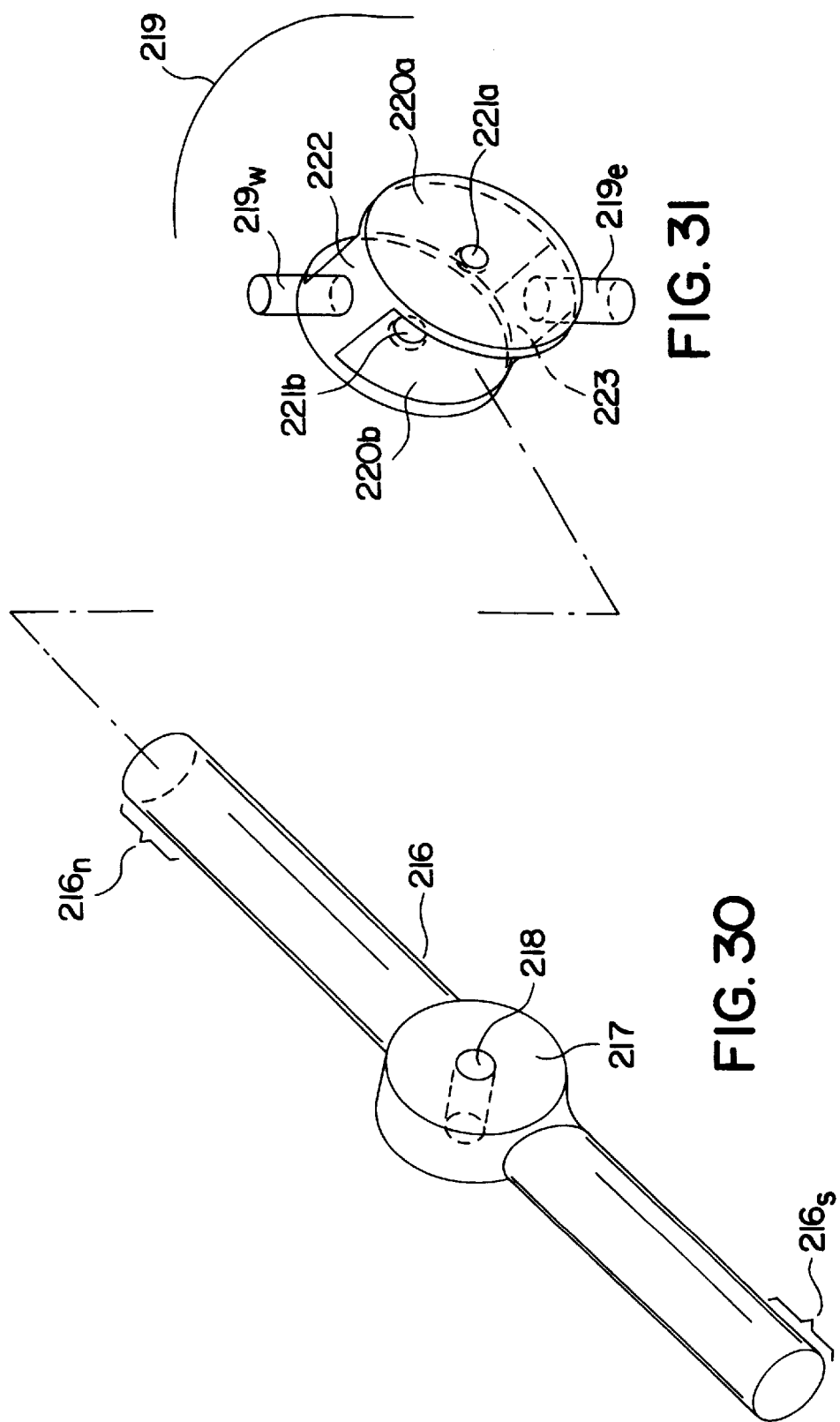

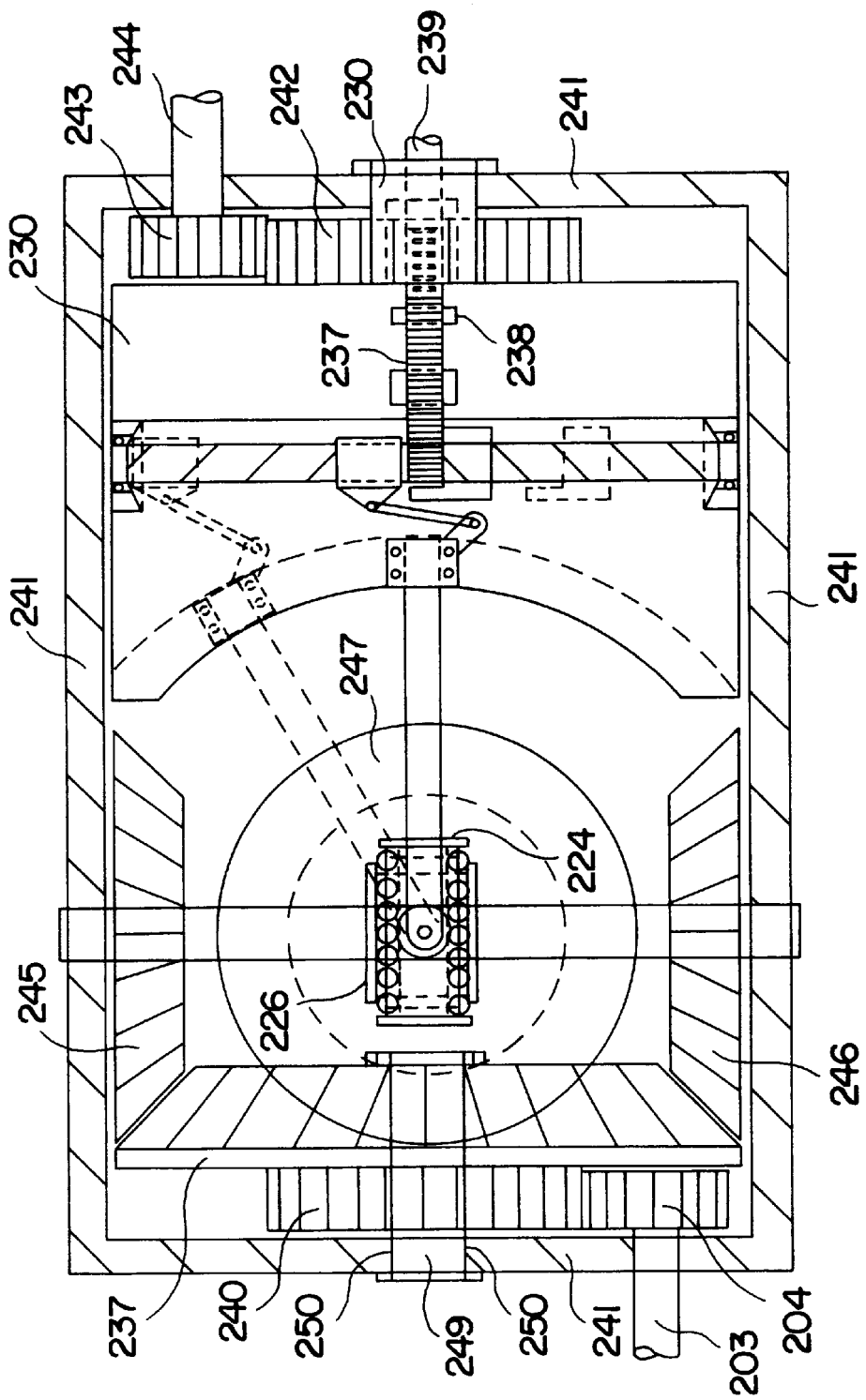

INFINITELY AND CONTINUOUSLY VARIABLE TRANSMISSION SYSTEM

This application is a continuation-in-part of U.S. application Ser. No. 09/112,605 filed on Jul. 9, 1998, now abandoned which is a continuation-in-part of U.S. application Ser. No. 09/019,930 filed on Feb. 6, 1998 now abandoned.

BACKGROUND OF THE INVENTION

The invention relates to a mechanical device that provides for an infinitely and continuously variable transmission system that is capable of gradually and smoothly multiplying TORQUE while decreasing RPM and vice-versa. For a given input shaft TORQUE and RPM, the system will deliver to the output shaft, through an infinite and continuous process, such increases or reductions in TORQUE with inversely corresponding increases or reductions in RPM as may be desired across a predetermined and very wide range of transmission ratios. The range of transmissions ratios extends from input shaft TORQUE amplification of over 90 to 1 down to below 2 to 1 with inversely corresponding RPM settings and includes a setting allowing zero RPM for the output shaft while the input shaft continues to rotate at any RPM, thus eliminating the need for an input shaft disengaging clutch.

The invention includes a main assembly consisting of one, two, three or more pairs of co-axial diametrically opposed one-way clutches "freewheels" having gear teeth on their outer perimeter together with their corresponding pairs of diametrically opposed freewheel carrying shafts which are interconnected through a central hub assembly. The axes of the freewheel carrying shafts share the same plane with each other and with the central hub's multi-directional center around which they are radially and symmetrically mounted. The freewheels are engaged in one rotational direction and disengaged in the opposite rotational direction of their carrying shafts and are in turn continuously and uni-directionally meshed to a common rotatable output gear. The infinitely and continuously variable TORQUE and RPM ratios are produced by causing the freewheel carrying shafts to rotatably oscillate at gradually variable oscillation arcs thereby causing their respective freewheels to smoothly rotate the common output gear at correspondingly variable rotation speeds through a simultaneous combination of the oscillation arc magnitude of their carrying shaft rotatable oscillations and their corresponding engagement/disengagement action.

The freewheel carrying shafts are caused to rotatably oscillate at gradually variable oscillation arcs through the following procedures:

a) Swash Plate Embodiment

Through gradually pivoting while at the same time rotating a swash plate co-axially mounted to and pressing through a thrust bearing or other device against a non-rotatable central hub assembly which is pivotably mounted through diametrically opposed perimetrical stub shafts to a first concentric outer ring which is in turn pivotably mounted through diametrically opposed perimetrical mounting shafts to a frame either directly or through the intervention of one or more further similarity pivotably mounted outer rings wherein the freewheel carrying shafts are radially and symmetrically mounted in opposed pairs (the first pair of which is mounted on the diametrically opposed perimetrical mounting shafts of the largest (outside) concentric ring, the intervening pairs being mounted on the outside legs of cross shaped "spyders" whose inside legs are pivotably mounted to the intervening outer rings by way of diametrically opposed perimetrical stub shafts and the last pair of which is mounted on the outside legs of the innermost "spyder" whose inside legs are pivotably mounted to the non-rotatable central hub assembly by way of diametrically opposed perimetrical stub shafts) and are all caused to oscillate by the motion imposed on the non-rotatable central hub assembly by the gradual pivoting of the rotating swash plate, or b) Double Yoke Embodiment Through gradually pivoting while at the same time rotatably displacing the free end of a main shaft connected to a second pivotable and rotatably displacable yoke with respect to a first non-rotatable fixed and opposing yoke where the fork ends of the said yokes are interconnected (fork to fork) through a central cross assembly consisting of a hub having a pair of opposed shorter and a pair of opposed longer vertically intersecting shafts radially fixed on its outer perimeter, opposed sections of the longer shafts being pivotably mounted through the first fixed yoke's fork their ends being rotatably mounted to a main frame and the opposed ends of the shorter shafts being pivotably mounted through the second pivotable yoke's fork, the second pivotable yoke's main shaft being also slidably and rotatably mounted through a longitudinal slot in the center section of one or more further pivotable assemblies each consisting of a circular or semi-circular central ring section having two diametrically opposed shafts radially fixed on its outer perimeter and rotatably mounted to a main frame symmetrically with respect to the central cross assembly's longer shafts wherein the freewheels are mounted equidistantly from the hub's center at opposed sections of the central cross assembly's longer shafts and each of the pivotable assemblies' diametrically opposed shafts and are all caused to oscillate by the simultaneous pivotable and rotatably displacable action imposed on the second pivotable yoke shaft by a rotating grooved disc which contains on its inner face a diametrically positioned arc shaped groove whose arc radius is equal to the length of the pivotable yoke shaft within which the pivotable yoke shaft's free end is slidably fitted thus allowing it to be gradually shifted out of alignment with respect to the axis of rotation of the grooved disc by way of a shifting mechanism, or c) T-Joint Embodiment Through gradually pivoting while at the same time rotatably displacing the free end of a second pivotable and rotatably displacable main shaft with respect to a first main shaft rotatably mounted to a main frame where the second main shaft is pivotably connected to the center of the first main shaft through a central cross assembly and is also slidably, and in some embodiments also rotatably, mounted through a longitudinal slot in the center section of one or more further pivotable assemblies each consisting of a circular or semi-circular central ring section having two diametrically opposed shafts radially fixed on its outer perimeter and rotatably mounted to a main frame symmetrically with respect to the first main shaft wherein the freewheels are mounted equidistantly from the central cross assembly's center at opposed sections of the first shaft and the opposed shafts of each of the pivotable assemblies and are all caused to oscillate by the simultaneous pivotable and rotatably displacable action imposed on the second main shaft by a rotating grooved disc which contains on its inner face a diametrically positioned arc shaped groove whose arc radius is equal to the length of the pivotable yoke shaft within which the pivotable yoke shaft's free end is slidably fitted thus allowing it to be gradually shifted out of alignment with respect to the axis of rotation of the grooved disc by way of a shifting mechanism.

The capability of the transmission to provide infinite and continuous increases or reductions in TORQUE with inversely corresponding increases or reductions in RPM is extremely desirable since it allows the selection of the exact TORQUE and RPM settings that may be required under any particular environment. This results in the most energy efficient transmission of power from the source to the load. At the same time, since the transmission described and claimed herein remains continuously engaged while shifting through the entire TORQUE and RPM range including the zero output RPM position, it totally eliminates the loss of power and/or momentum while down-shifting or up-shifting between gears which is inherent in today's manual and automatic gearboxes Prior infinitely Variable Transmissions and continuously variable transmissions are generally of two types: "friction drive" transmissions and "shaft oscillation" transmissions.

The "friction drive" transmissions rely mostly on conical pulleys and friction belts or cones with intermediate friction rollers, or toroidal discs with intervening friction rollers. All such devices are inherently "torque limited" and susceptible to unacceptable levels of wear and tear due to their reliance on friction.

The "shaft oscillation" transmissions rely on generating shaft oscillations generally through reciprocating or rotating cam followers oscillated by rotating cams. Such shaft oscillations rotate the output shafts through "one-way clutches" which engage when rotated in one direction and disengage when rotated in the opposite direction. Although such clutches are dependable, efficient and can sustain extremely heavy torque loads, the rotating or reciprocating cam followers together with their respective rotating cam arrangements disclosed thus far are too complex, are inefficient in that there are high friction losses associated with the multitude of moving parts, and are susceptible to very high wear and tear.

While the present invention may generally be considered to be of the "shaft oscillation" type, it overcomes the problems associated with prior art systems due to the inherent simplicity of its design, the total lack of cams and cam followers, and the fact that all moving parts and shafts may rotate on ball bearings and/or thrust bearings, throughout their entire range of motion.

The additional advantages offered by the invention over existing technology include, but are not limited to: exceptional torque amplification (from over 90 to 1 down to below 2 to 1) with associated RPM ranges from source RPM down to zero; no need for input shaft disengaging clutch; improved fuel economy; improved acceleration; improved matching of power transmission from source to load; improved reliability through use of few moving parts; low manufacturing costs due to the simplicity of parts; very compact volume and low weight; and an extremely broad range of applications including light vehicles, heavy trucks, earth moving equipment, racing cars, motorcycles, wind generators, conveyor belts, production line machinery, marine propulsion units, etc.

SUMMARY OF THE INVENTION

Swash Plate Assembly Embodiment

Swash Plate Assembly

In one of the preferred embodiments of the invention at least one "swash-plate assembly" is utilized preferably having an inner circular rotating portion, an outer non-rotating partially hollow portion and a thrust bearing retention ring.

The inner circular rotating portion has a central hub that contains a slot running radially through its center and a centrally positioned yoke-type retaining pin housing where the two exposed ends of the input shaft's retaining pin are rotatably mounted. The inner circular rotating portion is pivotally and centrally fixed by way of such central retaining pin housing and retaining pin to the input shaft, which runs horizontally through the center of the radial slot of such inner circular rotating portion thereby forcing it to co-rotate with the input shaft while at the same time allowing it to pivot with respect to the input shaft at any angle from zero degrees to over 25 degrees with respect to the vertical axis. The outer circular non-rotating partially hollow portion, is mounted concentrically to the inner rotating portion by way of an intervening main thrust bearing such that the inner rotating portion is rotatably driven by the input shaft and can freely rotate within the outer non-rotating partially hollow portion, thus causing the outer non-rotating partially hollow portion to exactly follow any motion, other than the motion of rotation, induced upon it by the inner rotating portion as its angle of pivot with respect to the input shaft is varied from the vertical. The thrust bearing retention ring is bolted on to the outer non-rotating partially hollow portion and holds the inner rotating portion, the intervening main thrust bearing and the outer non-rotating partially hollow portion together as one assembly through an auxiliary thrust bearing positioned between the thrust bearing retention ring and the inner rotating portion. The entire swash plate assembly pivots around the central retaining pin attached to the input shaft such that the longitudinal axis of the central retaining pin lies in the same plane that runs radially through the exact center of the main thrust bearing.

The outer non-rotating partially hollow portion of the swash plate assembly has four short radial shafts vertically fixed on its outer perimeter in a "cross pattern," each one of such four short radial shafts being positioned 90 degrees apart from its neighboring short shafts. The longitudinal axes of all four such short shafts lie on the same plane which plane in turn passes exactly through the point where the longitudinal axis of the central retaining pin of the swash plate assembly intersects with the longitudinal axis of the input shaft. Such four short shafts run in the north, south, east and west directions and are accordingly referred to as the "north", "south", "east", and "west" swash plate assembly short shafts.

Outer Ring

The entire swash plate assembly is perimetrically surrounded by an outer ring that is concentrically mounted to the swash plate assembly and which is pivotally coupled to the swash plate assembly through the "north" and "south" swash plate assembly short shafts through related bearings. The outer ring has two of its own main shafts protruding outwards and vertically fixed to its outer perimeter in the "east" and "west" positions with respect to the "north" and "south" swash plate assembly short shafts. These two outer ring main shafts are in turn pivotally mounted in bearings that are part of the main frame, which allows the outer ring to pivot with respect to the main frame around the "east-west" axis. Concentrically mounted on each of the two outer ring main shafts between the outer ring and the main frame is a "freewheel" (one-way clutch) that carries a toothed gear concentrically mounted on its outer perimeter. Both of the toothed gears mounted perimetrically on the two freewheels are in turn continuously engaged with one main output gear which directly and simultaneously meshes with both said outer ring freewheel gears. The main output gear rotates concentrically with the input shaft but at varying rotation speeds and is connected to the output shaft either directly or through reduction gears.

Two Freewheel Swash Plate

As the inner rotating portion of the swash plate assembly is forced to pivot with respect to the rotating input shaft, it causes the entire swash plate assembly to pivot with it. For example, as the angle of pivot of the swash plate assembly with respect to the rotating input shaft is varied from the vertical position (at zero degrees) to one degree, the rotation of the input shaft through 360 degrees forces the swash plate assembly's outer non-rotating partially hollow portion to which the four short shafts are perimetrically attached to oscillate around its "north-south" and "east-west" axes. As the swash plate assembly oscillates around the "east-west" axis it forces the outer ring to which it is attached through its "north" and "south" short shafts to also oscillate around its "east-west" axis. As the input shaft rotates by 360 degrees it will cause each of the outer ring's "east-west" main shafts to oscillate by 4 degrees (from minus 1 degree to zero to plus 1 degree and then back through zero to minus 1 degree). Accordingly each outer ring main shaft will engage its respective freewheel through 180 degrees of rotation of the input shaft and disengage its freewheel through the other 180 degrees of rotation of the input shaft. Since the two outer ring main shafts are opposed and their freewheels are equally opposed, when the freewheel of the east main shaft is engaged the freewheel of the west main shaft will be disengaged and vice-versa. Accordingly one freewheel will positively engage the main output gear through the first 180 degrees of rotation of the input shaft and the opposite freewheel will positively engage the main output gear through the other 180 degrees of rotation of the input shaft, thus producing rotary motion of the main output gear.

The Spider

The basic transmission motion having a two freewheel swash plate assembly configuration relies solely on the oscillation of the swash plate assembly over its "east-west" axis. However, the swash plate assembly also oscillates over its "north-south" axis. This oscillation is transferred to the main output gear through an assembly called the spider. The spider has two sets of double legs (each set being much like a yoke) set 90 degrees apart and connected to each other through a common hub. It effectively resembles two yokes one superimposed over the other and set 90 degrees out of phase with each other. The inner yoke of the spider is pivotally mounted through simple bearings to the "east-west" short shafts of the swash plate assembly while the outer yoke of the spider has two protruding main shafts vertically fixed at the end of each leg on its "north-south" axis, such that the center of such bearings and the longitudinal axis of such main shafts share the same plane. These two spider main shafts are in turn pivotally mounted in bearings that are set in the main frame, which allows the Spider to pivot with respect to the main frame around the "north-south" axis. Concentrically mounted on each of the two spider main shafts between the spider legs and the main frame is a freewheel (one way clutch) that carries a toothed gear concentrically mounted on its outer perimeter. Both of the two toothed gears mounted perimetrically on the two freewheels are in turn continuously engaged with the same main output gear which directly and simultaneously meshes with both said freewheel gears and the also with the two freewheel gears of the outer ring. The longitudinal axis of the two outer ring main shafts and the two spider main shafts all lie in one plane which is vertical to the input shaft and intersects the input shaft at the point of intersection of the longitudinal axes of the central retaining pin and the input shaft.

Four Freewheel Swash Plate

In order to produce a continuous rotary motion of the main output gear, the "north-south" oscillation of the swash plate assembly must also be utilized in addition to its "east-west" oscillation. Accordingly, as the swash plate assembly oscillates around the "north-south" axis, it forces the spider to which it is attached through its "east" and "west" short shafts to also oscillate about its "north-south" axis. Given an angle of pivot of 1 degree, as the input shaft rotates by 360 degrees, the spider's two "north-south" main shafts begin to oscillate by 4 degrees (from minus 1 degree to zero to plus 1 degree and then back through zero to minus 1 degree) thereby in turn intermittently engaging and disengaging each of their two freewheels every 180 degrees of rotation of the input shaft. Since the spider's two main shafts are opposed and their freewheels are equally opposed, when the freewheel of the north main shaft is engaged the freewheel of the south main shaft will be disengaged and vice-versa. Accordingly one freewheel will positively engage the main output gear through the first 180 degrees of rotation of the input shaft and the opposite freewheel will positively engage the main output gear through the other 180 degrees of rotation of the input shaft thus producing rotary motion of the main output gear. The combination of the positive main output gear intermittent engagement by the two "north-south" freewheels of the spider and the two "east-west" freewheels of the outer ring set 90 degrees out of phase with each other will cause the main output gear to rotate in a continuous and fluent motion at input shaft speeds equal to or in excess of 1,000 RPM, since each freewheel will positively engage the main output gear for only 90 degrees of input shaft rotation at a time (instead of 180 degrees) before its neighboring freewheel takes over by positively engaging the main output gear.

Six Freewheel Swash Plate

In this configuration the swash plate assembly oscillates around three axis set 60 degrees out of phase to each other instead of oscillating around two axes set 90 degrees out of phase to each other as in the "Two" and "Four" Freewheel Swash Plate examples described previously. The three axes can be described as the "east-west" or "0–180" degree axis; the "southeast-northwest" or "60–240" degree axis; and the "southwest-northeast" or "120–300" degree axis. This configuration includes one central swash plate assembly, two outer rings and two spiders.

The swash plate assembly has two pairs of opposed short shafts vertically embedded on its outer perimeter, where one pair of opposed short shafts is fixed at the "0" and "180" degree positions and is pivotally mounted to the "0" and "180" orifices of Ring(A) and the other pair of opposed short shafts is fixed at the "90" and "270" degree positions and is pivotally mounted to Spider(A)'s "90" and "270" degree leg orifices. Ring(A) has two pairs of opposed short shafts vertically embedded on its outer perimeter where one pair of opposed shafts is fixed at the "60" and "240" degree positions and is pivotally mounted to the "60" and "240" degree orifices of Ring(B) and the other pair of opposed shafts is fixed at the "150" and "330" degree positions and is pivotally mounted to Spider(B)'s "150" and "330" degree leg orifices. Ring(B), Spider(A) and Spider(B) each have one pair of protruding opposed main shafts vertically embedded on their outer perimeter/legs at the "120"/"300" "0"/"180" and "60"/"240" degree positions, respectively, which are in turn pivotally mounted in bearings set in the main frame, thus allowing Ring(B), Spider(A) and Spider (B) to freely pivot with respect to the main frame around their "120–300", "0–180" and "60–240" main axes respectively. Concentrically mounted on each of such main shafts between respectively Ring(B), Spider(A) and Spider(B) and the main frame is a freewheel (one way clutch) that carries a toothed gear concentrically mounted on its outer perimeter. All six such toothed freewheel gears are in turn continuously engaged with the main output gear which rotates concentrically with the input shaft but at varying rotation speeds and is in turn connected to the output shaft either directly or through reduction gears.

As the swash plate assembly is pivoted with respect to the rotating input shaft away from the vertical, it induces oscillation of Ring(B)'s "120–300" main shafts, Spider(A)'s "0–180" degree main shafts and Spider(B)'s "60–240" degree main shafts, which causes each of their attached freewheels to positively and uni-directionally engage the main output gear with which they all mesh in increments of 60 degrees for every 360 degrees of input shaft rotation so that the main output gear rotates in a continuous and fluent motion.

Double Yoke Assembly Embodiment Description
Double Yoke Assembly

In another embodiment of the invention, at least one double yoke assembly is utilized, preferably having a fixed yoke, a pivotable second yoke and a central cross assembly connecting the two opposed yokes to each other fork-to-fork. The fixed yoke has a central shaft which is rigidly mounted to the embodiment's rear frame such that it cannot either rotate or be rotatably displaced. The pivotable second yoke has an attached pivotable yoke shaft which cannot rotate but can be rotatably displaced through motions induced upon it, thereby causing it to oscillate on two axes (the "north-south" and "east-west" axes) with respect to the fixed yoke to which it is mounted fork-to-fork by way of the central cross assembly. The central cross assembly includes a central hollow hub having one pair of two opposed co-axial main shafts radially and rigidly mounted on its outer perimeter in the "north-south" axis, which are rotatably mounted through the fixed yoke's "north-south" axis orifices and whose shaft ends axe rotatably housed in the embodiment's main frame in "north-south" alignment, and another pair of two co-axial opposing short shafts radially and rigidly mounted on its outer perimeter in the "east-west" axis, which are rotatably connected to the pivotably yoke's "south-east" axis orifices, all such main and short shafts being co-planar to each other such that their theoretical extensions intersect each other vertically at the same point as the hub's multi-directional center. Concentrically mounted on each of the two "north-south" main shafts between the fixed yoke's "north-south" fork ends and the main frame is a freewheel having a toothed gear concentrically mounted on its outer perimeter such that both freewheel gears are in turn continuously engaged with one main output gear that rotates concentrically with the axis of the central fixed yoke shaft and is preferably connected to the output shaft through a reduction gear.

Rotating Grooved Disc Driven by Input Shaft and Pivot Arrangement of Pivotable Yoke Shaft The grooved disc consists of an outer flat face having a vertically mounted central shaft around which it symmetrically rotates and an inner concave face which is inwardly curved to follow the shape of a hemi-sphere or a spherical section thereof having a central arc shaped groove running radially through the entire diameter of its inner face surface. The grooved disc is rotatably driven by the power source and is rotatably mounted to the front frame of the embodiment through the central shaft of its outer face. The theoretical extension of the axis of rotation of the grooved disc passes through the hub's multi-directional center. A shoe rotatably fitted to the free end of the pivotable yoke shaft is slidably mounted in the arc shaped groove of the grooved disc's inner face such that while the grooved disc is rotating the pivotable yoke shaft can be smoothly displaced (shifted) throughout the length of the arc shaped groove from being perfectly aligned with the grooved disc's central shaft until it is 30 degrees or over out of alignment with said central shaft. The displacement (shifting) of the pivotable yoke shaft can be achieved through a variety of methods of which the following are preferred methods.

a) An extension shaft is caused to be either screwed-in or screwed-out through the pivotable yoke shaft's hollow central section, thereby forcing a bogie which is pivotably and rotatably fitted to the extension shaft's free end to slide up or down a straight grooved track which is vertical to the grooved disc's axis of rotation and runs through the entire diameter of the rotating grooved disc lying directly behind the arc shaped groove. Since the distance between the arc shaped groove and the straight groove lying directly behind it becomes longer as the free end of the pivotable yoke's shaft moves out of alignment with the rotating grooved disc's central shaft the screwing-out of the extension shaft will cause the pivotable yoke shaft to be gradually displaced out of alignment with respect to the grooved disc's central shaft.

b) An extension shaft is caused to be either screwed-in or screwed-out through the pivotable yoke shaft's hollow central section, thereby forcing a twin flange assembly, rotatably mounted on the extension shaft's free end and pivotably connected through two stub shafts to two pivoting braket arms each running parallel with and on either side of the arc shaped groove which braket arms are in turn rotatably connected to two coaxial anchoring points lying within the grooved disc, to follow an arc shaped track around the coaxial anchoring points. Since the two coaxial anchoring points of the braket arms are off-set to one side of the grooved disc's axis of rotation the screwing-out of the extension shaft will cause the two flange assembly stub shafts to follow an arc lying on the opposite side of the grooved disc's axis of rotation thereby forcing the pivotable yoke shaft to be gradually displaced out of alignment with respect to the grooved disc's central shaft.

c) An extension shaft is caused to be either screwed-in or screwed-out through the pivotable yoke shaft's hollow central section, thereby forcing the geared face of a rack rotatably mounted on the extension shaft's free end to engage a set of gears which is contained within a sliding gear cage assembly which is rotatably mounted around the free end of the pivotable yoke shaft and slidably fitted within the arc shaped groove. Since one or a set of gears being part of the gear cage assembly in turn mesh with one or a set of arc shaped gear surfaces which are rigidly fixed upon (or within) the grooved disc in coaxial alignment with and running parallel to the arc shaped groove over its entire length (or part thereof) the screwing out of the extension shaft will cause the rack to rotate the entire set of gears of the gear cage assembly thereby forcing the pivotable yoke shaft to be gradually displaced out of alignment with respect to the grooved disc's central shaft.

d) A threaded shaft which is vertical to the grooved disc's axis of rotation and runs through the entire diameter of the rotating grooved disc within its own straight squared cross-section groove which lies directly behind and is radially aligned with the arc shaped groove is caused to rotate in either direction thereby forcing a carriage which is threadably mounted to the threaded shaft and whose outer body is slidably mounted in the squared cross-section groove to slide up or down the squared cross-section groove. Since the sliding shoe, rotatably mounted to the free end of the pivotable yoke shaft and slidably fitted within the arc shaped groove, is connected with the threadably mounted carriage through one or a set of pivotably braket arms the rotation of the threaded shaft will cause the threadably mounted carriage to shift thereby forcing the pivotable yoke shaft to be gradually displaced out of alignment with respect to the grooved disc's central shaft. For balancing purposes half the length of the threaded shaft could be threaded in one direction and the other half in the other direction. The thread pitches of these sections need not be identical. The threadably mounted carriage would occupy one section while a threaded counter-weight carriage would occupy the other section. As the threaded shaft is rotated in one direction the threadably mounted carriage and the threadably mounted counter-weight carriage would move apart while as the threaded shaft is rotated in the opposite direction they would move together. Full static and dynamic counter-balancing of the pivotable yoke shaft's displacement could thus be achieved.

Two Freewheel Double Yoke Arrangement

The pivotable yoke is caused to oscillate around the "north-south" and "east-west" axes of the central cross assembly when the inclination angle of the pivotable yoke shaft with respect to the axis of rotation of the rotating grooved disc is varied from the horizontal position (zero degrees). The "east-west" oscillation of the pivotable yoke shaft causes the central cross assembly to which it is rotatably attached through the "east-west" short shafts to oscillate strictly and only around its "north-south" axis. Given an inclination angle of 1 degree, as the grooved disc rotates by 360 degrees it will cause the central cross assembly's "north-south" main shafts to oscillate by 4 degrees (from minus 1 degree to zero to plus 1 degree through zero to minus 1 degree). Since the two central cross assembly main shafts are opposed and their freewheels are equally opposed, one freewheel will positively engage the main output gear through the first 180 degrees of rotation of the grooved disc and the opposite freewheel will positively engage the main output gear through the other 180 degrees of rotation of the grooved disc thus producing rotary motion of the main output gear.

The Oscillating Horse Shoe

An assembly called the horse shoe transforms the pivotable yoke shaft's "north-south" oscillation to an "east-west" axial oscillation whose axis is co-planar to the central cross assembly's "north-south" main shaft axis, which it vertically intersects at the point of intersection of the central cross assembly's "north-south" and "east-west" shaft axes. The horse shoe is aligned in the "east-west" direction and includes a central hollow semi-circular section through which the pivotable yoke's shaft is slidably and rotatably mounted such that it can oscillate within such hollow section though a 60 degree or larger arc in the "east-west" direction. A pair of "east-west", radially opposed, protruding, co-axial main shafts are rigidly and vertically attached to the horse shoe's ends such that the ends of said two main shaft are rotatably housed in the embodiment's main frame in "east-west" alignment.

The two main shafts of the central cross assembly and the two main shafts of the horse shoe are thus co-planar, their theoretical extensions vertically intersecting each other at a point co-incidental to the point of intersection of the central cross assembly's main "north-south" shafts and short "east-west" shafts. Concentrically mounted on each of the horse shoe's "east-west" main shafts between the horse shoe legs and the main frame is a freewheel that carries a toothed gear concentrically mounted on its outer perimeter such that both freewheel gears are in turn continuously engaged with the same main output gear to which are engaged the two freewheel gears attached to the central cross assembly's main "north-south" shafts.

Instead of the oscillating horse shoe an oscillating ring assembly can be used in the double yoke embodiment such as is described under the "T-joint pivotably shaft embodiment" below. The oscillating ring assembly's inside diameter and longitudinal length would need to be slightly larger in order to avoid interfering with the shaft of the fixed yoke when the pivotable yoke shaft is gradually displaced out of alignment with respect to the grooved disc's axis of rotation.

In embodiments using central cross assemblies of the "rigid" type where the angle formed between its main shafts and short shafts is fixed at 90 degrees as described in detail under "T-joint pivotable shaft assembly embodiments" below, the plane shared by the common central axis of the pivotable yoke's "east-west" fork orifices and the pivotable yoke's shaft axis and the plane shared by the "east-west" central axis of the horse shoe's semi-circular section and the horse shoe's "east-west" main shaft axes exactly coincide only when the longitudinal axis of the grooved disc's arc shaped groove carrying the free end of the pivotable yoke shaft is perfectly aligned with the "east-west" or "north-south" axes of the main shafts of the central cross assembly and the horse shoe respectively. In all other intermediate positions assumed by the arc shaped groove's longitudinal axis while the grooved disc rotates, the two above said planes do not coincide. The outside dimensions of the pivotable yoke fork must therefore provide sufficient clearance with respect to the inside dimensions of the horse shoe's middle semi-circular section in order to allow for the above said plane misalignments. In addition the pivotable yoke shaft must be allowed to rotatably oscillate while sliding through the horse shoe's central hollow semi-circular arc. The above also applies for the oscillating ring assembly.

In embodiments using central cross assemblies of the "pivotable" type as described under "T-joint pivotable shaft assembly embodiments" below the above clearance restrictions need not apply.

Four Freewheel Double Yoke Arrangement

As the pivotable yoke shaft oscillates in the "north-south" direction it forces the horse shoe to which it is slidably and rotatably attached to oscillate strictly around the "east-west" axis of its two main "east-west" shafts. Given an inclination angle of 1 degree, as the grooved disc rotates by 360 degrees it will cause the horse shoe's "east-west" main shafts to oscillate by 4 degrees (from minus 1 degree to zero to plus 1 degree back through zero minus 1 degree). Since the horse shoe's two main shafts are opposed and their freewheels are equally opposed one freewheel will positively engage the main output gear through the first 180 degrees of rotation of the grooved disc and the opposite freewheel will positively engage the main output gear through the other 180 degrees of rotation of the grooved disc. The combination of the intermittent engagement of the main output gear by the horse shoe's two "east-west" freewheel gears and the cross assembly's two "north-south" freewheel gears set 90 degrees out of phase with each other will cause the main output gear to rotate in a continuous and very fluent motion since each freewheel will positively engage the main output gear for only 90 degrees per 360 degrees of grooved disc rotation before its neighboring freewheel takes over by similarity engaging the main output gear.

Six or More Freewheel Double Yoke Arrangement

As the pivotable yoke shaft's free end is rotatably displaced by the rotating grooved disc while simultaneously being "shifted" out of alignment with respect to the grooved disc's axis of rotation the pivotably yoke shaft's passage through space describes a cone whose apex is the central cross assembly's multi-directional center and whose base is the circle described by the motion of the pivotable yoke shaft's free end. The cone becomes thinner or fatter as the pivotable yoke shaft's free end is "shifted" into alignment or shifted out of alignment with respect to the rotating grooved disc's axis of rotation. In fact, the pivotable yoke shaft radially oscillates much like a pendulum around infinite axes of oscillation with respect to axis of rotation of the grooved disc. Accordingly, any number of opposed pairs of freewheels mounted on corresponding oscillating horse shoes or oscillating ring assemblies can be symmetrically positioned around the central cross assembly's main "north-south" shafts. Since all said horse shoes or ring assemblies are made to oscillate by the motion induced upon them by the pivotable and rotatably displaceable yoke shaft which is in turn slidably and rotatably fitted through the hollow arc shaped cut-out on each of them, If more than one such horse shoe or ring assembly is used each must be dimensioned such that one clears the other when they begin oscillating.

T-Joint Pivotable Shaft Assembly Embodiment Description

T-Joint Pivotable Shaft Assembly

In another of the preferred embodiments of the invention at least one T-joint pivotable shaft assembly is utilized preferably having a first rotatably mounted main shaft, a second pivotable and rotatably displaceable shaft pivotably mounted at the mid section of the first main shaft and a central cross assembly connecting the first main shaft to the second pivotable shaft. The first main shaft is rotatably mounted to the embodiment's main frame in "north-south" alignment thereby allowing it to pivot with respect to the main frame but not to be otherwise displaced. The first end of the second pivotable shaft is pivotably mounted to the mid point of the first main shaft through a central cross assembly while the second free end can be simultaneously pivoted and rotatably displaced through motions induced upon it (by the rotating grooved disc as described below) thereby causing it to oscillate on two axes (the "north-south" and "east-west" axes) with respect to the embodiment's main frame. Concentrically mounted on each of two opposed and equidistant sections of the "north-south" main shaft with respect to the main shaft's center is a "freewheel" (one way clutch) having a toothed gear concentrically mounted on its outer perimeter such that both said freewheel gears are in turn continuously and simultaneously engaged with a common main output gear which is rotatably attached to the rear frame of the embodiment and whose axis of rotation (when theoretically extended) passes through the central mid point of the first main shaft.

The Central Cross Assembly

The central cross assembly pivotably couples the second rotatably displaceable shaft to the first main shaft. This pivotably coupling can be arranged either through a "rigid" central cross assembly or through a "pivotable" central cross assembly. The following represent the preferred arrangements for each category.

Rigid Central Cross Assembly a) The opposed orifices of a yoke rigidly mounted to the first end of the second pivotable shaft are rotatably mounted to the ends of a pair of diametrically opposed coaxial stub shafts rigidly and vertically fixed to the mid point of the first main shaft.

b) The flattened first end of the second pivotable shaft is pivotably mounted to the first main shaft through a horizontal slot centrally located in the mid section of the first main shaft. The two shafts are held in place through a centrally located pin shaft that passes through two opposed vertical orifices centrally located on either side of the main shaft's horizontal slot and an intervening vertical orifice centrally located on the flattened first end of the second pivotable shaft.

Pivotable Central Cross Assembly c) The flattened central section of a short pivotable central shaft is rotatably fitted through a vertical slot centrally located in the mid section of the first main shaft by way of a pin shaft that passes through two opposed horizontal orifices centrally located on either side of the main shaft's vertical slot and an intervening horizontal orifice centrally located on the flattened section of the short central shaft.

A hollow rimmed cylindrical section is rigidly mounted to the first end of the second pivotable shaft such that the second pivotable shaft extends radially and vertically outward from such point of the cylindrical section's outer perimeter as lies at the mid point of the cylindrical section's length. The cylindrical section is in turn rotatably mounted to the ends of the said short pivotable central shaft by way of two diametrically opposed orifices lying on the cylindrical section's outer perimeter whose theoretical central axis intersects the cylindrical section's longitudinal axis vertically and shares the same plane with second pivotable shaft's axis.

d) A central pivotable cross assembly consisting of two parallel circular plates having central horizontal orifices perimetrically connected to each other by two vertically intervening parallel and diametrically opposed plates each fitted with a radially and outwardly protruding co-axial stub shaft is rotatably filled over the mid point of the first main shaft which is suitably "flange" shaped and is equipped with a central horizontal orifice. The central pivotable cross assembly and first main shaft are held in place by a pin shaft fitted through the orifices of the two parallel circular plates and the intervening central orifice of the first main shaft.

A hollow rimmed cylindrical section is rigidly mounted to the first end of the second pivotable shaft such that the second pivotable shaft extends radially and vertically outward from such point of the cylindrical section's outer perimeter as lies at the mid point of the cylindrical section's length. The cylindrical section is in turn rotatably mounted to the ends of the said central pivotable cross assembly by way of two diametrically opposed orifices lying on the cylindrical section's outer perimeter whose theoretical central axis intersects the cylindrical section's longitudinal axis vertically and is co-planar with second pivotable shaft's axis.

Rotating Grooved Disc Driven by Input Shaft & Pivot Arrangement of Pivotable Yoke Shaft The grooved disc consists of an outer flat face having a vertically mounted central shaft around which it symmetrically rotates and an inner concave face which is inwardly curved to follow the shape of a hemi-sphere or a spherical section thereof having a central arc shaped groove running radially through the entire diameter of its inner face surface. The grooved disc is rotatably driven by the power source and is rotatably mounted to the front frame of the embodiment through the central shaft of its outer face. The theoretical extension of the axis of rotation of the grooved disc passes through the central mid point of the first main shaft. A shoe rotatably fitted to the free end of the second pivotable shaft is slidably mounted in the arc shaped groove of the grooved disc's inner face such that while the grooved disc is rotating the second pivotable shaft can be smoothly displaced (shifted) throughout the length of the arc shaped groove from being perfectly aligned with the grooved disc's central shaft until it is 30 degrees or over out of alignment with said central shaft.

There exist a variety of displacement (shifting) methods as concerns the second pivotable shaft. A preferred displacement (shifting) method of the second pivotable shaft is achieved by causing a threaded shaft which is vertical to the grooved disc's axis of rotation and runs through the entire diameter of the rotating grooved disc within its own straight squared cross-section groove which lies directly behind and is radially aligned with the arc shaped groove to rotate in either direction thereby forcing a carriage which is threadably mounted to the threaded shaft and whose outer body is slidably mounted in the squared cross-section groove to slide up or down the squared cross-section groove. Since the sliding shoe, rotatably mounted to the free end of the second pivotable shaft and slidably fitted within the arc shaped groove, is connected with the threadably mounted carriage through one or a set of pivotable bracket arms the rotation of the threaded shaft will cause the threadably mounted carriage to shift thereby forcing the second pivotable shaft to be gradually displaced out of alignment with respect to the grooved disc's central shaft. For balancing purposes half the length of the threaded shaft could be threaded in one direction and the other half in the other direction. The thread pitches of these sections need not be identical. The threadably mounted carriage would occupy one section while a counter-weight carriage would occupy the other section. As the threaded shaft is rotated in one direction the threadably mounted carriage and the threadably mounted counter-weight carriage would move apart while as the threaded shaft is rotated in the opposite direction they would move together thus allowing static and dynamic counter-balancing of the entire system.

Two Freewheel Arrangement

The second pivotable shaft is caused to oscillate around the "north-south" and "east-west" axes of the central cross assembly when its inclination angle with respect to the axis of rotation of the rotating grooved disc is varied from the horizontal position (being zero degrees). The "east-west" oscillation of the second pivotable shaft causes the first main shaft to which it is rotatably attached through the "east-west" short or stub shafts to oscillate strictly and only around its "north-south" axis. Given an inclination angle of 1 degree, as the grooved disc rotates by 360 degrees it will cause the first main shaft to oscillate by 4 degrees (from minus 1 degree through plus 1 degree back to minus 1 degree). Since the first main shaft's freewheels are opposed one freewheel will positively engage the main output gear through the first 180 degrees of rotation of the grooved disc and the opposite freewheel will positively engage the main output gear through the other 180 degrees of rotation of the grooved disc thus producing rotary motion of the main output gear.

The Oscillating Ring Assembly

The ring assembly transforms the second pivotable shaft's "north-south" oscillation to an "east-west" axial oscillation whose axial center shares the same plane with the first main shaft's "north-south" axis which it vertically intersects at its central mid point. The oscillating ring assembly can be either of a semi-circular type such as the oscillating horse shoe described previously or of a circular type as described below.

The preferred ring assembly consists of an outer cylindrical hollowed body having two outwardly and radially protruding diametrically opposed "east-west" main shafts rigidly fixed at the mid longitudinal length position of the said cylindrical body and aligned in the "east-west" direction. The outer cylindrical body has a perimetrical arc shaped slot cut-out (such arc covering approximately 60 degrees or more) equidistantly situated between the "east-west" main shafts and whose longitudinal center-line shares the same plane with the "east-west" main shafts. The second pivotable shaft is filled through the arc shaped slot which faces the front frame of the embodiment. The ends of the two "east-west" main shafts are rotatably housed in the embodiment's main frame in "east-west" alignment. The first "north-south" main shaft and the two "east-west" main shafts share the same plane and their theoretical extensions vertically intersect each other at the central mid point of the first main shaft.

Concentrically mounted on opposed sections of each of the ring assembly's "east-west" main shafts which are also equidistant from the ring assembly's theoretical center is a "freewheel" (one way clutch) which carries a toothed gear concentrically mounted on its outer perimeter such that both freewheel gears are in turn continuously and simultaneously engaged with the same main output gear with which the two freewheel gears of the first "north-south" main shaft are engaged.

Second pivotable shafts designated for "rigid cross assemblies" are fitted through the hollowed body of the outer cylindrical oscillating ring assembly by way of a further rimmed inner cylindrical body which is rotatably fitted within the outer cylindrical hollowed body by way of conical thrust bearings or other such devices and is equipped with a centrally positioned orifice which is aligned with the arc shaped slot cut-out of the outer cylindrical hollowed body through which orifice the second pivotable shaft is rotatably fitted.

Second pivotable shafts designated for "pivotable cross assemblies" are rotatably fitted through the hollowed body of the outer cylindrical oscillating ring assembly by way of the hollow rimmed cylindrical section rigidly mounted to their first ends through conical thrust bearings or other such devices such that the second pivotable shaft is aligned with and slidably fitted through the arc shaped slot cut-out of the oscillating ring's outer cylindrical hollowed body.

Four Freewheel T-Joint Arrangement

As the second pivotable shaft oscillates in the "north-south" direction it forces the oscillating ring assembly through which it is rotatably filled to oscillate strictly around the "east-west" axis of its two main "east-west" shafts. Given an inclination angle of 1 degree, as the grooved disc rotates by 360 degrees it will cause the oscillating ring assembly's "east-west" main shafts to oscillate by 4 degrees (from minus 1 degree through plus 1 degree back to minus 1 degree). Since the oscillating ring assembly's two main "east-west" shafts are opposed and their freewheels are equally opposed one freewheel will positively engage the main output gear through the first 180 degrees of rotation of the grooved disc and the opposite freewheel will positively engage the main output gear through the other 180 degrees of rotation of the grooved disc. The combination of the intermittent engagement of the main output gear by the oscillating ring assembly's two "east-west" freewheel gears and the first main shaft's two "north-south" freewheel gears set 90 degrees out of phase with each other will cause the main output gear to rotate in a continuous and very fluent motion.

Six or More Freewheel T-Joint Arrangement

As the second pivotable shaft's free ends is rotatably displaced by the rotating grooved disc while simultaneously being "shifted" out of alignment with respect to the grooved disc's axis of rotation the second pivotable shaft's passage through space describes a cone whose apex is the central cross assembly's multidirectional center and whose base is the circle described by the motion of the second pivotable shaft's free end. The cone becomes thinner or fatter as the second pivotable shaft's free end is "shifted" into alignment or shifted out of alignment with respect to the rotating grooved disc's axis of rotation. In fact, the second pivotable shaft radially oscillates much like a pendulum around infinite axes of oscillation with respect to axis of rotation of the grooved disc. Accordingly, any number of opposed pairs of freewheels mounted on corresponding oscillating horse shoes or oscillating ring assemblies can be symmetrically positioned around the central cross assembly's main "north-south" shafts. Since all said horse shoes or ring assemblies are made to oscillate by the motion induced upon them by the second pivotable and rotatably displaceable shaft which is in turn slidably and rotatably fitted through the hollow arc shaped cut-out on each of them, if more than one such horse shoe or ring assembly is used each must be dimensioned such that one clears the other when they begin oscillating.

Figure 1A:
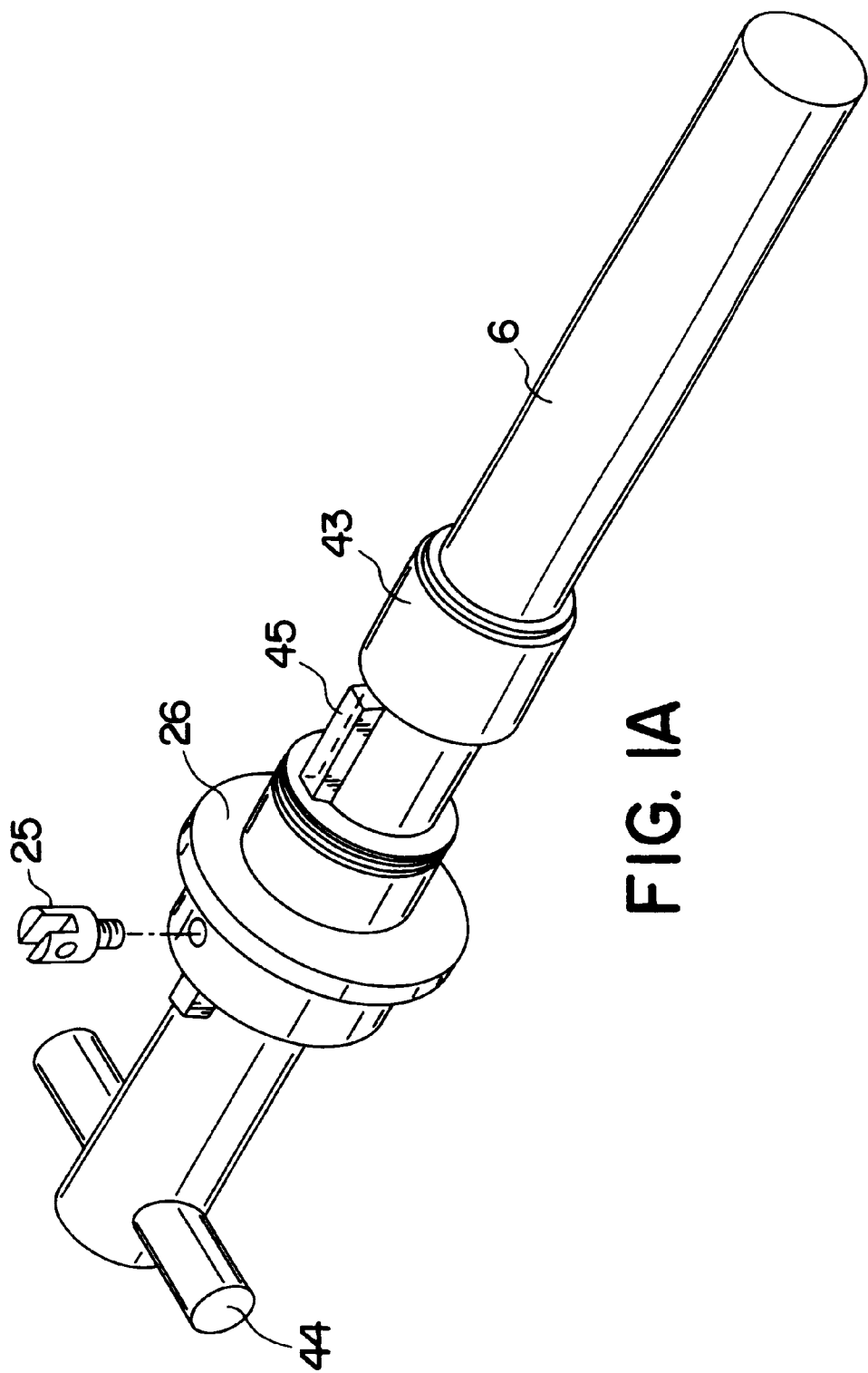
FIGS. 1 through (8B) relate to one preferred embodiment utilizing the Swash Plate Assembly.
Figure 2:
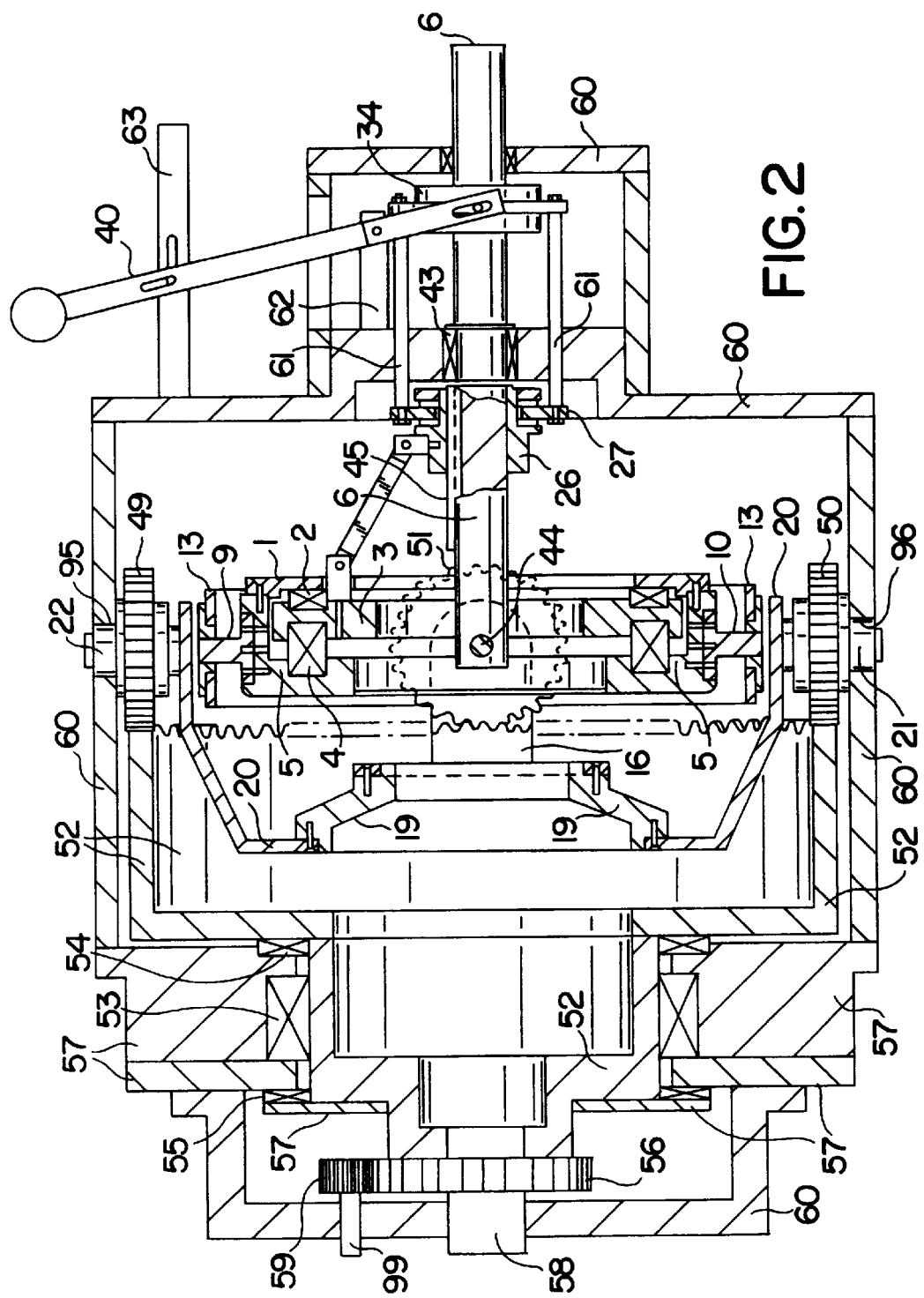
Figure 3A:
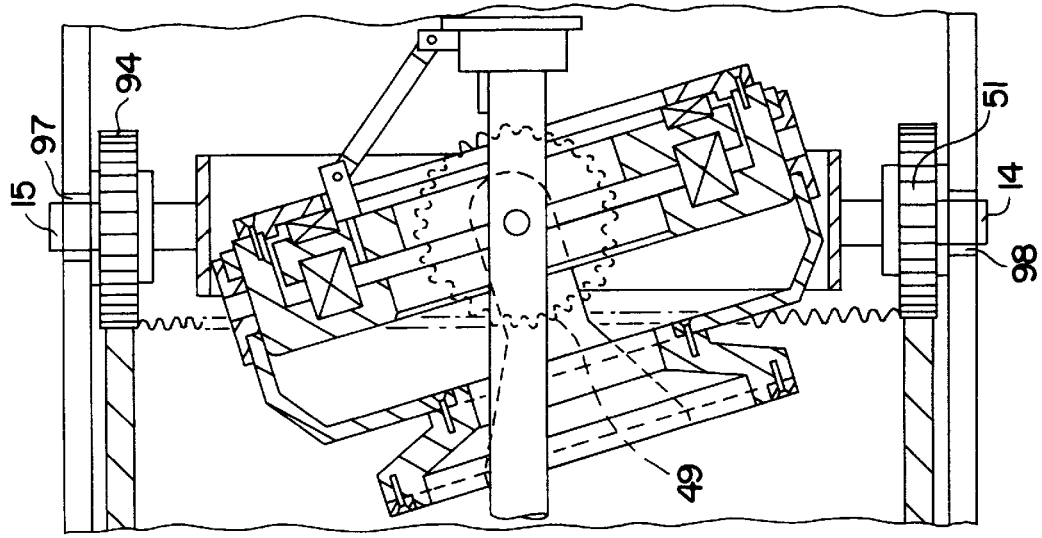
Figure 3:
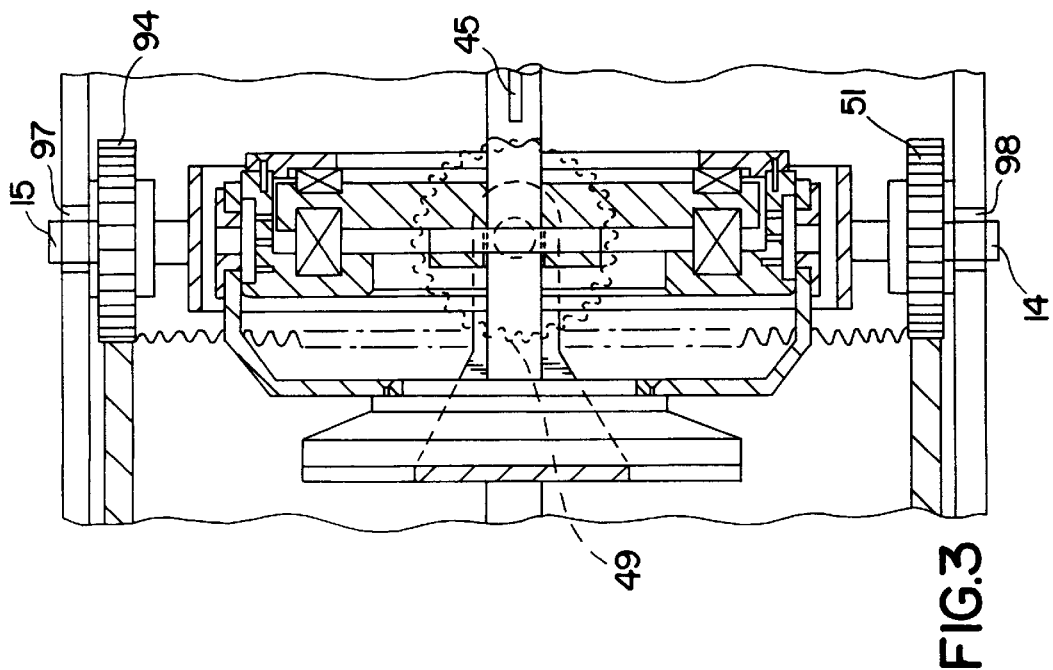
Figure 4:
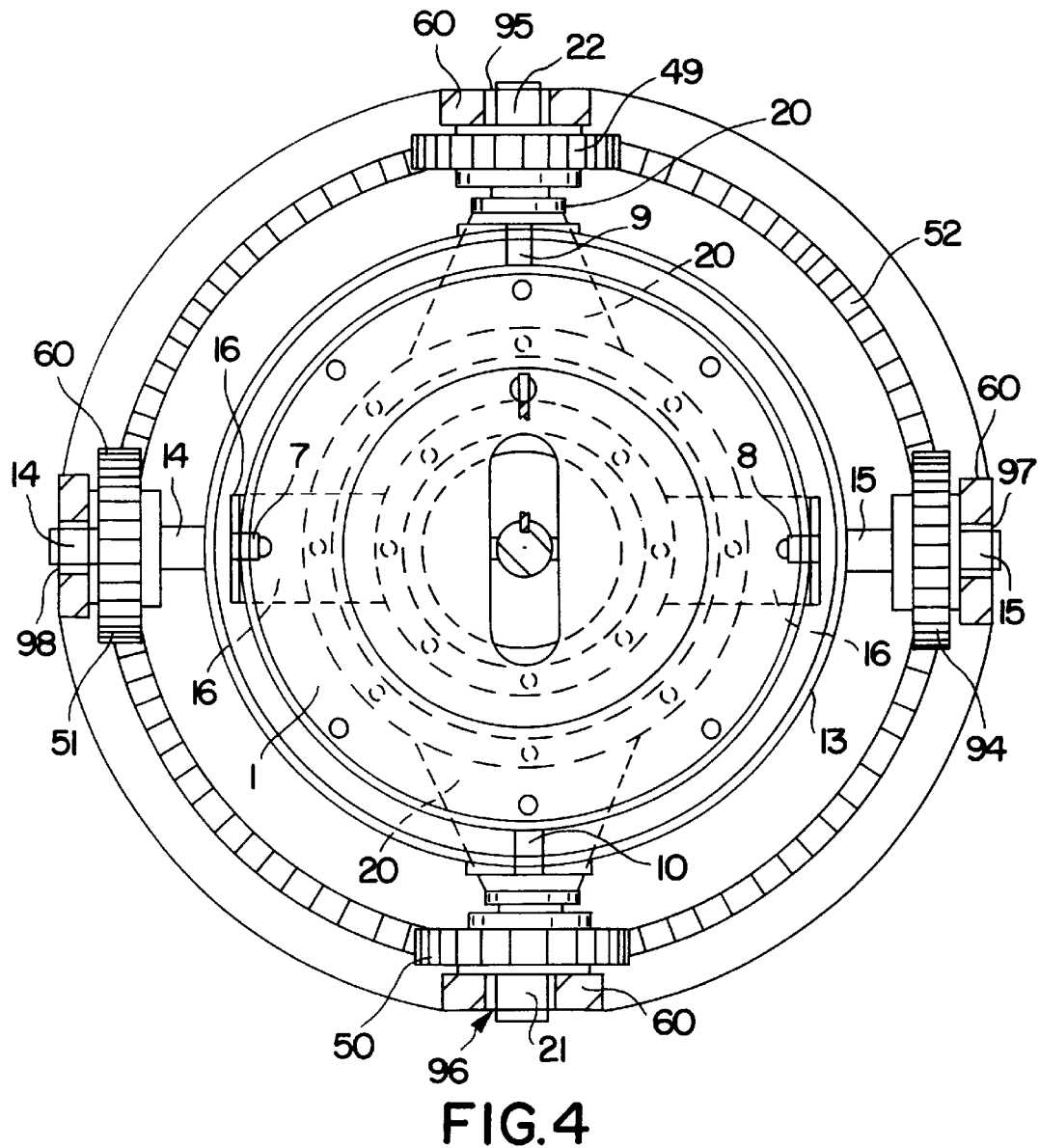
Figure 6:
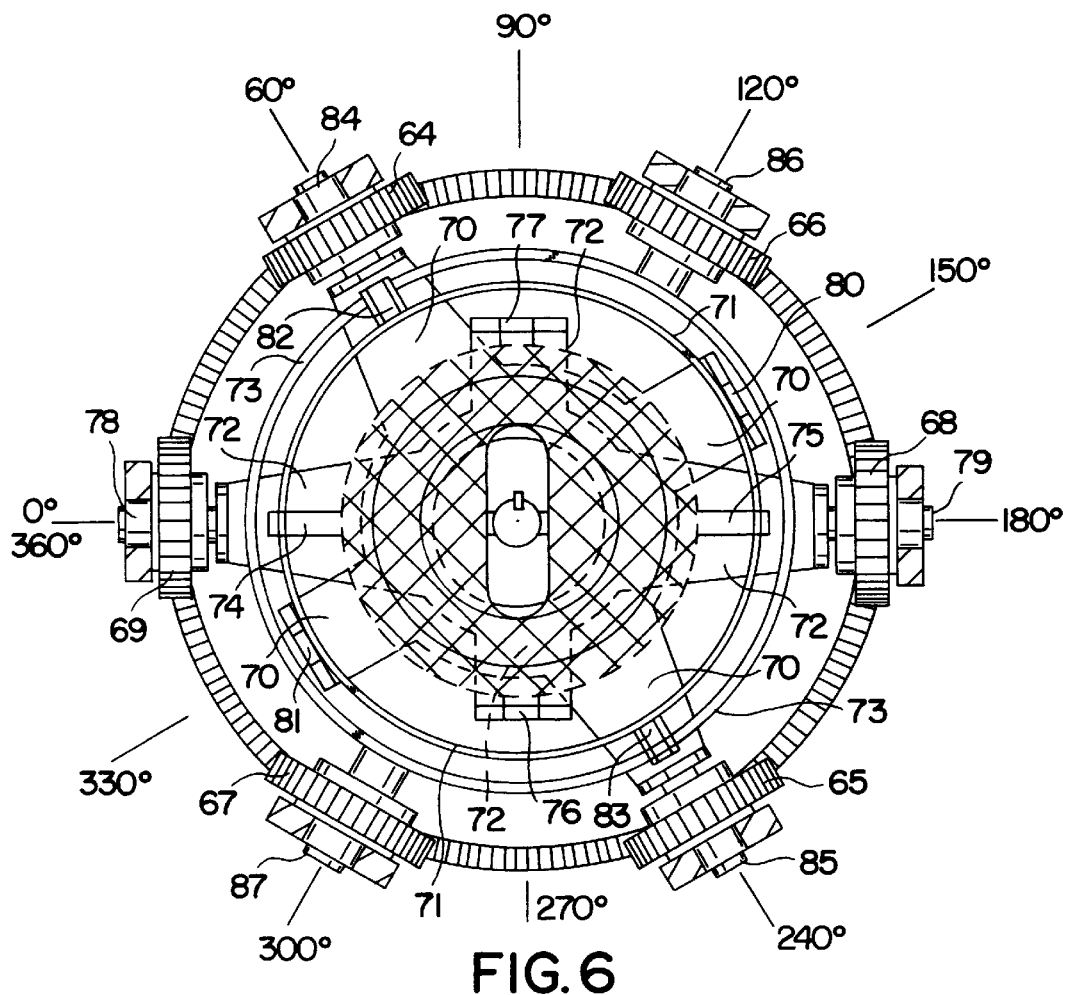
Figure 8A:
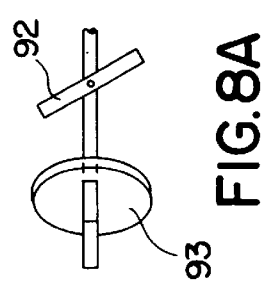
Figure 8B:
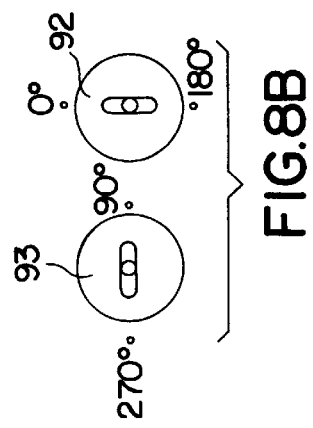
Figure 8:
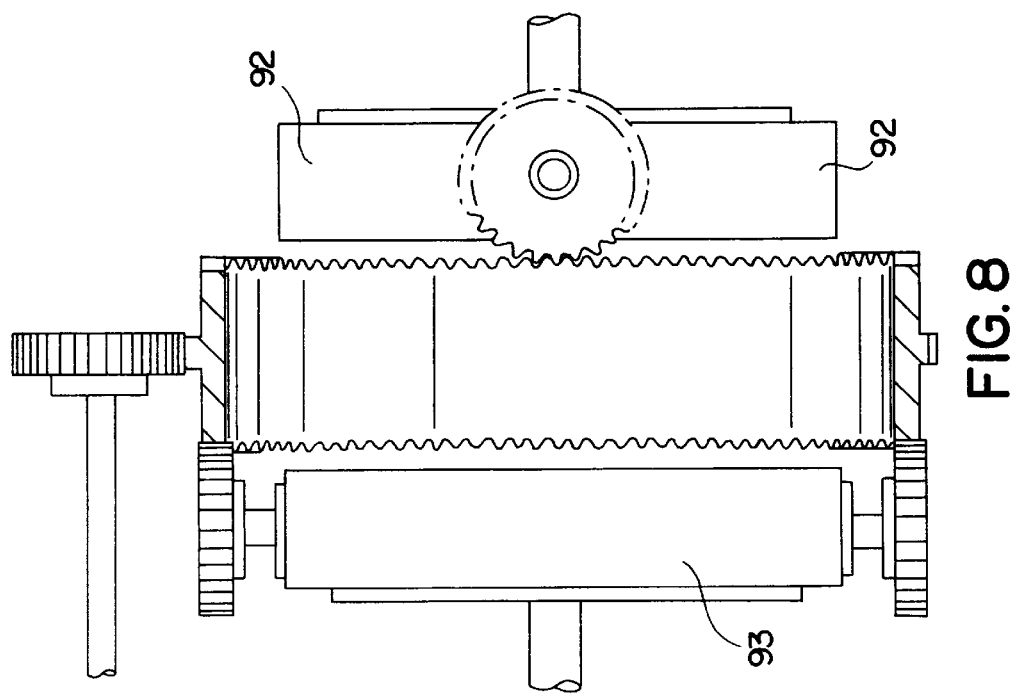
Figure 9:
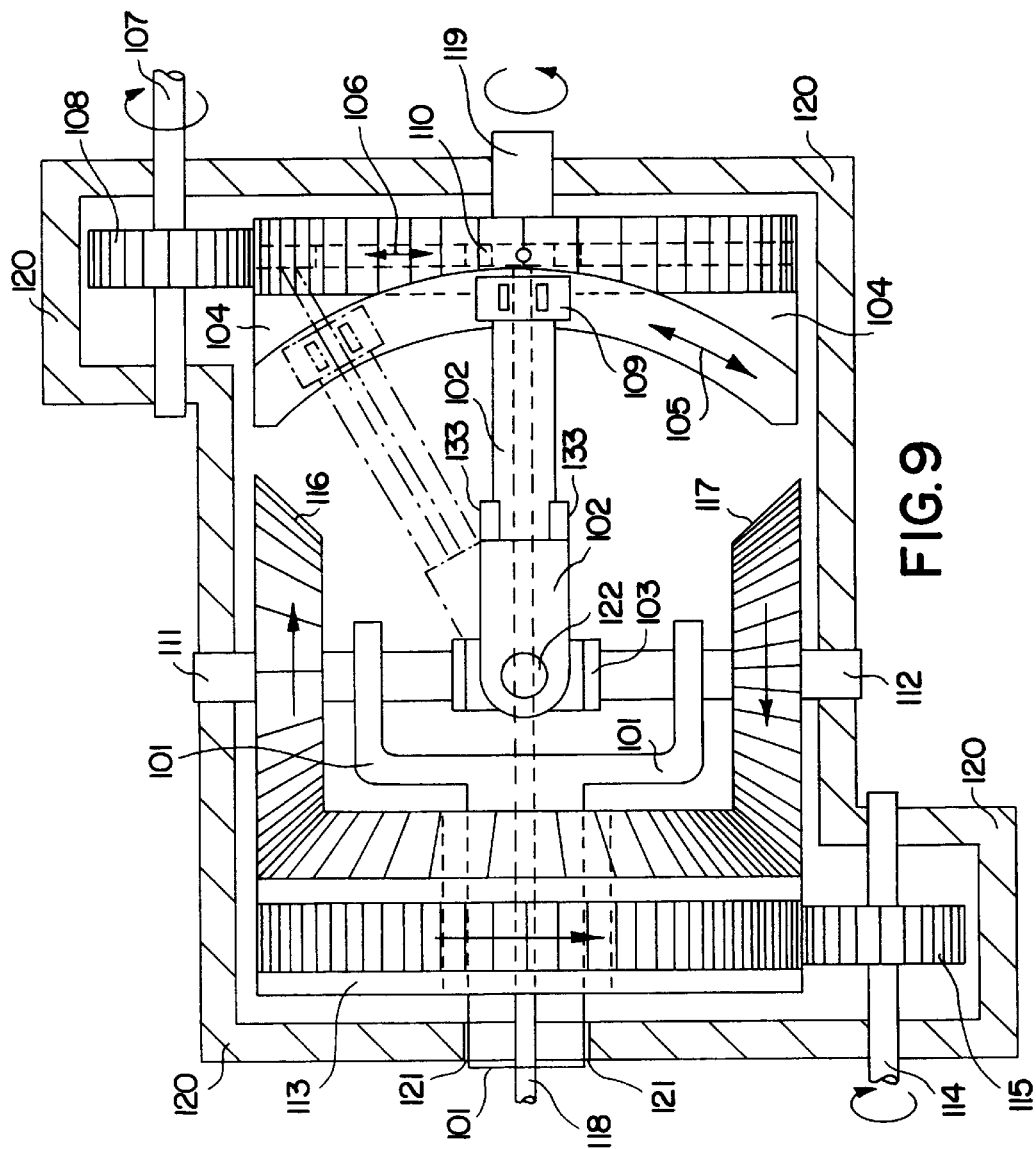
Figure 10:
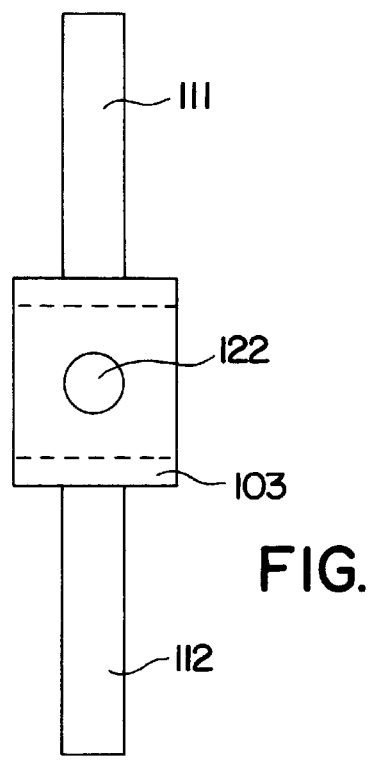
Figure 10A:
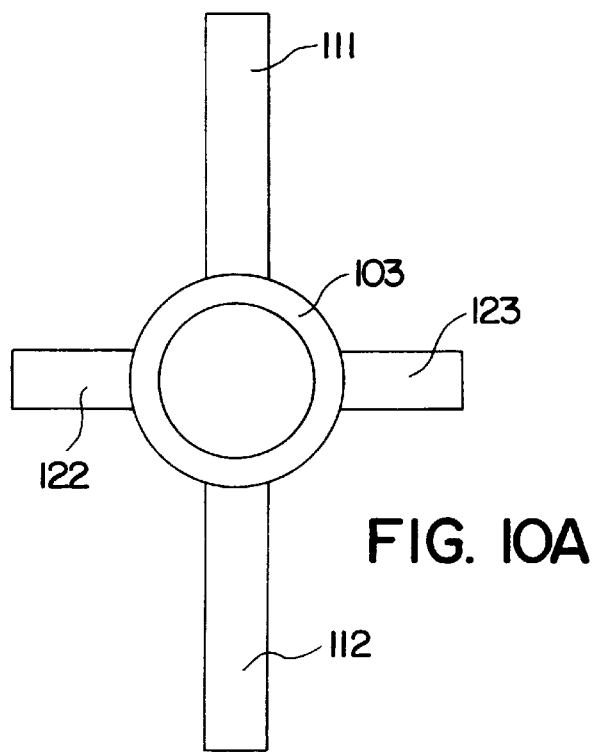
Figure 11:
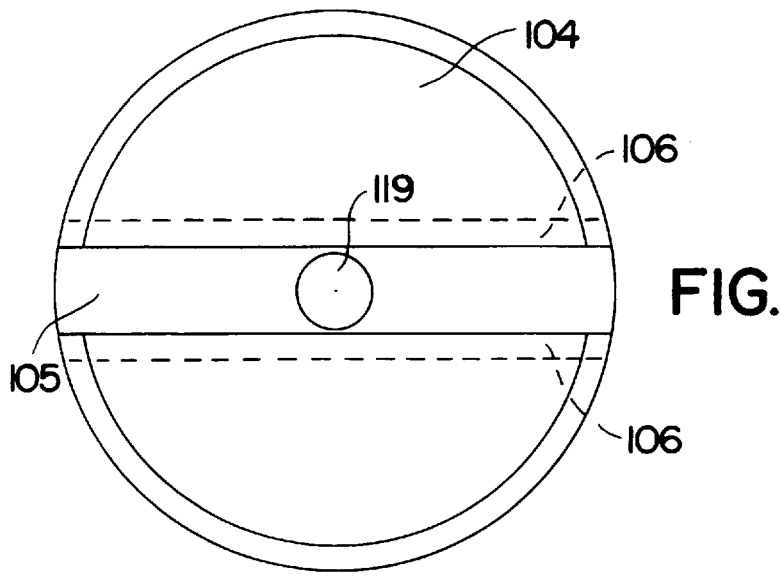
Figure 11A:
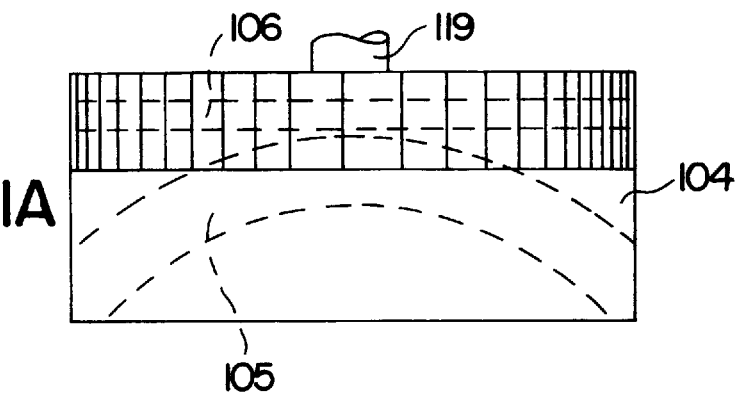
Figure 11B:
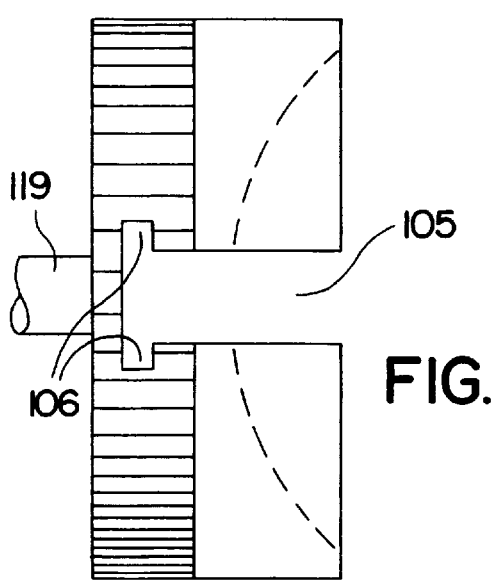
Figure 15:
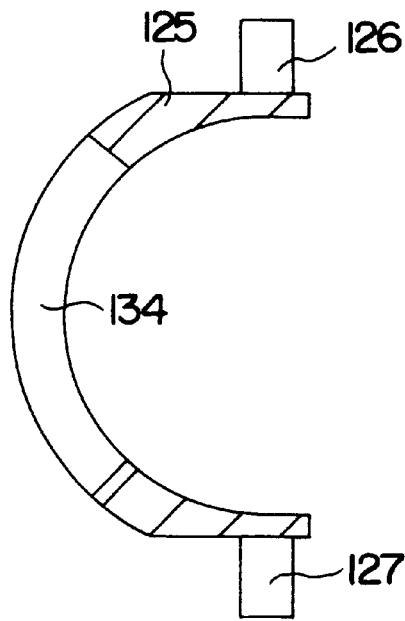
Figure 15A:
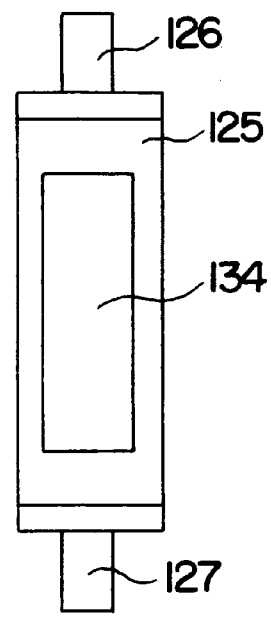
Figure 15B:
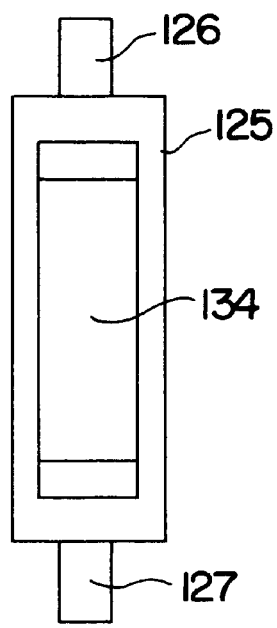
Figure 15C:
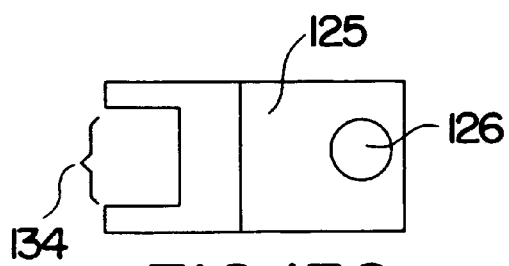
Figure 17:
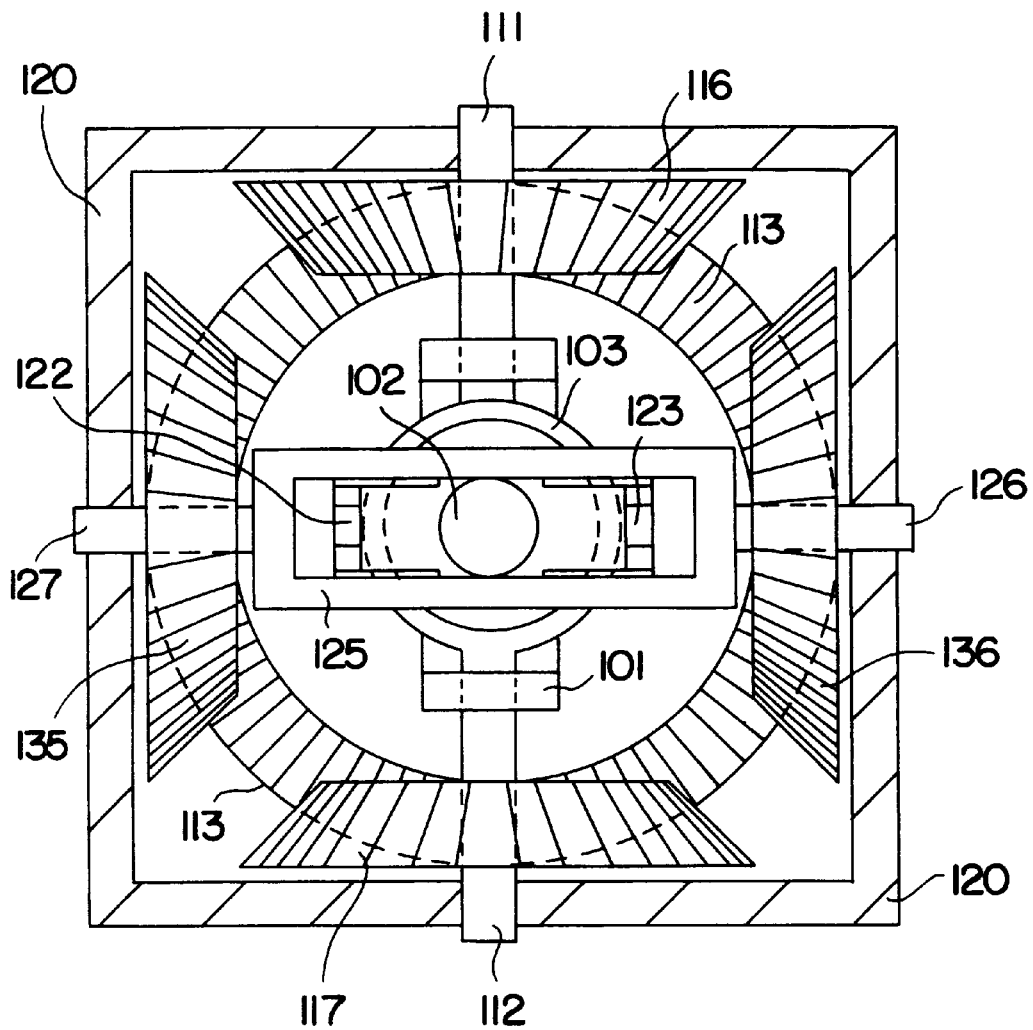
Figure 18:
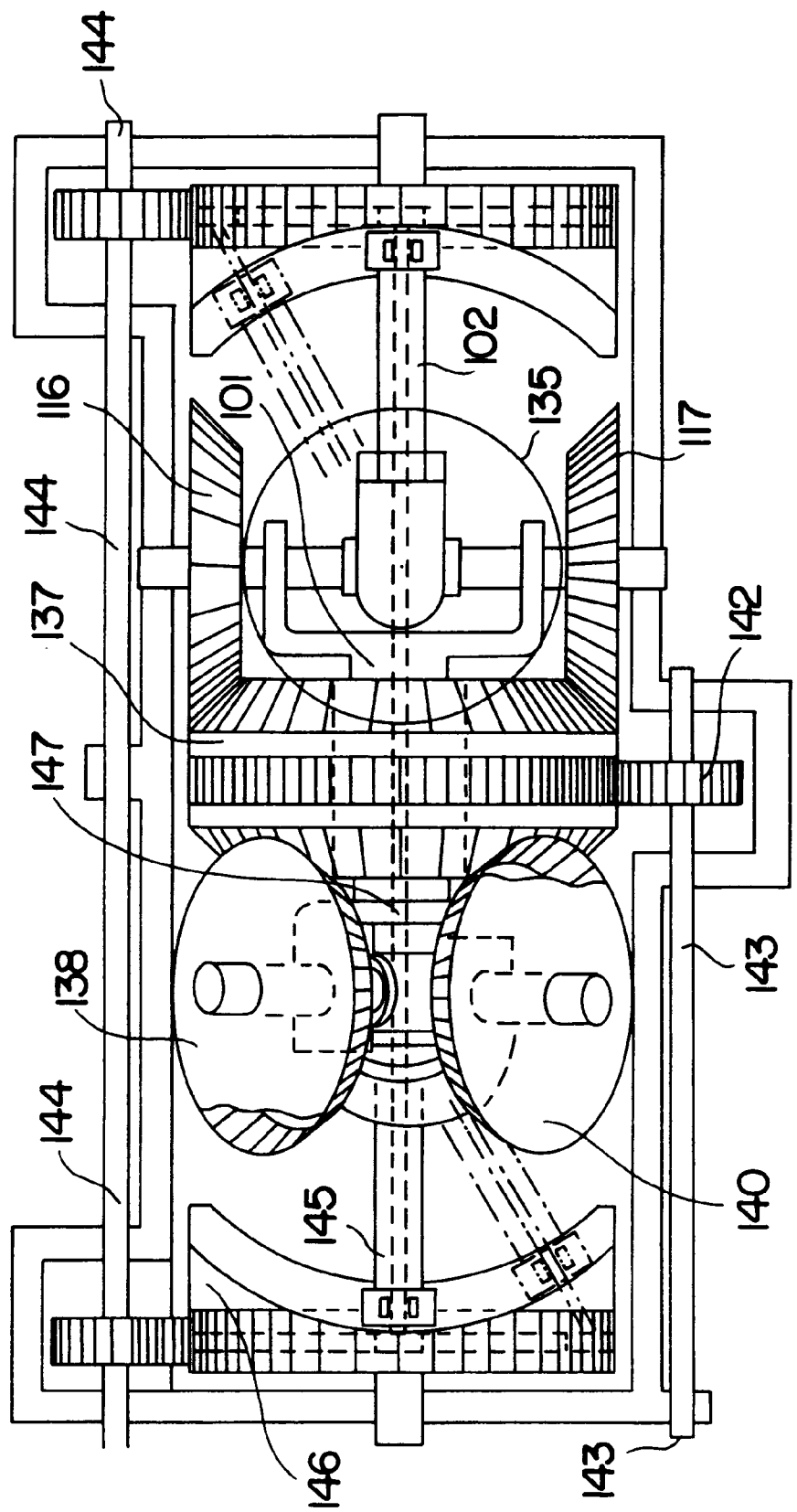
Figure 19:
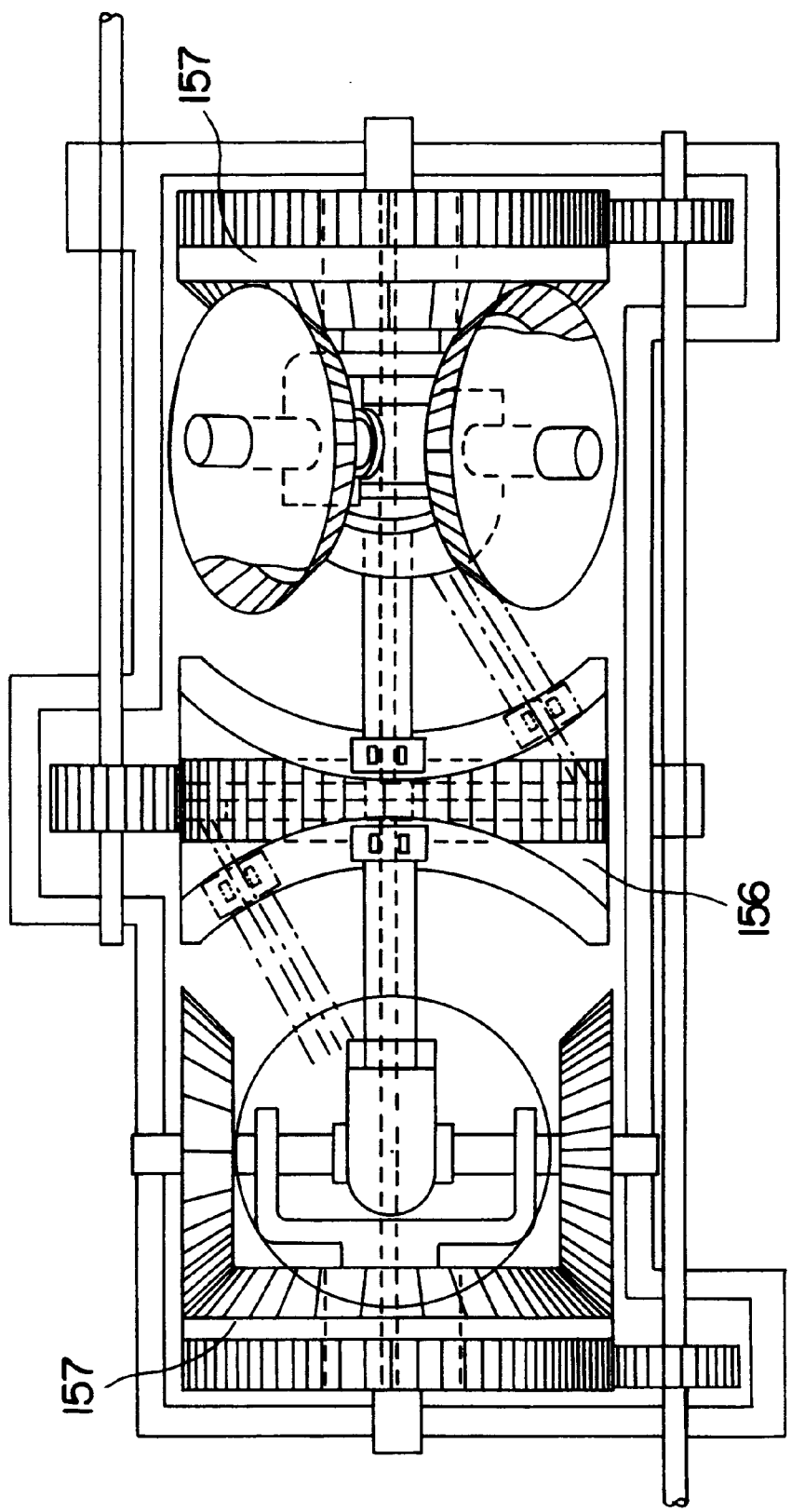
Figure 20:
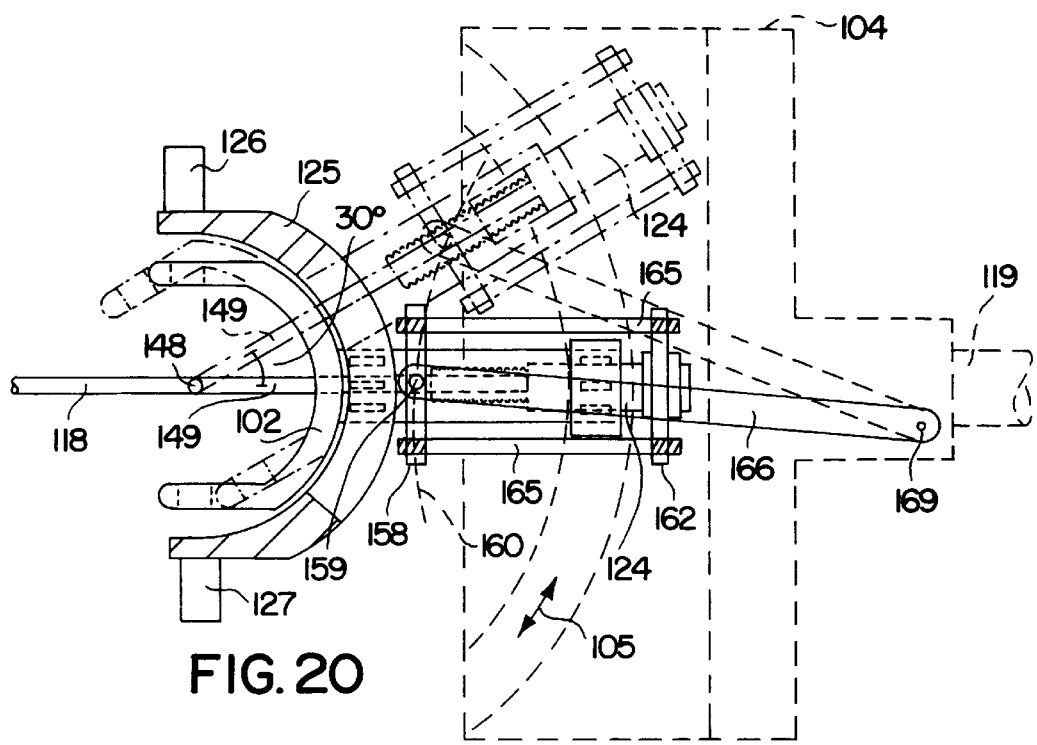
Figure 20A:
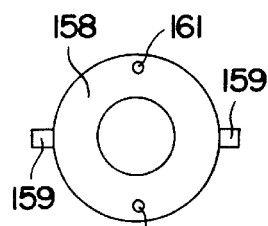
Figure 20B:
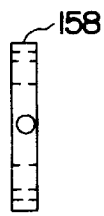
Figure 20C:
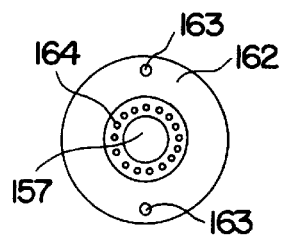
Figure 20D:
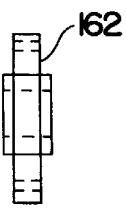
Figure 20E:
Figure 20F:
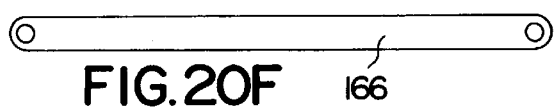
Figure 20G:
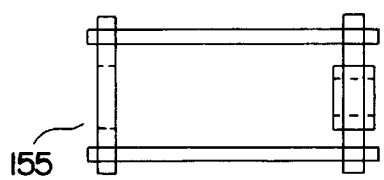
Figure 22:
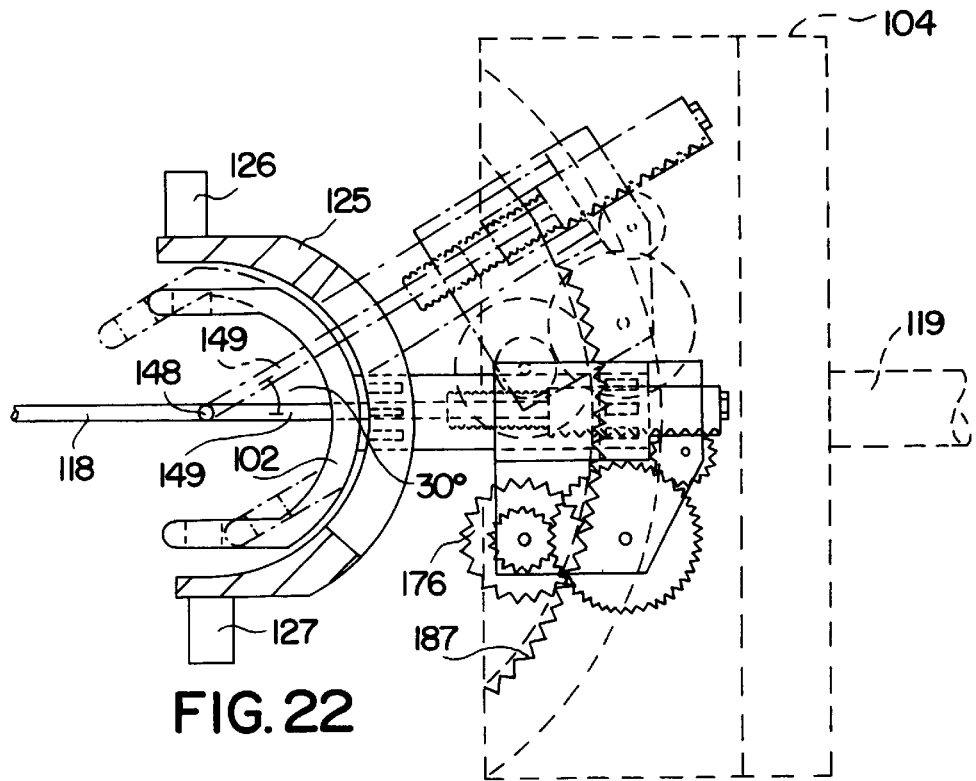
Figure 22A:
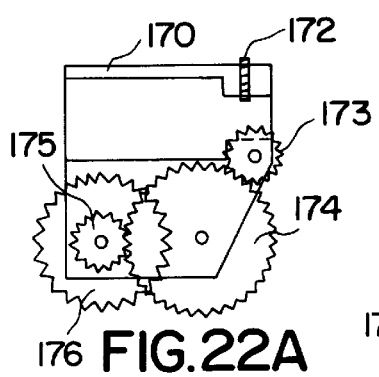
Figure 22B:
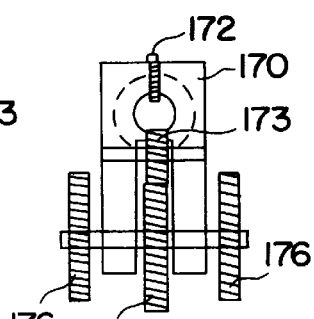
Figure 22C:
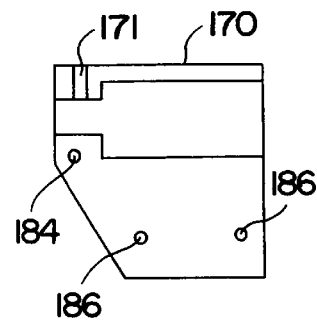
Figures 22D, 22E:
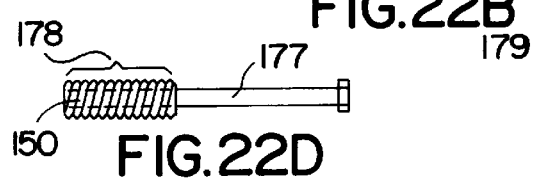
Figure 22F:
Figure 22G:
Figure 23:
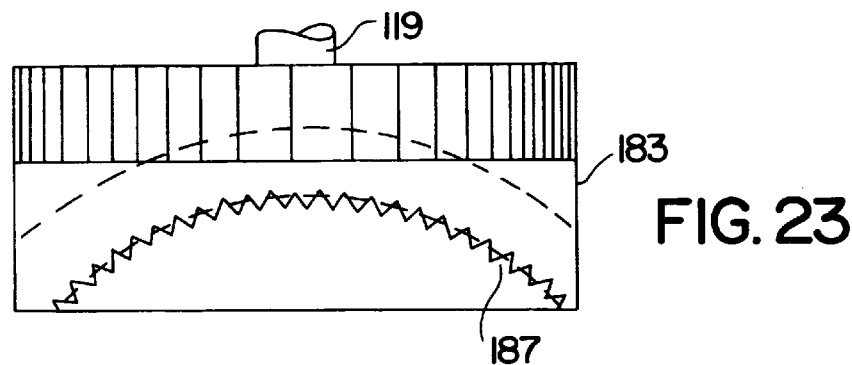
Figure 23A:
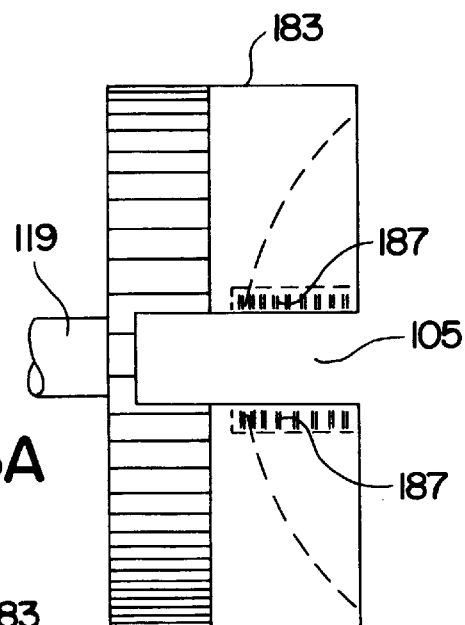
Figure 23B:
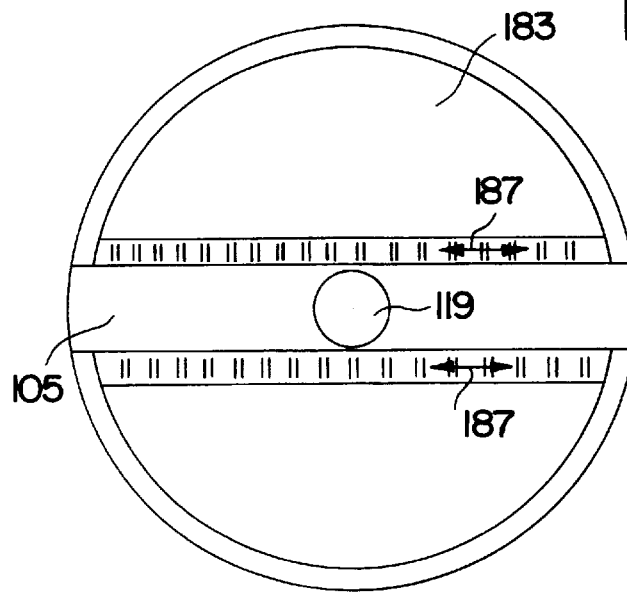
Figure 25:
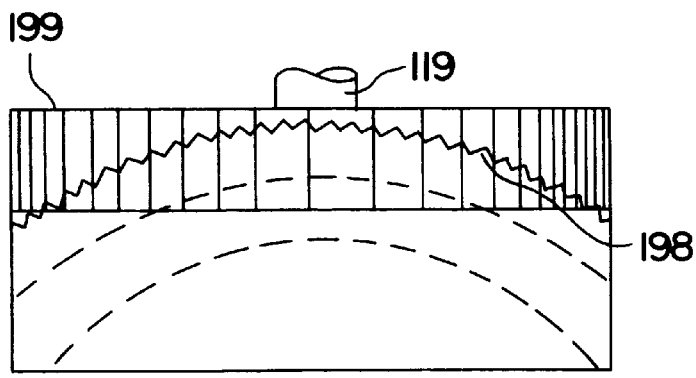
Figure 25A:
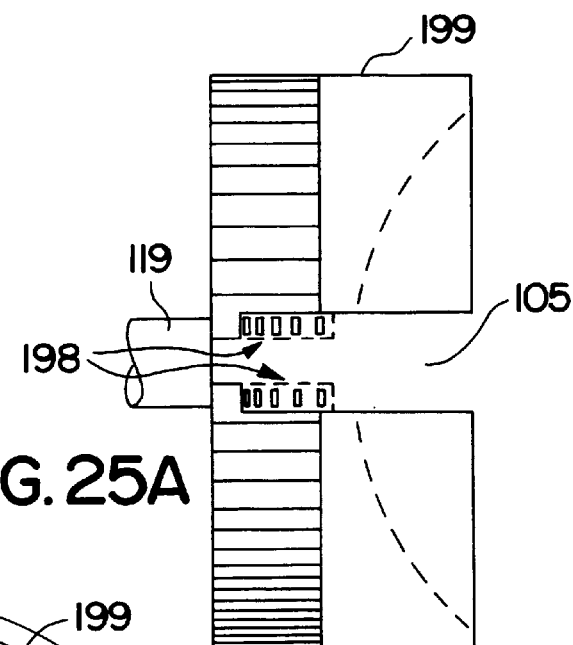
Figure 25B:
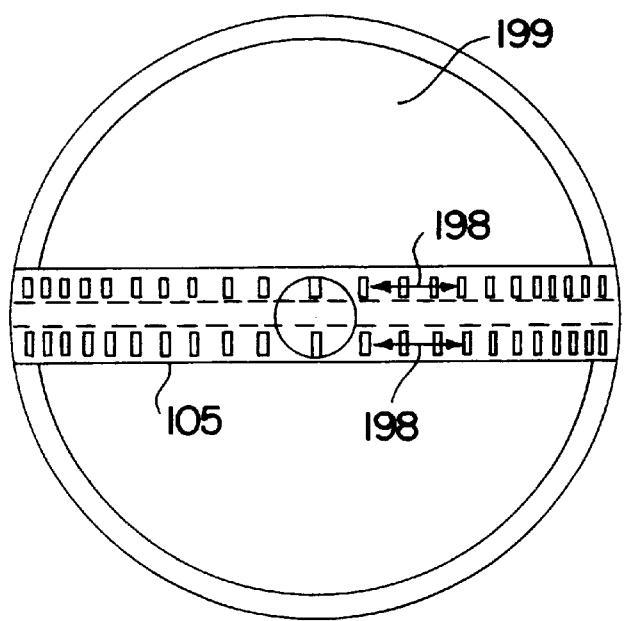
Figure 27:
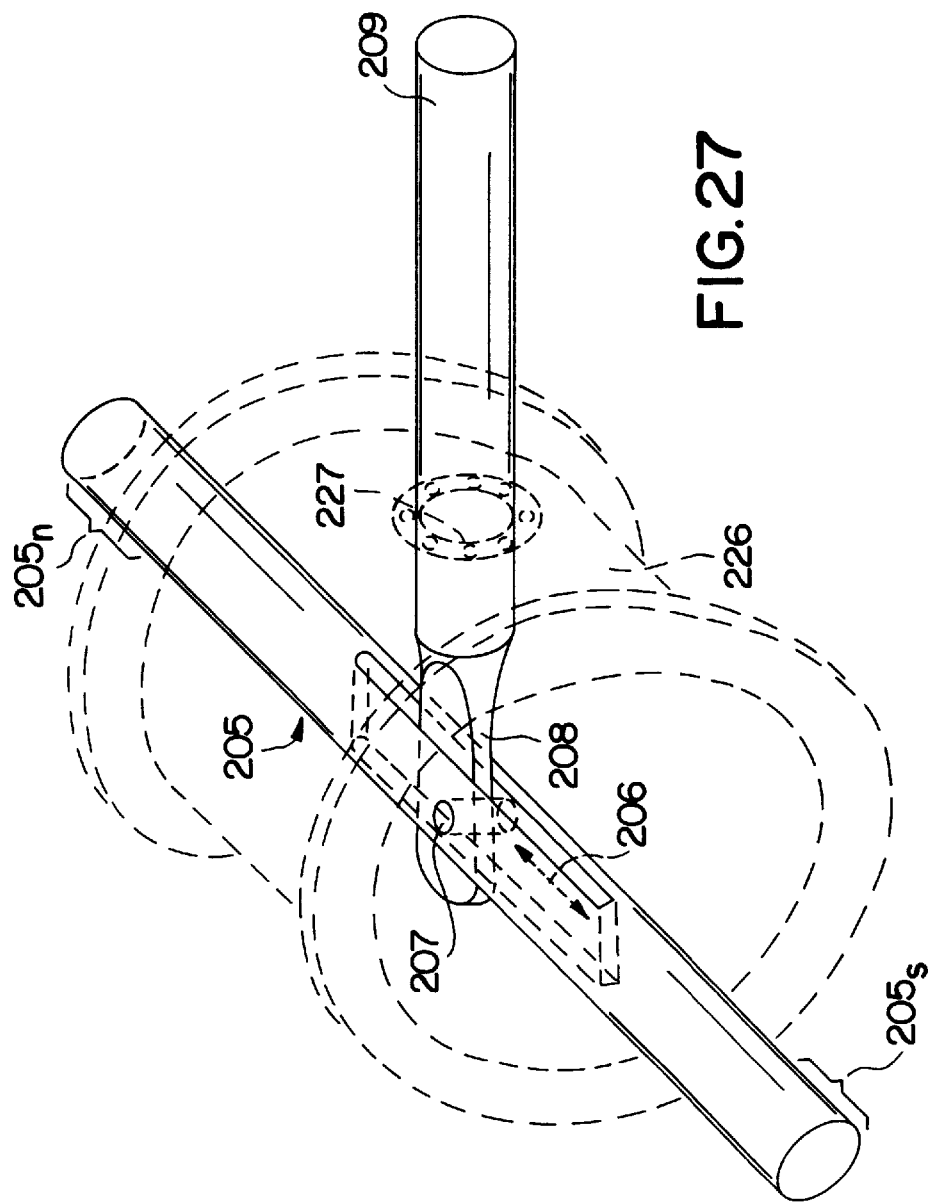
Figure 32:
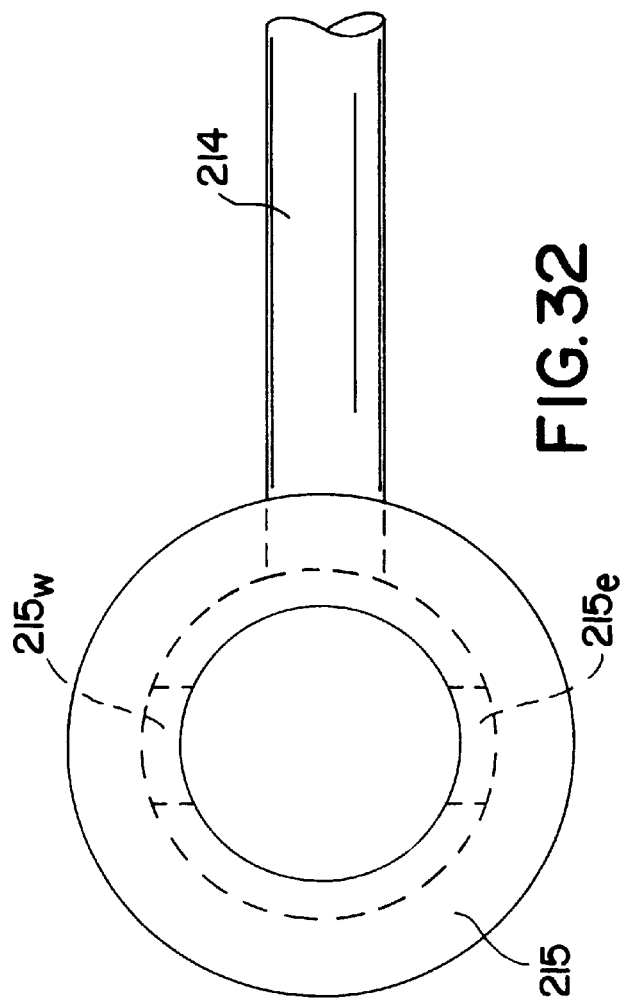
Figure 32A:
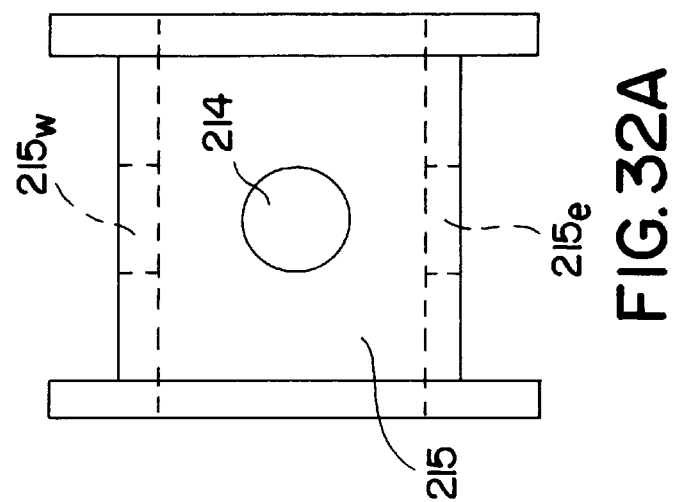
Figure 35:
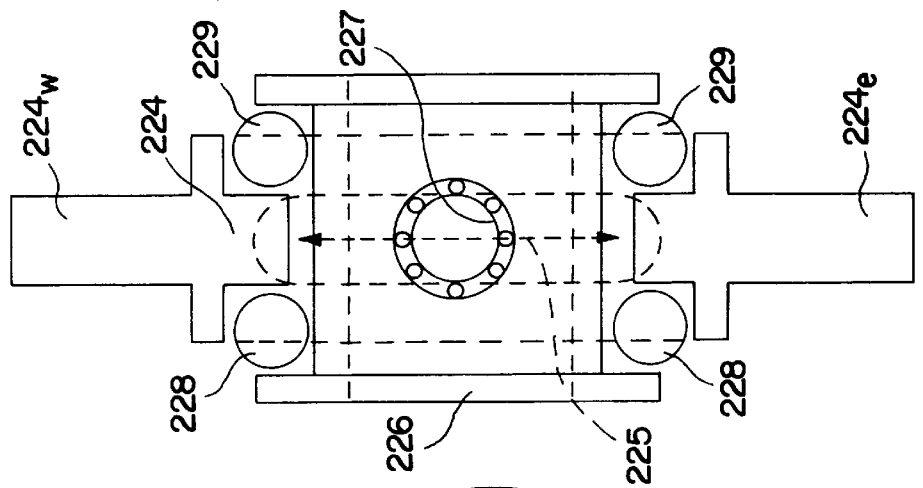
Figure 34:
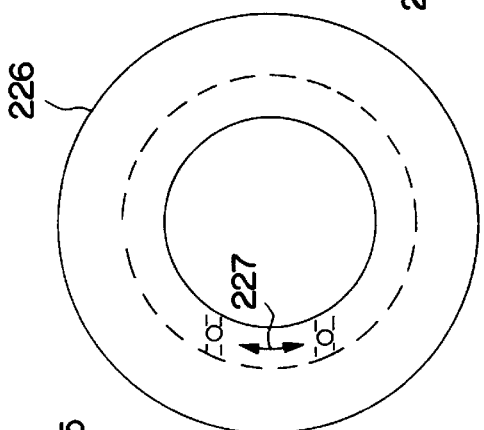
Figure 33:
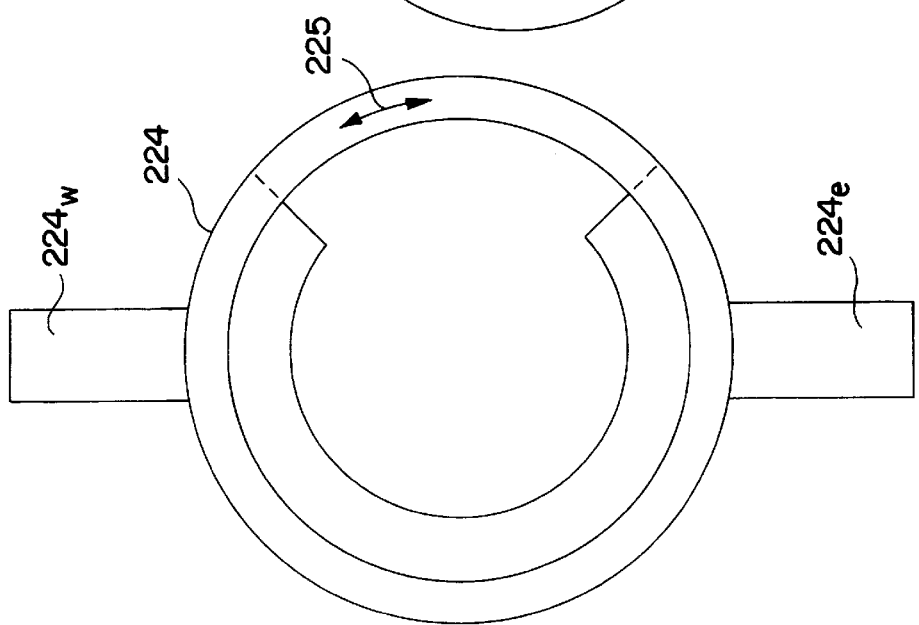
Figure 36:
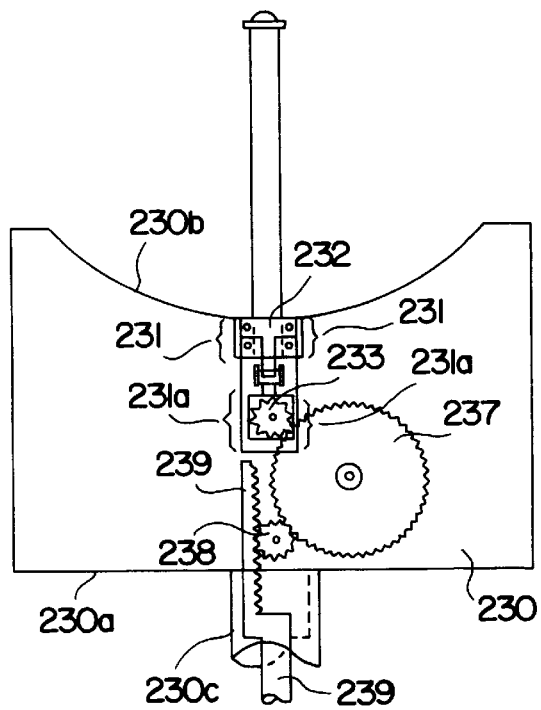
Figure 36A:
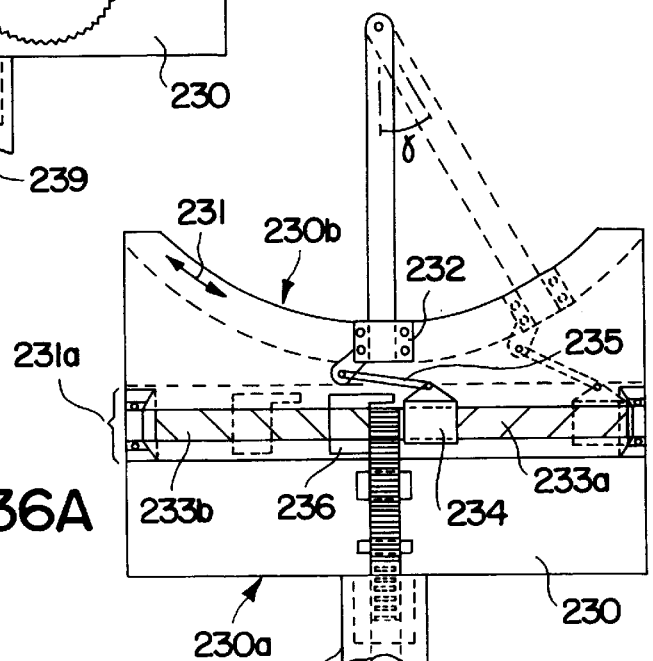
Figure 36B:
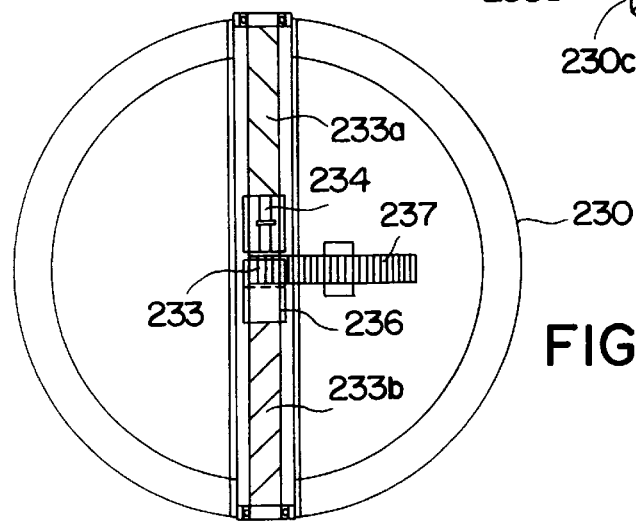
Figure 38:
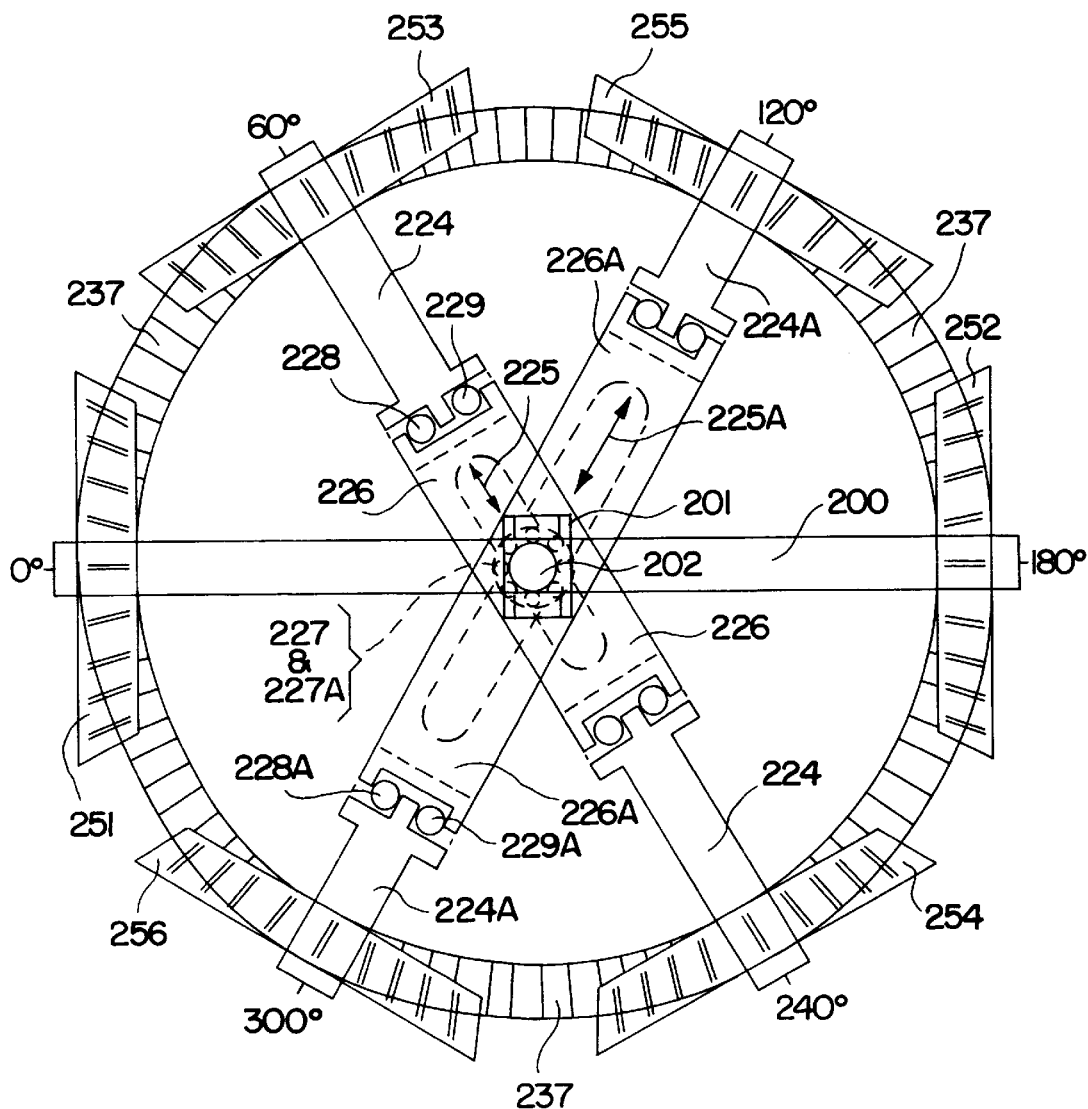

FIG. (1) is an exploded view of the swash plate assembly coupled to the outer ring and the spider including the input shaft and the parts associated with the shifting mechanism.

FIG. (1A) is an exploded view of the input shaft assembly including some elements of the swash plate pivoting mechanism.

FIG. (1B) is an exploded view of the front side of the swash plate assembly's circular rotating portion.

FIG. (1c) is an exploded view of the back side of the swash plate assembly's circular ratating portion.

FIG. (2) is a schematic side view of the cross section of the entire assembled four freewheel single swash plate embodiment wherein the four freewheels are 90 degrees out of phase with each other and the applied swash plate inclination angle is set at zero degrees off the vertical.

FIG. (2A) is a schematic side view of the cross section of the entire assembled four freewheel single swash plate embodiment having an applied swash plate inclination angle while the shifting linkage connecting the input shaft to the swash assembly's inner rotating portion is facing north.

FIG. (3) is a schematic top view of the cross section of the swash plate and freewheel assembly of the four freewheel single swash plate embodiment with the applied swash plate inclination angle set at zero degrees off the vertical.

FIG. (3A) is a schematic top view of the cross section of the swash plate and freewheel assembly of the four freewheel single swash plate embodiment having an applied swash plate inclination angle while the shifting linkage connecting the input shaft to the swash assembly's inner rotating portion is facing east.

FIG. (4) is a schematic front view of the cross section of the swash plate and freewheel assembly of the four freewheel single swash plate embodiment with the applied swash plate inclination angle set at zero degrees off the vertical.

FIG. (5) is a schematic front view of the cross section of the swash plate and freewheel assembly of the two freewheel single swash plate embodiment with the applied swash plate inclination angle set at zero degrees off the vertical.

FIG. (5A) is a schematic side view of the cross section of the swash plate and freewheel assembly of the two freewheel single swash plate embodiment with the applied swash plate inclination angle set at zero degrees off the vertical.

FIG. (6) is a schematic front view of the cross section of the swash plate and freewheel assembly of the six freewheel single swash plate embodiment including two outer rings and two spiders with the applied swash plate inclination angle set at zero degrees off the vertical.

FIG. (7) is a schematic side view of two opposed sets of the four freewheel swash plate assembly set 45 degrees out of phase with each other wherein the four freewheels of the left swash plate assembly set engage the left side of a common main output gear and the four freewheels of the right swash plate assembly set engage the right side of the common main output gear.

FIG. (7A) is a schematic side view of the inner circular rotating portions of the swash plate assemblies of FIG. (7) showing their 45 degree out of phase mounting to the common input shaft.

FIG. (7B) is a schematic front view of the inner circular rotating portions of FIG. (7A) showing their 45 degree out of phase mounting to the common input shaft.

FIG. (8) is a schematic side view of two opposed sets of the two freewheel swash plate assembly set 90 degrees out of phase with each other wherein the two freewheels of the left swash plate assembly set engage the left side of a common main output gear and the two freewheels of the right swash plate assembly set engage the right side of the common main output gear.

FIG. (8A) is a schematic side view of the inner circular rotating portions of the swash plate assemblies of FIG. (8) showing their 90 degree out of phase mounting to the common input shaft.

FIG. (8B) is a schematic front view of the inner circular rotating portions of FIG. (8A) showing their 90 degree out of phase mounting to the common input shaft.

FIGS. (9) through (25B) relate to one preferred embodiment utilizing the Double Yoke Assembly.

FIG. (9) is a schematic side view of the entire "two freewheel" double yolk embodiment.

FIGS. (10) and (10A) depict the side view (10) and front view (10A) respectively of the central cross assembly.

FIGS. (11), (11A) and (11B) depict the front view (11) and two side views (11A) and (11B) respectively of the rotating grooved disc utilizing the "sliding bogie" type of pivot arrangement with respect to the pivotable yoke shaft.

FIGS. (12), (12A) (12B) and (12C) depict the side view (12) of the entire pivotably yoke including its attached extension shaft and "sliding bogie" type pivot mechanism contained within the grooved disc, and the side cross section (12A) and (12C) and frontal cross section (12B) of the related pivotable yoke shaft.

FIG. (13) depicts the side cross section of the pivotable yoke shaft's extension shaft under the "sliding bogie" type of pivot arrangement.

FIGS. (14) and (14A) depict the front view (14) and the side view (14A) respectively of the pivotably and rotatable sliding bogie utilized in the "sliding bogie" type of pivot arrangement.

FIGS. (14B) and (14C) depict the front view (14C) and the side view (14B) of the rotatably fitted sliding shoe as attached to the free end of the pivotable yoke shaft as utilized in the "sliding bogie" and "sliding twin flange" types of pivot arrangement.

FIGS. (15), (15A), (15B) and (15C) depict the side cross section (15), front view (15A), rear view (15B) and top view (15C) of the oscillating horse shoe.

FIG. (16) is a schematic side view of the entire "four freewheel" double yoke arrangement.

FIG. (17) is a schematic frontal cross section of the "four freewheel" double yoke embodiment's common plane shared by the four main freewheel shafts.

FIG. (18) is a schematic side view of the entire "eight freewheel" double yoke embodiment utilizing two separate rotating grooved discs and one common double faced main output gear.

FIG. (19) is a schematic side view of the entire "eight freewheel" double yoke embodiment utilizing two separate main output gears and one common double faced rotating grooved disc.

FIGS. (20), (20A), (20B), (20C), (20D), (20E), (20F) and (20G) depict the side view (20) of the entire pivotable yoke including its attached extension shaft and "sliding twin flange" type pivot mechanism contained within the grooved disc, the front view (20A) and side view (20B) of the inner flange containing the two stub shafts, the front view (20C) and side view (20D) of the outer flange attached to the free end of the pivotable yoke shaft's extension shaft, the side view (20E) of the "inter-flange distance shafts", the side view (20F) of the "pivoting bracket arms" and finally the side view (20G) of the "sliding twin flange" assembly.

FIGS. (21), (21A) and (21B) depict the front view (21B) and two side views (21) and (21A) respectively of the rotating grooved disc utilizing the "sliding twin flange" type of pivot arrangement with respect to the pivotable yoke shaft.

FIGS. (22), (22A), (22B), (22C), (22D), (22E), (22F) and (22G) depict the side view (22) of the entire pivotable yoke including its attached extension shaft and "outgroove engagement sliding gear cage" type pivot mechanism contained within the grooved disc, the front view (22B) and side views (22A) and (22C) of the out-groove sliding gear cage rotatably fitted to the free end of the pivotable yoke shaft, the side view (22D) of the pivotable yoke shaft's threaded extension shaft, the side view (22E) and front view (22F) of the rack rotatably fitted to the free end of the pivotable yoke shaft's extension shaft and finally the combined side view (22G) of the threaded extension shaft with rotatably fitted rack.

FIGS. (23), (23A) and (23B) depict the front view (23B) and two side views (23) and (23A) respectively of the rotating grooved disc utilizing the "out-groove engagement sliding gear cage" type of pivot arrangement with respect to the pivotable yoke shaft.

FIGS. (24), (24A), (24B), (24C), (24D), (24E). (24F) and (24G) depict the side view (24) of the entire pivotable yoke including its attached extension shaft and "in-groove engagement sliding gear cage" type pivot mechanism contained within the grooved disc, the front view (24B) and side views (24A) and (24C) of the in-groove sliding gear cage rotatably fitted to the free end of the pivotable yoke shaft, the side view (24D) of the pivotable yoke shaft's threaded extension shaft, the side view (24E) and front view (24F) of the rack rotatably fitted to the free end of the pivotable yoke shaft's extension shaft and finally the combined side view (24G) of the threaded extension shaft with rotatably fitted rack.

FIGS. (25), (25A) and (25B) depict the front view (25B) and two side views (25) and (25A) respectively of the rotating grooved disc utilizing the "in-groove engagement sliding gear cage" type of pivot arrangement with respect to the pivotable yoke shaft.

FIGS. (26) through (37) relate to one preferred embodiment utilizing the T-joint pivotable shaft assembly.

FIGS. (26) and (26A) depict the 3-D view (26) of the "cross type" rigid central cross assembly and the compound 3-D view (26A) of the "cross type" rigid central cross assembly with attached "yoke-ended" pivotable shaft and rimmed inner cylindrical body (dotted lines) of the oscillating ring assembly.

FIG. (27) depicts the 3-D view of the "slot type" rigid central cross assembly with attached "flattened end" pivotable shaft and rimmed inner cylindrical body (dotted lines) of the oscillating ring assembly.

FIG. (28) depicts a 3-D view of the "cross-type" pivotable central cross assembly with slotted main shaft.

FIG. (29) depicts a 3-D view of the "cylinder-ended" type pivotable shaft utilized with pivotable central cross assemblies.

FIG. (30) depicts a 3-D view of "flanged" main shaft utilized with the "twin circular plate-type" pivotable cross assembly.

FIG. (31) depicts a 3-D view of the "twin circular plate-type" pivotable central cross assembly utilized with "flanged" main shaft.

FIGS. (32) and (32A) depict the side view (32) and font view (32A) of the "cylinder-ended" type pivotable shaft.

FIGS. (33), (34) and (35) depict the side view (33) of the oscillating ring assembly's "outer cylindrical hollowed body" having two outwardly and radially protruding "east-west" main shafts, the side view (34) of the oscillating ring assembly's "rimmed inner cylindrical body" having a centrally positioned orifice and finally the front view (35) of the oscillating ring assembly's combined "outer cylindrical hollowed body" and "rimmed inner cylindrical body" rotatably filled to each other by way of ball bearings.

FIGS. (36), (36A) and (36B) depict the front view (36B) and two side views (36A) and (36) of the rotating grooved disc utilized by the T-joint pivotable shaft assembly embodiment and include the mechanism by which the pivotable shaft is displaced out of alignment with respect to the grooved disc's axis of rotation.

FIG. (37) a schematic side view of the entire "four freewheel" T-joint pivotable shaft assembly embodiment including its related rotating grooved disc and the embodiment's outer frame.

FIG. (38) is a schematic frontal cross section of the "six freewheel" T-Joint embodiment depicting the common plane shared by the six main freewheel shafts.

DETAILED DESCRIPTION OF THE PREFERRED EMBODIMENTS

Swash Plate Embodiment—[FIGS. (1) through (8B)]

Swash Plate Assembly

Referring to FIG. (1), there is shown one of the preferred embodiments of the invention utilizing a swash plate assembly. The swash plate assembly includes an inner circular rotating portion (3), a concentrically mounted outer non-rotating partially hollow portion (5), and a thrust bearing retention ring (1) which is perimetrically attached to the outer non-rotating portion (5) thereby rotatably sandwiching the main thrust bearing (4), the inner rotating portion (3) and the auxiliary thrust bearing (2) in that order between the outer non-rotating partially hollow portion (5) and its attached thrust bearing retention ring (1). Assembled items (1, 2, 3, 4 and 5) shall hereinafter be collectively referred to as the "swash plate assembly".

The inner rotating portion (3) has a central hub which contains a slot (46) running radically through its center and a centrally positioned yoke-type retaining pin housing (47)

per FIG. (1B). The two exposed ends of the central retaining pin (44) of the input shaft (6) are rotatably mounted in the two opposed orifices (48) per FIG. (1C), thereby forcing the inner rotating portion (3) to co-rotate with the input shaft (6) while at the same time the inner rotating portion (3) may be pivoted with respect to the input shaft (6) at any angle from 0 degrees (vertical) to over 25 degrees from vertical with respect to the input shaft. The inner retaining portion (3) rotatably driven by the input shaft (6) can freely rotate within the outer non-rotating partially hollow portion (5) thus causing the outer non-rotating partially hollow portion (5) to exactly follow any motion, other than the motion of rotation, induced upon it by the inner rotating portion (3), as its angle of pivot with respect to the input shaft (6) is varied from the vertical. The entire swash plate assembly pivots around the central retaining pin (44) attached to the input shaft (6) such that the longitudinal axis of the central retaining pin (44) lies in the same plane that runs radially through the exact center of the main thrust bearing (4).

The outer non-rotating partially hollow portion (5) of the swash plate assembly has two pairs of opposed short shafts (7, 8, 9 and 10) radially and vertically fixed on its outer perimeter in a cross pattern such that each of such four short shafts lies 90 degrees apart from its neighboring short shafts. The longitudinal axis (7-8) running "east-west" and the longitudinal axis (9-10) running "north-south" of each pair of such opposed short shafts share the same plane with each other and with the point where the longitudinal axis of the central retaining pin (44) intersects with the longitudinal axis of the input shaft (6).

Pivot Mechanism

The swash plate assembly can be pivoted with respect to the longitudinal axis of input shaft (6) while the input shaft is rotating. This is achieved through the linkage system consisting of the anchoring yoke (23) fixed to the swash plate assembly's inner rotating portion (3) through orifice (33) and pivotably connected to one end of lever arm (24) whose other end is pivotably connected to anchoring yoke (25) which is fixed to sliding carrier (26). Sliding carrier (26) is slidably mounted through its central orifice around input shaft (6) but is forced to co-rotate with input shaft (6) through a longitudinal recessed keyway machined in its central orifice which is aligned with a corresponding protruding rib (45) per FIG. (1A) longitudinally fixed on the surface of the input shaft (6) ninety degrees out of phase with respect to the axis of central retaining pin (44). A hollow rotatable flange (27) having two diametrically opposed orifices (28) and (29) is rotatably mounted on sliding carrier (26) and retained in place through the threaded end nut (30). Input shaft (6) is mounted through the front frame (60) per FIG. (2) of the embodiment by way of bearing (43) per FIG. (1A) which is rotatably fixed at its approximate mid-length point.

Sliding carrier (26) with hollow rotatable flange (27) and end nut (30) are mounted on the internal section of input shaft (6) while rotatable carrier (34), which is rotatably and slidably mounted to the external section of input shaft (6), together with shifting levier (40) and shifting yoke (37, 38, 39) are mounted on the external section of input shaft (6). Hollow rotatable flange (27) of sliding carrier (26) is connected to rotatable carrier (34) through two parallel connector shafts (31) and (32) whose inward ends are fixed to orifices (28) and (29) of hollow rotatable flange (27) and whose outward ends are fixed to the two corresponding orifices (35) and (36) of rotatable carrier (34). Parallel connector shafts (31) and (32) are slidably mounted with respect to the embodiment's front frame (60) per FIG. (2) through orifices (61). Shifting lever (40) with its related shifting yoke (37, 38, 39) is rotatably attached through shaft (39) per FIG. (1) to bracket (62) per FIG. (2), which is mounted on frame (60). Shifting lever yoke legs (38) and (37) are slidably and rotatably mounted to carrier (34) through its two protruding pins (41) and (42). As shifting lever (40) is slidably displaced with respect to bracket (63) per FIG. (2), which is mounted on frame (60) it forces rotatable carrier (34) to slide in or out with respect to input shaft (6) in turn causing sliding carrier (26) to correspondingly slide in or out with respect to input shaft (6) while co-rotating with input shaft (6), thereby causing through the pivotable action of lever arm (24) the swash plate assembly's inner rotating portion (3) to pivot with respect to input shaft (6). The combination of rotation of input shaft (6) and the inducement of a pivot angle to inner rotating portion (3) with respect to input shaft (6) causes the swash plate assembly's outer non-rotating portion (5) to symmetrically and harmoniously oscillate about the "east-west" and "north-south" axes of its short shafts (7, 8, 9, 10).

Outer Ring

The entire swash plate assembly is perimetrically surrounded by an outer ring (13) that is concentrically and pivotally coupled to the swash plate assembly through short shafts (9) and (10) pivotally mounted to outer ring (13) through opposed orifices (12) and (11), respectively, which are aligned with the "north-south" axis. Outer ring (13) has two co-axial main shafts (14) and (15) protruding radially outward and vertically fixed to its outer perimeter in "east-west" axis alignment. The outer ring's main shafts (14) and (15) are pivotally mounted to the main frame of the embodiment in orifices (97) and (98) per FIG. (3), FIG. (3A) and FIG. (5) through related bearings, thus allowing outer ring (13) to pivot with respect to main frame (60) per FIG. (5) around the "east-west" axis. Concentrically mounted on each of the outer ring's two main shafts (14) and (15) between outer ring (13) and the main frame (60) are one way clutches freewheels (51) and (94) per FIG. (5), which carry toothed gears concentrically mounted on their outer perimeters. Freewheel gears (51) and (94) are continuously engaged with one main output gear (52) per FIG. (5). Examples of such freewheels are the Stieber Heidelberg Freewheels, types NF, NFS and NSS. Main output gear (52) per FIG. (2) is rotatably mounted within main frame (60) through main bearing (53) and thrust bearings (54) and (55) per FIG. (2) and rotates concentrically with input shaft (6) but at varying rotation speeds. Main output gear (52) is connected either directly to output shaft (58) or through meshing reduction gears (56) and (59) to output shaft (99) per FIG. (2). Main output gear's main bearing (53) and thrust bearings (54) and (55) are held in place through a set of three retention rings (57) per FIG. (2).

Two Freewheel Swash Plate

As inner rotating portion (3) of the swash plate assembly is forced to pivot with respect to input shaft (6), it causes the entire swash plate assembly to pivot with it as depicted in FIG. (2A), which is a "side view" and FIG. (3A) which is a "top view" of the swash plate embodiment. As input shaft (6) begins to rotate while inner rotating portion (3) is pivoted the entire swash plate assembly begins to oscillate about its "east-west" and "north-south" axes.

The swash plate assembly's oscillation about its "east-west" axis will cause outer ring (13) through its "north-south" coupling with the swash plate assembly to also oscillate about its "east-west" axis, thereby causing the outer ring's two main shafts (14) and (15) to also oscillate about their "east-west" axis.

Referring to FIG. (5) and FIG. (5A), both of which depict an embodiment having two freewheels per swash plate assembly, as input shaft (6) rotates by 360 degrees with an applied pivot angle of 1 degree of inner rotatable portion (3), such rotation will cause each of outer ring's opposed main shafts (14) and (15) to oscillate by 4 degrees (from minus 1 degree to zero to plus 1 degree back through zero to minus 1 degree). Accordingly, each outer ring main shaft (14) and (15) will engage its respective freewheel (51) and (94) through 180 degrees of rotation of input shaft (6) and disengage its respective freewheel (51) and (94) through the other 180 degrees of rotation of input shaft (6). Since two main shafts (14) and (15) are diametrically opposed and their freewheels (51) and (94) are equally diametrically opposed, when freewheel (51) is engaged freewheel (94) will be disengaged and vice-versa. Accordingly, freewheels (51) and (94) will intermittently engage main output gear (52) through 180 degrees of rotation of input shaft (6) and intermittently disengage main output gear (52) through the other 180 degrees of rotation of input shaft (6), thus producing rotary motion of the main output gear (52).

Spider

The swash plate assembly's oscillation about its "north-south" axis is converted to rotary motion of main output gear (52) through the "spider," which consists of inner yoke (16), outer yoke (20) and common hub (19) per FIG. (1). Inner yoke (16) and outer yoke (20) are mounted to common hub (19) 90 degrees out of phase to each other. Inner yoke (16) is pivotally mounted through orifices (17) and (18) to "east-west" short shafts (7) and (8) of outer non-rotatable portion (5). Outer yoke (20) has two protruding co-planar main shafts (21) and (22) fixed at the end of each leg and aligned with the "north-south" axis such that the center of orifices (17) and (18) and the longitudinal axis of co-planar main shafts (21) and (22) share the same plane. The spider's main shafts (21) and (22) are pivotally mounted to the embodiment's main frame (60) in orifices (95) and (96) per FIG. (2) and FIG. (4) through related bearings, thus allowing the spider to pivot with respect to main frame (60) per FIG. (2) around the "north-south" axis. Concentrically mounted on each of the spider's two main shafts (21) and (22) between outer yoke (20) and the main frame (60) are freewheels (49) and (50) per FIG. (4) which carry toothed gears concentrically mounted on their outer perimeters. Freewheel gears (49) and (50) are continuously engaged with main output gear (52) per FIG. (4).

Four Freewheel Swash Plate

As the swash plate assembly oscillates around the "north-south" axis, it forces the spider to which it is attached through inner yoke orifices (17) and (18) to also oscillate around its "north-south" axis. As input shaft (6) rotates by 360 degrees with an applied pivot angle of 1 degree of inner rotatable portion (3), such rotation will cause each of the spider's main shafts (21) and (22) to oscillate from minus 1 degree through plus 1 degree back to minus 1 degree, thereby engaging their respective freewheels (49) and (50) through 180 degrees of rotation of input shaft (6) and disengaging their respective freewheels (49) and (50) through the other 180 degrees of rotation of input shaft (6). The combination of the positive intermittent engagement of main output gear (52) by freewheels (49) and (50) of the spider and freewheels (51) and (94) of outer ring (13) set 90 degrees out of phase with each other will cause main output gear (52) to rotate in a continuous and fluent motion at input shaft (6) speeds equal to or in excess of 1,000 RPM, each freewheel positively engaging main output gear (52) only every 90 degrees (instead of 180 degrees) of rotation of input shaft (6) before its neighboring freewheel positively engages main output gear (52).

Six Freewheel Swash Plate

In this configuration, the swash plate assembly oscillates around three axis set 60 degrees out of phase to each other instead of oscillating around two axis set 90 degrees out of phase to each other as in the "Two" and "Four" Freewheel Swash Plate embodiments described previously. The three axes can be described as the "east-west" or "0–180" degree axis; the "southeast-northwest" or "60–240" degree axis and the "southwest-northeast" or "120–300" degree axis. This configuration includes one central swash plate assembly (shaded area), two outer rings (71) and (73) and two spiders (70) and (72) per FIG. (6).

Referring to FIG. (6) the swash plate assembly (shaded area) has two pairs of opposed short shafts (74-75) and (76-77) vertically embedded on its outer perimeter, where pair (74-75) is fixed at the "0" and "180" degree positions and is pivotally mounted to the "0" and "180" degree orifices of inner ring (71) and pair (76-77) is fixed at the "90" and "270" degree positions and is pivotally mounted to the "90" and "270" degree leg orifices of inner spider (72). Inner ring (71) has two pairs of opposed short shafts (80-81) and (82-83) vertically embedded on its outer perimeter where pair (82-83) is fixed at the "60" and "240" degree positions and is pivotally mounted to the "60" and "240" degree orifices of outer ring (73) and pair (80-81) is fixed at the "150" and "330" degree positions and is pivotally mounted to the "150" and "330" degree leg orifices of outer spider (70). Outer ring (73), inner spider (72) and outer spider (70) each have one pair of protruding opposed main shafts (86-87), (78-79) and (84-85) respectively, which are vertically embedded on their outer perimeter/legs at the "120"/"300", "0"/"180" and "60"/"240" degree positions, respectively which are in turn pivotally mounted in bearings set in the main frame, thus allowing outer ring (73), inner spider (72) and outer spider (70) to freely pivot with respect to the main frame around their "120–300", "0–180" and "60–240" main axes, respectively. Concentrically mounted on each of such main shafts, (86), (87), (78), (79), (84) and (85) between outer ring (73), inner spider (72), outer spider (70) and the main frame are freewheels (66), (67), (69), (68), (64) and (65), respectively each of which carries a toothed gear concentrically mounted on its outer perimeter. Freewheel gears (66), (67), (69), (68), (64) and (65), are in turn continuously engaged with a common main output gear which rotates concentrically with the input shaft but at varying rotation speeds and is in turn connected to the output shaft either directly or through reduction gears.

As the swash plate assembly is pivoted with respect to the rotating input shaft (6) away from the vertical, oscillation of outer ring's main shafts (86) and (87), inner spider's main shafts (78) and (79) and outer spider's main shafts (84) and (85) is induced which causes each of their attached freewheels (66)-(67), (69)-(68) and (64-65) to positively and uni-directionally engage the common main output gear with which they all mesh, every 60 degrees of rotation of input shaft (6) before its neighboring freewheel positively engages the main output gear, so that the main output gear rotates in a continuous and fluent motion.

Multiple Swash Plate Arrangements

The two, four and six freewheel swash plates and various combinations thereof can be employed in order to meet specific requirements. Generally, the two and four freewheel swash plates described previously can accept pivot angles with respect to the rotating input shaft of up to about 15 degrees while the six freewheel swash plate described previously can accept higher pivot angles, thus allowing for a wider range of RPM ratios and TORQUE amplification factors.

Referring to FIG. (7), FIG. (7A) and FIG. (7B), two sets of four freewheel swash plate assemblies (89) and (90) can be co-axially and co-rotatably placed each on either side of a double faced main output gear (88) driving an output shaft (91) such that the "north-south" freewheels of set (89) are positioned on the north-south "0–180" degree axis and the "north-south" freewheels of set (90) are positioned on the northeast-southwest "45–225" degree axis per FIG. (7B), thus being 45 degrees out of phase with each other. This arrangement offers an extremely smooth output gear rotation down to an input shaft rotation of below 500 RPM.

Referring to FIG. (8), FIG. (8A) and FIG. (8B), two sets of the two freewheel swash plate assemblies (92) and (93) can be co-axially and co-rotatably placed each on either side of a double faced main output gear such that the "north-south" freewheels of set (92) are positioned on the "north-south" "0–180" degree axis and the "north-south" freewheels of set (93) are positioned on the "east-west" "90–180" degree axis per FIG. (8B) thus being 90 degrees out of phase with each other. This arrangement offers the same output gear rotation smoothness as a single four freewheel swash plate assembly but without the use of spiders.

Two sets of six freewheel swash plate assemblies can be co-axially and co-rotatably placed each on either side of a double faced main output gear such that the "north-south" freewheels of the right set are positioned on the north-south "0–180" degree axis and the "north-south" freewheels of the left set are positioned on the northeast-southwest "30–210" degree axis thus being 30 degrees out of phase with each other. This arrangement offers an extremely smooth output gear rotation down to an input shaft rotation of well below 500 RPM and an expanded range of ratios from a bottom end of as low as (3 to 1] to a high end of as high as (90 to 1].

Swash plate arrangements having more than six freewheels each engaging one or more main output gears can be utilized to meet any extraordinary or other application requirements.

Double Yoke Embodiment—[FIGS. (9) through (18)]
Double Yoke Assembly

Referring to FIG. (9), there is shown another of the preferred embodiments of the invention utilizing a double yoke assembly wherein at least one double yoke assembly is utilized preferably having a fixed yoke (101), a pivotable second yoke (102) and a central cross assembly (103) connecting the two opposed yokes (101) and (102) to each other "fork to fork". The fixed yoke (101) has a central shaft which is rigidly mounted to the embodiment's rear frame (120) at position (121) thereby not allowing it to either rotate or be rotatably displaced. The pivotable second yoke (102) has an attached pivotable yoke shaft which cannot rotate but can be rotatably displaced through motions induced upon it, thereby causing it to oscillate about two axes (the "north-south" and "east-west" axes) with respect to the fixed yoke (101) to which it is mounted fork to fork by way of the central cross assembly (103). The central cross assembly (103) includes a central hollow hub (103) having one pair of two opposed co-axial main shafts (111) and (112) per FIGS. (10) and (10A) radially and rigidly mounted on its outer perimeter in the "north-south" axis, which are rotatably mounted through the "north-south" axis orifices of the fixed yoke (101) and whose shaft ends (111) and (112) are rotatably housed in the embodiment's main frame (120) in "north-south" alignment and another pair of two co-axial opposing short shafts (122) and (123) per FIG. (10A) radially and rigidly mounted on its outer perimeter in the "east-west" axis, which are rotatably connected to the "east-west" axis of the pivotable yoke orifices (128) and (129) respectively per FIGS. (12A) and (12B), wherein main shafts (111) and (112) and short shafts (122) and (123) are co-planar to each other such that their theoretical extensions intersect each other vertically at the same point as the hub's (103) multi-directional center. Concentrically mounted on each of main shafts (111) and (112) between the "north-south" fork ends of fixed yoke (101) and main frame (120) are freewheels (116) and (117) per FIG. (9), each having a toothed gear concentrically mounted on its outer perimeter such that both freewheel gears (116) and (117) are in turn continuously engaged with main output gear (113) which rotates concentrically with the axis of the central fixed yoke shaft (101) and is preferably connected to the output shaft (114) through a reduction gear (115).

Rotating Grooved Disc Driven by Input Shaft & Pivot Arrangement of Pivotable Yoke Shaft Rotating grooved disc (104) per FIGS. (11), (11A) and (11B) consists of an outer flat face having a vertically mounted central shaft (119) around which it symmetrically rotates and an inner concave face which is inwardly curved to follow the shape of a hemi-sphere or a spherical section thereof having a central arc shaped groove (105) running radially through the entire diameter of its inner face surface. The arc, shaped groove (105) forms an arc whose center is identical with the multi-directional center of hub (103). Grooved disc (104) per FIG. (9) is rotatably driven by the powers source through input shaft (107) and its attached gear (108) and is rotatably mounted to the front frame of the embodiment (120) through central shaft (119) of its outer face.

The theoretical extension of the axis of rotation of the grooved disc passes through the multi-directional center of hub (103). Referring to FIGS. (12), (12C), (14B) and (14C), slidable shoe (109) is rotatably fitted by way of orifice (152) and its related bearing per FIG. (14C) to the free end (154) of pivotable yoke shaft (102) and is slidably mounted in arc shaped groove (105) of the inner face of grooved disc (104) such that while grooved disc (104) is rotating the free end (154) of pivotable yoke shaft (102) can be smoothly displaced (shifted) throughout the entire length of arc shaped groove (105) from being perfectly aligned with central shaft (119) of grooved disc (104) until it is 30 degrees or over out of alignment with central shaft (119). The displacement (shifting) of the free end (154) of pivotable yoke shaft (102) can be achieved through a variety of methods of which the following are preferred methods:

a) Slidable Bogie

Referring to FIGS. (12), (12A), (12B), (12C), (13), (14) and (14A), the threaded section (153) of extension shaft (124) per FIG. (13) is caused to be either screwed-in or screwed-out through hollow central threaded section (130) of pivotably yoke shaft (102), thereby forcing slidable bogie (110) which is pivotable and rotatably fitted to the free end (151) of extension shaft (124) to slide up or down the straight grooved track (106) which is vertical to the axis of rotation of grooved disc (104) and runs through the entire diameter of grooved disc (104) lying directly behind arc shaped groove (105). Since the distance between arc shaped groove (105) and straight groove (106) lying directly behind it becomes longer as the free end (154) of pivotable yoke shaft (102) moves out of alignment with central shaft (119) of rotating grooved disc (104) the screwing-out of extension shaft (124) with respect to pivotable yoke shaft (102) will cause the free end (154) of pivotable yoke shaft (102) to be gradually displaced out of alignment with respect to central shaft (119) of grooved disc (104).

b) Slidable Twin Flange Assembly

Referring to FIGS. (12A), (12C), (20), (20A), (20B), (20C), (20D), (20E), (20F), (20G), (21), (21A) and (21B), the threaded section (153) of extension shaft (124) per FIG. (13) is caused to be either screwed-in or screwed-out through the hollow central threaded section (130) of pivotable yoke shaft (102), thereby forcing stub shafts (159) of inner flange (158) of twin flange assembly (155) to follow an arc shaped track (160) per FIG. (20) around coaxial anchoring points (169) of grooved disc (167). Twin flange assembly (155) is rotatably mounted by way bearing (164) of outer flange (162) to the free end (151) of extension shaft (124) per FIG. (13) and is rotatably and slidably mounted by way of inner flange (158) to pivotable yoke shaft (102). Inner flange (158) is rigidly connected to outer flange (162) by way of two inter-flange distance shafts (165) vertically threaded to orifices (161) of inner flange and orifices (163) of outer flange so that inner flange (158) and outer flange (162) are always parallel to each other and move in unison. Inner flange (158) is pivotably connected through two stub shafts (159) to two pivoting braket arms (166) each running parallel with and on either side of arc shaped groove (105) in parallel slots (168) of grooved disc (167) per FIGS. (21), (21A) and (21B). Pivoting braket arms (166) are in turn rotatably connected to two fixed coaxial anchoring points (169) lying within grooved disc (167).

Since the two coaxial anchoring points (169) of pivoting braket arms (166) are off-set to one side of the axis of rotation (119) of grooved disc (167) the screwing-out of extension shaft (124) with respect to pivotable yoke shaft (102) will cause the two stub shafts (159) to follow an arc shaped track (160) lying on the opposite side of the axis of rotation (119) of grooved disc (167) thereby forcing the free end (154) of pivotable yoke shaft (102) to be gradually displaced out of alignment with respect to the central shaft (119) of grooved disc (167).

c) Out-groove Meshing Gear Cage

Referring to FIGS. (12C), (22), (22A), (22B), (22C), (22D), (22E), (22F), (22G), (23), (23A) and (23B) threaded section (178) of extension shaft (177) is caused to be either screwed-in or screwed-out through the hollow central threaded section (130) of pivotable yoke shaft (102), thereby forcing the geared side (182) of cylindrical rack (179) rotatably mounted through its central hollow section (180) to extension shaft (177) to engage gears (173), (174) and (175) which are rotatably mounted within slidable gear cage (170) on independent shafts through orifices (184), (185) and (186) respectively. Slidable gear cage (170) is rotatably mounted around the free end (154) of pivotable yoke shaft (102) and is slidably mounted within arc shaped groove (105) of grooved disc (183). Pin (172) is threaded through orifice (171) of gear cage (170) such that it prevents the rotation of cylindrical rack (179) within gear cage (170) by sliding in longitudinal groove (181) of cylindrical rack (179). Proper gear meshing between the geared side (182) of cylindrical rack (179) and gear (173) is thereby assured. Since gear (175) is coaxially and rigidly fixed to twin gears (176) which in turn mesh with twin corresponding arc shaped gear surfaces (187) which are rigidly fixed upon the inner concave face of grooved disc (183) in coaxial alignment with and running parallel on either side of and outside the arc shaped groove (105) over its entire length (or part thereof) the screwing out of extension shaft (177) will cause cylindrical rack (179) to rotate the entire set of gears (173), (174), (175) and (176) of gear cage (170) thereby forcing the free end (154) of pivotable yoke shaft (102) to be gradually displaced out of alignment with respect to central shaft (119) of grooved disc (183).

d) In-groove Meshing Gear Cage

Referring to FIGS. (12C), (24), (24A), (24B), (24C), (24D), (24E), (24F), (24G), (25), (25A) and (25B) threaded section (178) of extension shaft (177) is caused to be either screwed-in or screwed-out through the hollow central threaded section (130) of pivotable yoke shaft (102), thereby forcing the geared side an (182) of cylindrical rack (179) rotatably mounted through its central hollow section (180) to extension shaft (177) to engage gears (191), (192) and (193) which are rotatably mounted within slidable gear cage (188) on independent shafts through orifices (195), (196) and (197) respectively. Slidable gear cage (188) is rotatably mounted around the free end (154) of pivotable yoke shaft (102) and is slidably mounted within arc shaped groove (105) of grooved disc (199). Pin (190) is threaded through orifice (189) of gear cage (188) such that it prevents the rotation of cylindrical rack (179) within gear cage (188) by sliding in longitudinal groove (181) of cylindrical rack (179). Proper gear meshing between the geared side (182) of cylindrical rack (179) and gear (191) is thereby assured. Since gear (193) is coaxially and rigidly fixed to twin gears (194) which in turn mesh with twin corresponding arc shaped gear surfaces (198) which are rigidly fixed within the arc shaped groove (105) of grooved disc (199) in coaxial alignment with and running parallel to arc shaped groove (105) over its entire length (or part thereof) the screwing out of extension shaft (177) will cause cylindrical rack (179) to rotate the entire set of gears (191), (192), (193) and (194) of gear cage (188) thereby forcing the free end (154) of pivotable yoke shaft (102) to be gradually displaced out of alignment with respect to central shaft (119) of grooved disc (199).

Means of Rotation (Screwing-in or Screwing-out) of the Pivotable Yoke Shaft's Extension Shaft The means of rotation of pivotable yoke shaft extension shaft (124) and (177) per FIGS. (13) and (22D or 24D) respectively are provided by a first rotatable shifting shaft (118) per FIGS. (9), (12), (20), (22) and (24) which passes through the hollow center of fixed yoke shaft (101) and is in turn attached to small universal joint (148) whose center of pivot is perfectly aligned with the multi-directional center of hub (103).

Small universal joint (148) is further attached to a second rotatable shifting shaft (149) which passes through the hollow center (132) of pivotable yoke shaft (102) per FIGS. (12A) and (12C) such that the free ribbed or square section "male end" of shifting shaft (149) is slidably mounted in the central correspondingly configured recess "female end" (150) per FIGS. (13), (22D), and (24D) of extension shaft (124) or (177) running through the center of its corresponding threaded section (153) and (178).

Two Freewheel Double Yoke Arrangement

Pivotable yoke (102) is caused to oscillate around the "north-south" and "east-west" axes of central cross assembly (103) when the inclination angle of pivotable yoke shaft (102) with respect to the axis of rotation of rotating grooved disc (104) is varied from the (zero degree) horizontal position. The "east-west" oscillation of pivotable yoke shaft (102) causes central cross assembly (103) to which it is rotatably attached through "east-west" short shafts (122) and (123) to oscillate strictly and only around its "north-south" axis.

Given an inclination angle of 1 degree, as grooved disc (104) rotates by 360 degrees it will cause the central cross assembly's "north-south" main shafts (111) and (112) to oscillate by 4 degrees (from minus 1 degree through plus 1 degree back to minus 1 degree). Since main shafts (111) and (112) are opposed and their freewheels (116) and (117), respectively, are equally opposed, one freewheel will positively engage main output gear (113) through the first 180 degrees of rotation of grooved disc (104) and the opposite freewheel will positively engage main output gear (113) through the other 180 degrees of rotation of grooved disc (104) thus producing rotary motion of the main output gear (113).

The Oscillating Horse Shoe

Horse shoe (125) per FIGS. (15), (15A), (15B) and (15C) transforms pivotable yoke shaft's (102) "north-south" oscillation to an "east-west" axial oscillation whose axis is co-planar to the central cross assembly's (103) "north-south" main shaft axis which it vertically intersects at the point of intersection of the central cross assembly's "north-south" and "east-west" shaft axes. Horse shoe (125) is aligned in the "east-west" direction with respect to embodiment frame (120) when viewed from the front and includes a central hollow semi-circular section (134) through which pivotable yoke shaft (102) is slidably and rotatably mounted through rollers (133) per FIGS. (12A), (12B) and (12C), which are fitted on either of its sides such that pivotable yoke shaft (102) can oscillate within hollow section (134) though a 60 degree (or more) arc in the "east-west" direction with respect to frame (120). A pair of "east-west", radially opposed, protruding, co-axial main shafts (126) and (127) are rigidly and vertically attached to the ends of horse shoe (125) such that the ends of main shafts (125) and (127) are rotatably housed in main frame (120) in "east-west" alignment when viewed from the front.

Central cross assembly main shafts (111) and (112) and horse shoe main shafts (126) and (127) share the same plane with each other, their theoretical extensions vertically intersecting each other at a point co-incidental to the point of intersection of main "north-south" shafts (111) and (112) and short "east-west" shafts (122) and (123) of central cross assembly (103).

Concentrically mounted on each horse shoe "east-west" main shaft (126) and (127) between horse shoe legs (125) and main frame (120) are freewheels (135) and (136) per FIG. (16) and FIG. (17) each of which carries a toothed gear concentrically mounted on its outer perimeter such that freewheel gears (135) and (136) are in turn continuously engaged with the same main output gear (113) to which freewheel gears (116) and (117) are also engaged.

Instead of the oscillating horse shoe (125) an oscillating ring assembly consisting of outer cylindrical hollow body (224) and rimmed inner cylindrical body (226) per FIGS. (33) and (34) can be used in the double yoke embodiment such as is described under the "T-joint pivotable shaft embodiment" below. The oscillating ring assembly's inside diameter and longitudinal length would need to be slightly larger in order to avoid interfering with the shaft of the fixed yoke (101) when pivotable yoke shaft (102) is gradually displaced out of alignment with respect to the axis of rotation (119) of grooved disc (104) or (167) or (183) or (199) per FIGS. (11A), (21), (23) and (25) respectively.

In embodiments using central cross assemblies of the "rigid" type such as (200) and (205/206/207) per FIGS. (26) and (27) respectively where the angle formed between its main shafts (or short shafts or pin shafts) is fixed at 90 degrees as described in detail under "T-joint pivotable shaft assembly embodiments" below, the plane shared by the common central axis of the pivotable yoke's "east-west" fork orifices (128) and (129) per FIGS. (12A) and (12B) and the pivotable yoke's shaft axis (102) and the plane shared by the "east-west" central axis of the arc shaped slot (134) of horse shoe (125) and the horse shoe's "east-west" main shaft axes (126) and (127) per FIGS. (15), (15A), (15B) and (15C) exactly coincide only when the longitudinal axis of arc shaped groove (105) of grooved disc (104) carrying the free end (154) of the pivotable yoke shaft (102) is perfectly aligned with the "north-south" axes of the main shafts (111) and (112) of the central cross assembly (103) or the "east-west" axes of the main shafts (126) and (127) of the horse shoe (125) per FIGS. (10), (10A), (15), (15A) and (15B) respectively. In all other intermediate positions assumed by the arc shaped groove's (105) longitudinal axis while the grooved disc (104) rotates, the two above said planes do not coincide. The outside dimensions of the pivotable yoke fork (102) must therefore provide sufficient clearance with respect to the inside dimensions of the middle semi-circular section (134) of horse shoe (125) in order to allow for the above said plane misalignments. In addition pivotable yoke shaft (102) must be allowed to rotatably oscillate while sliding through the central hollow semicircular arc (134) of horse shoe (125). The above also applies for the oscillating ring assembly (224/226) per FIGS. (33) and (34).

In embodiments using central cross assemblies of the "pivotable" type such as (210/211/212/213) and (216/217/218/219) per FIGS. (28) and (30–31) respectively as described under "T-joint pivotable shaft assembly embodiments" below the above clearance restrictions need not apply.

Four Freewheel Double Yoke Arrangement

As pivotable yoke shaft (102) oscillates in the "north-south" axis, it forces horse shoe (125) to which it is slidably and rotatably attached to oscillate strictly around the "east-west" axis of its two main "east-west" shafts (126) and (127). Given an inclination angle of 1 degree, as grooved disc (104) rotates by 360 degrees it causes "east-west" main shafts (126) and (127) to oscillate by 4 degrees (from minus 1 degree through plus 1 degree back to minus 1 degree). Since main "east-west" shafts (126) and (127) are opposed and their freewheels (135) and (136) are equally opposed, one freewheel will positively engage main output gear (113) through the first 180 degrees of rotation of grooved disc (104) and the opposite freewheel will positively engage main output gear (113) through the other 180 degrees of rotation of grooved disc (104). The combination of the intermittent engagement of main output gear (113) by main "east-west" freewheel gears (135) and (136) and main "north-south" freewheel gears (116) and (117) set 90 degrees out of phase with each other will cause main output gear (113) to rotate in a continuous and very fluent motion since per FIG. (17) each freewheel (116), (117), (135) and (136) will positively engage the main output gear (113) for only 90 degrees per 360 degrees of grooved disc (104) rotation before its neighboring freewheel takes over by similarity engaging the main output gear (113).

Six or More Freewheel Double Yoke Arrangement

Referring to FIG. (38) which outlines the details of the "Six or more Freewheel T-Joint Arrangement" instead of a "T-Joint" consisting of parts 200, 201 and 202, "double opposed yokes" could be fitted consisting of parts 101, 102, 103, 111, 112, 122 and 123 per FIGS. (9), (10) and (10A). Otherwise the operation would be in all respects similar with that of the "Six or more Freewheel T-Joint Arrangement" per FIG. (38) as described in the relevant section below.

Multiple Double Yoke Arrangements

The geometry of the two and four freewheel double yoke embodiments provides for very high deflection angles of pivotable yoke shaft (102) with respect to the rotation axis of rotating grooved disc (104). Generally, such deflection angles can easily exceed 30 degrees thus, allowing for a very wide range of RPM ratios and TORQUE amplification factors from a high end of over 90 to 1 to a low end of below 2 to 1.

In one embodiment, two sets of the two freewheel double yoke assemblies can be co-axially and co-rotatably placed each on either side of a double faced main output gear such that the central cross assembly freewheels of the right set are positioned on the "north-south" axis when viewed from the front and the central cross assembly freewheels, of the left set are positioned on the "east-west" axis, respectively, thus being 90 degrees out of phase with each other. This arrangement offers the same output gear rotation smoothness as a single four freewheel double yoke assembly but without the use of the oscillating horse shoe.

Referring to FIG. (18), two sets of the four freewheel double yoke assembly are coaxially and co-rotatably placed each on either side of double faced main output gear (137) such that the central cross assembly "north-south" freewheels (116) and (117) of the right set are positioned on the north-south "0–180" degree axis when viewed from the front and the central cross assembly "north-south" freewheels (138) and (139—not shown) of the left set are positioned on the northeast-southwest "45–225" degree axis of the embodiment when viewed from the front, thus being 45 degrees out of phase with each other. The left four freewheel double yoke assembly consists of four freewheels (138), (139—not shown), (140) and (141—not shown), a common output shaft (143) with its reduction gear (142), a common input shaft (144), a pivotable yoke (145), a grooved disc (146) and a fixed yoke (147) in mirror image of the right four freewheel double yoke assembly. Pivotable yoke shafts (102) and (145) deflect outwards within their corresponding grooved disc straight bogie tracks in absolute unison and in a diametrically opposed fashion in order to enhance balancing generally. This arrangement offers an extremely smooth output gear rotation down to an input shaft rotation of well below 500 RPM.

Referring to FIG. (19), two sets of the four freewheel double yoke assembly are co-axially and co-rotatably placed each on either side of a central double faced rotating grooved disc (156) with their respective freewheels being engaged with two identical common output gears (157) rotatably mounted in the opposed ends of the main frame. The free ends of the pivotable yoke shafts are arranged so as to deflect when shifted in a diametrically opposed fashion with respect to the axis of rotation of the central double faced grooved disc (156) for balancing purposes.

Arrangements using more than two sets of double yoke embodiments (each equipped with two, four, six or more freewheels) engaging one or more main output gears can be utilized to meet any extraordinary or special application requirements.

T-joint Pivotable Shaft Assembly Embodiment Description

T-Joint Pivotable Shaft Assembly

In another of the preferred embodiments of the invention at least one T-joint pivotable shaft assembly is utilized preferably having a first rotatably mounted main shaft, a second pivotable and rotatably displaceable shaft pivotably mounted at the mid section of the first main shaft and a central cross assembly connecting the first main shaft to the second pivotable shaft. The first main shaft is rotatably mounted to the embodiment's main frame in "north-south" alignment thereby allowing it to pivot with respect to the main frame but not to be otherwise displaced. The first end of the second pivotable shaft is pivotably mounted to the mid point of the first main shaft through a central cross assembly while the second free end can be simultaneously pivoted and rotatably displaced through motions induced upon it (by the rotating grooved disc as described below) thereby causing it to oscillate on two axes (the "north-south" and "east-west" axes) with respect to the embodiment's main frame. Referring to FIG. 37 concentrically mounted on symmetrically opposed sections of the "north-south" main shaft is north one way clutch "freewheel" (245) and south one way clutch "freewheel" (246) each having a toothed gear concentrically mounted on their outer perimeter such that both said freewheel gears are in turn continuously and simultaneously engaged with common main output gear (237) which is rotatably attached to shaft (249) which is rigidly mounted at orifice (250) of frame (241) of the embodiment and whose axis of rotation (when theoretically extended) passes through the central mid point of the first main shaft. First output reduction gear (240) is coaxially mounted on main output gear (237) and directly meshes with second reduction gear (204) which drives main output shaft (203).

The Central Cross Assembly

The central cross assembly pivotably couples the second rotatably displaceable shaft to the first main shaft. This pivotably coupling can be arranged either through a "rigid" central cross assembly or through a "pivotable" central cross assembly. The following represent the preferred arrangements for each category.

Rigid Central Cross Assembly a) Referring to FIGS. (26) and (26A) the opposed "east-west" orifices (201e) and (201w) of yoke (201) rigidly mounted to the first end of second pivotable shaft (202) are rotatably mounted to the ends of a pair of diametrically opposed "east-west" coaxial stub shafts (200e) and (200w) rigidly and vertically fixed to the mid point of the first main shaft (200).

b) Referring to FIG. (27) the flattened first end (208) of the second pivotable shaft (209) is pivotably mounted to the first main shaft (205) through a horizontal slot (206) centrally located in the mid section of first main shaft (205). First main shaft (205) and second pivotable shaft (209) are held in place through a centrally located "east-west" pin shaft (207) that passes through two opposed vertical orifices centrally located on either side of the horizontal slot (206) of main shaft (205) and an intervening vertical orifice centrally located on the flattened first end (208) of the second pivotable shaft (209).

Pivotable Central Cross Assembly c) Referring to FIG. (28) the flattened central section of short pivotable central "east-west" shaft (211) is pivotably fitted through vertical slot (212) centrally located in the mid section of first main shaft (210) by way of "fore-aft" pin shaft (213) that passes through two opposed horizontal orifices centrally located on either side of vertical slot (212) of main shaft (210) and an intervening horizontal orifice centrally located on the flattened section of short pivotable central "east-west" shaft (211).

Referring to FIGS. (29), (32) and (32A) hollow rimmed cylindrical section (215) is rigidly mounted to the first end of second pivotable shaft (214) such that second pivotable shaft (214) extends radially and vertically outward from such point of the outer perimeter of cylindrical section (215) as lies at the mid longitudinal point of cylindrical section (215). Cylindrical section (215) is in turn rotatably mounted to the opposed ends of short "east-west" pivotable central shaft (211) by way of two diametrically opposed "east-west"

orifices (215e) and (215w) lying on the outer perimeter of cylindrical section (215) whose theoretical central axis intersects the longitudinal axis of cylindrical section (215) vertically and shares the same plane with the longitudinal axis of second pivotable shaft (214).

d) Referring to FIGS. (30) and (31) a central pivotable cross assembly (219) consisting of two parallel circular plates (220a) and (220b) having respectively central horizontal orifices (221a) and (221b) perimetrically connected to each other by two vertically intervening parallel and diametrically opposed plates (222) and (223) each fitted with a radially and outwardly protruding co-axial "east-west" stub shaft (219w) and (219e) respectively is rotatably fitted over mid point (217) of first main shaft (216) which is suitably "flange" shaped and is equipped with a central horizontal orifice (218). Central pivotable cross assembly (219) and first main shaft (216) are held in place by a "fore-aft" pin shaft fitted through orifices (221a) and (221b) of the two parallel circular plates (220a) and (220b) and the intervening central orifice (218) of the first main shaft (216).

Referring to FIG. (29) hollow rimmed cylindrical section (215) is rigidly mounted to the first end of second pivotable shaft (214) such that second pivotable shaft (214) extends radially and vertically outward from such point of the outer perimeter of cylindrical section (215) as lies at the mid longitudinal point of cylindrical section (215). Cylindrical section (215) is in turn rotatably mounted to the opposed co-axial "east-west" stub shafts (219e) and (219w) by way of two diametrically opposed "east-west" orifices (215e) and (215w) lying on the outer perimeter of cylindrical section (215) whose theoretical central axis intersects the longitudinal axis of cylindrical section (215) vertically and shares the same plane with the longitudinal axis of second pivotable shaft (214).

Rotating Grooved Disc Driven by Input Shaft & Pivot Arrangement of Pivotable Yoke Shaft Referring to FIGS. (36), (36A) and (36B) grooved disc (230) consists of an outer flat face (230a) having a vertically mounted central shaft (230c) around which it symmetrically rotates and an inner face (230b) which is inwardly curved to follow the shape of a hemi-sphere or a spherical section thereof having a central arc shaped groove (231) running radially through the entire diameter of its inner face (230b) surface. Referring to FIG. (37) grooved disc (230) is rotatably driven by the power source through shaft (244) and attached gear (243) meshing with gear (242) attached to grooved disc (230) and is rotatably mounted to frame (241) of the embodiment through central shaft (230c) on its outer face (230a). The theoretical extension of the axis of rotation of grooved disc (230) passes through the central mid point of the first main shaft (200) or (205) or (210) or (216). Referring to FIGS. (36), (36A) and (36B) slidable shoe (232) rotatably fitted to the free end of second pivotable shaft (202) or (209) or (214) is slidably mounted in arc shaped groove (231) of the inner face (230b) of grooved disc (230) such that while grooved disc (230) is rotating second pivotable shaft (202) or (209) or (214) can be smoothly displaced (shifted) throughout the entire length of arc shaped groove (231) from being perfectly aligned with the central shaft (230c) of grooved disc (230) until it is 30 degrees or over out of alignment with central shaft (230c).

There exist a variety of displacement (shifting) methods as concerns second pivotable shaft (202) or (209) or (214). A preferred displacement (shifting) method of second pivotable shaft (202) or (209) or (214) is achieved by causing threaded shaft (233a/233b) which is vertical to the axis of rotation of grooved disc (230) and runs through the entire diameter of rotating grooved disc (230) within its own straight squared cross-section groove (231a) which lies directly behind and is radially aligned with arc shaped groove (231) to rotate in either direction thereby forcing carriage (234) which is threadably mounted to threaded shaft (233a) and whose outer body is slidably mounted in squared cross-section groove (231a) to slide up or down squared cross-section groove (231a). Since slidable shoe (232) rotatably mounted to the free end of second pivotable shift (202) or (209) or (214) is connected with threadably mounted carriage (234) through one or a set of pivotable bracket arms (235) the rotation of threaded shaft (233a/233b) will cause threadably mounted carriage (234) to shift thereby forcing the second pivotable shaft to be gradually displaced out of alignment with respect to the central shaft (230c) of grooved disc (230). For balancing purposes half the length of threaded shaft (233a) could be threaded in one direction and the other half (233b) in the other direction. The thread pitches of these sections need not be identical. Threadably mounted carriage (234) would occupy section (233a) while counter-weight carriage (236) would occupy the other section (233b). As threaded shaft (233a/233b) is rotated in one direction threadably mounted carriage (234) and threadably mounted counter-weight carriage (236) would move apart while as threaded shaft (233a/233b) is rotated in the opposite direction they would move together thus allowing static and dynamic counter-balancing of the entire system.

Means of Rotation of the Threaded Shaft

The means of rotation of threaded shaft (233a/233b) per FIGS. (36), (36A) and (36B) are provided by a slidable rack (239) which passes through the hollow center of the central shaft (230c) of grooved disc (230) and which in turn engages through gears (238) and (237) gear (233) which is mounted at the mid point of threaded shaft (233a/233b). As slidable rack (239) is shifted in or out with respect to central shaft (230c) of grooved disc (230) it forces threaded shaft (233a/233b) to which it is engaged through the above said gears (238), (237) and (233) to rotate in both directions.

Two Freewheel Arrangement

Second pivotable shaft (202) or (209) or (214) is caused to oscillate around the "north-south" and "east-west" axes of the central cross assembly when its inclination angle with respect to the axis of rotation of rotating grooved disc (230) is varied from the horizontal position (being zero degrees). The "east-west" oscillation of second pivotable shaft (202) or (209) or (214) causes the first main shaft (200) or (205) or (210) or (216) to which it is rotatably attached through the "east-west" short or pin or stub shafts (201e/201w) or (207) or (211e/211w) or (219e/219w) to oscillate strictly and only around its "north-south" axis. Given an inclination angle of 1 degree, as grooved disc (230) rotates by 360 degrees it will cause the above stated first main shafts to oscillate by 4 degrees (from minus 1 degree through plus 1 degree back to minus 1 degree). Since freewheels (245) and (246) of the above stated first main shafts are opposed one freewheel (245) will positively engage main output gear (237) through the first 180 degrees of rotation of grooved disc (230) and the opposite freewheel (246) will positively engage main output gear (237) through the other 180 degrees of rotation of grooved disc (230) thus producing smooth rotary motion of main output gear (237).

The Oscillating Ring Assembly

Referring to FIGS. (33), (34) and (35) oscillating ring assembly (224/226) transforms the "north-south" oscillation of second pivotable shafts (202) or (209) or (214) to an "east-west" axial oscillation whose axial center shares the same plane with the "north-south" axis of the above stated first main shafts which it vertically intersects at its central mid point. Oscillating ring assembly (224/226) can be either of a semi-circular type such as the oscillating horse shoe (125) described previously or of a circular type (224/226) as described below.

The preferred ring assembly (224/226) is aligned in the "east-west" direction per FIG. (37) and consists of an outer cylindrical hollowed body (224) having two outwardly and radially protruding diametrically opposed "east-west" main shafts (224e) and (224w) rigidly fixed at the mid longitudinal length position of the said cylindrical hollowed body (224). Outer cylindrical hollowed body (224) has a Perimetrical arc shaped slot cut-out extending approximately 60 degrees or more (225) equidistantly situated between "east-west" main shafts (224e) and (224w) whose longitudinal center-line shares the same plane with "east-west" main shafts (224e) and (224w). Second pivotable shafts (202) or (209) or (214) are fitted through the perimetric arc shaped slot (225) which faces the front frame of the embodiment. The ends of the two "east-west" main shafts (224e) and (224w) are rotatably housed in the embodiment's main frame in "east-west" alignment. The first "north-south" main shafts (200) or (205) or (210) or (216) and the two "east-west" main shafts (224e) and (224w) share the same plane, their theoretical extensions vertically intersecting each other at the mid point of the first main shaft (200) or (205) or (210) or (216).

Concentrically mounted on symmetrically opposed sections of the "east-west" main shafts (224e) and (224w) are "freewheels" (one way clutches) (247) and (248—not shown) per FIG. (37) each of which carries a toothed gear concentrically mounted on its outer perimeter such that both freewheel gears (247) and (248—not shown) are in turn continuously and simultaneously engaged with the same main output gear (237) with which the two freewheel gears (245) and (246) attached to symmetrically opposed sections of the first "north-south" main shaft (200) or (205) or (210) or (216) are engaged.

Second pivotable shafts (202) and (209) designated for "rigid cross assemblies" are fitted through the hollowed body of the outer cylindrical oscillating ring assembly by way of a further rimmed inner cylindrical body (226) which is rotatably fitted within the outer cylindrical hollowed body (224) by way of conical thrust bearings or other such devices (228) and (229) and is equipped with a centrally positioned orifice (227) which is aligned with the perimetric arc shaped slot (225) of outer cylindrical hollowed body (224) through which orifice (227) second pivotable shaft (202) or (209) is rotatably filled.

Second pivotable shaft (214) designated for "pivotable cross assemblies" is rotatable fitted through the outer cylindrical hollowed body (224) by way of the hollow rimmed cylindrical section (215) rigidly mounted to its first end through conical thrust bearings or other such devices (228) and (229) such that the second pivotable shaft (214) is aligned with and slidably filled through the perimetric arc shaped slot (225) of outer cylindrical hollowed body (224).

Four Freewheel Double Yoke Arrangement

As the second pivotable shaft (202) or (209) or (214) oscillates in the "north-south" direction it forces the oscillating ring assembly (224/226) or (224/215/214) through which it is rotatably fitted to oscillate strictly around the "east-west" axis of its two main "east-west" shafts (224e) and (224w). Given an inclination angle of 1 degree, as grooved disc (230) rotates by 360 degrees it will cause the "east-west" main shafts (224e) and (224w) to oscillate by 4 degrees (from minus 1 degree through plus 1 degree back to minus 1 degree).

Since the two main "east-west" shafts (224e) and (224w) are opposed and their respective freewheels (248—not shown) and (247) are equally opposed one freewheel (248—not shown) will positively engage main output gear (237) through the first 180 degrees of rotation of grooved disc (230) and the opposite freewheel (247) will positively engage main output gear (237) through the other 180 degrees of rotation of grooved disc (230). The combination of the intermittent engagement of main output gear (237) by the two "east-west" freewheel gears (248—not shown) and (247) and the two "north-south" freewheel gears (245) and (246) set 90 degrees out of phase with each other will cause main output gear (237) to rotate in a continuous and very fluent motion.

Six or More Freewheel T-Joint Arrangement

Referring to FIGS. (37) and (38) as second pivotable shaft's (202) free end is rotatably displaced by rotating grooved disc (230) while simultaneously being "shifted" out of alignment with respect to the grooved disc's axis of rotation (239) second pivotable shaft's (202) passage through space describes a cone whose apex is the central cross assembly's multi-directional center and whose base is the circle described by the motion of the second pivotable shaft's free end. The cone becomes thinner or fatter as the second pivotable shaft's (202) free end is "shifted" into alignment or shifted out of alignment with respect to the rotating grooved disc's axis of rotation (239). In fact, second pivotable shaft (202) radially oscillates much like a pendulum around infinite axes of oscillation with respect to axis of rotation (239) of grooved disc (230).

Accordingly, any number of opposed pairs of freewheels mounted on corresponding oscillating horse shoes or oscillating ring assemblies can be symmetrically positioned around the central cross assembly's main "north-south" shafts. Since all said horse shoes or ring assemblies are made to oscillate by the motion induced upon them by the second pivotable and rotatably displaceable shaft which is in turn slidably and rotatably fitted through the hollow arc shaped cut-out on each of them, if more than one such horse shoe or ring assembly is used each must be dimensioned such that one clears the other when they begin oscillating. Referring to FIG. (38) oscillating ring assembly (224/226) is dimensioned smaller than oscillating ring assembly (224A/226A) such that it adequately clears the second when both are simultaneously oscillating.

Referring to FIGS. (33), (34), (35), (37) and (38) oscillating ring assemblies (224/226) and (224A/2246A) are symmetrically positioned around first main shaft (200) such that each of their corresponding freewheels (253/254), (255/256) and (251/252) form a sixty degree angle between themselves and each of their neighboring freewheels. Second pivotable shaft (202) is fitted through bearings (227) and (227A) of inner rings (226) and (226A) and through slot cut-outs (225) and (225A) of outer rings (224) and (224A) respectively. Inner rings (226) and (226A) are fitted to their corresponding outer rings (224) and (224A) through their respective ball bearings (228/229) and (228A/229A).

Accordingly, second pivotable and rotatably displaceable shaft (202) causes first main shaft (200) and oscillating ring assemblies (224/226) and (224A/226A) to oscillate around their corresponding (0–180 degree), (60–240 degree) and (120–300 degree) axes respectively. The resultant rotational motion of common output gear (237) is extremely smooth and even since each freewheel engages main output gear (237) for every 60 degrees of rotation of grooved disc (230) before its neighboring freewheel positively engages main output gear (237) thus ensuring a continuous and fluent motion.

Multiple T-Joint Arrangements

The descriptions made earlier above under "Multiple Double Yoke Arrangements" apply equally to Multiple T-Joint Arrangements.

Arrangements using more than two sets of T-Joint embodiments (each equipped with two, four, six or more freewheels) engaging one or more main output gears can be utilized to meet any extraordinary or special application requirements.

Reverse Mode for All Embodiments

The output shaft rotation of all embodiment types described above [Swash Plate Embodiment, Double Yoke Embodiment and T-Joint Embodiment] can be reversed by way of an intervening reverse gear arrangement (or differential type gear cage) placed between the main output shaft (or main output gear) and the final drive shaft before the final drive. There exists an abundance of prior art as concerns such reverse gear devices which can properly perform this task.

If a differential type gear cage is employed the main output gear of any of the three embodiments described above need not come to a complete stop before shifted to the reverse mode.

Transmission Leverage & Rotational Motion Analysis

For a given input shaft RPM and TORQUE setting and regardless of the configuration employed (two, four or six freewheel swash plates or two or double yoke or T-joint pivotable shaft embodiments or multiple sets thereof) every specific pivot angle setting (for swash plate embodiments) and every specific shaft deflection angle selling (for double yoke or T-joint pivotable shaft embodiments) will result in one and only one freewheel TORQUE and RPM setting provided always that all the freewheels have identical perimeters (teeth) to each other, are engaged to one or more main output gears having identical perimeters (teeth) to each other and that all pivot/deflection angles of the swash plates/double yokes/T-joint pivotable shafts involved (if more than one set is used) are identical.

For example given a two freewheel swash plate or a two freewheel double yoke or a T-joint embodiment (where each freewheel is 180 degrees out of phase to the other) set at a pivot/deflection angle of (1) degree with respect to the input shaft/grooved disc shaft: for every (360) degrees of rotation of the input shaft/grooved disc each freewheel's main concentric shaft will oscillate through a total of (4) degrees and will cause its respective freewheel to provide 2 degrees of positive engagement to the main output gear and 2 degrees of overrun since each freewheel carrying main shaft will oscillate from (−1) degree through (0) degrees to (+1) degree for the first 180 degrees of rotation of the input shaft/grooved disc and then from (+1) degree back through (0) degrees to (−1) degree for the second 180 degrees of rotation of the input shaft/grooved disc. Thus for (1) degree of pivot/deflection each freewheel will positively engage the main output gear through (2) degrees of freewheel rotation and disengage for another (2) degrees (since both freewheels continuously and directly mesh with the main output gear but are opposite each other) thus each freewheel in fact rotating (4) degrees around its main carrying shaft for every 360 degrees of rotation of the input shaft/grooved disc. This provides a theoretical ratio of input shaft/grooved disc RPM to freewheel RPM of (360) degrees to (4) degrees or (90 to 1) and a corresponding multiplication of freewheel TORQUE with respect to input shaft/grooved disc TORQUE by a factor of (90).

Correspondingly: (2) degrees of pivot/deflection angle will provide theoretical input shaft/grooved disc to freewheel RPM ratios of (45 to 1) and corresponding multiplication of freewheel TORQUE with respect to input shaft/grooved disc TORQUE by a factor of (45), furthermore (22.5) degrees of pivot/deflection angle will provide theoretical input shaft/grooved disc to freewheel RPM ratios of (4 to 1) and corresponding multiplication of freewheel TORQUE with respect to input shaft/grooved disc TORQUE by a factor of (4).

The invention's effect on RPM ratios and TORQUE amplification factors between the input shaft/grooved disc and the freewheels is summarized in "Table A" below:

TABLE A

| pivot angle or deflection angle | RPM ratio of in shaft/Disc to freewheel | Torque increase factor | pivot angle or deflection angle | RPM ratio of in shaft/Disc to freewheel | Torque increase factor |
| --- | --- | --- | --- | --- | --- |
| 1 | 90.00 to 1 | 90.00 | 16 | 5.63 to 1 | 5.63 |
| 2 | 45.00 to 1 | 45.00 | 17 | 5.29 to 1 | 5.29 |
| 3 | 30.00 to 1 | 30.00 | 18 | 5.00 to 1 | 5.00 |
| 4 | 22.50 to 1 | 22.00 | 19 | 4.74 to 1 | 4.74 |
| 5 | 18.00 to 1 | 18.00 | 20 | 4.50 to 1 | 4.50 |
| 6 | 15.00 to 1 | 15.00 | 21 | 4.29 to 1 | 4.29 |
| 7 | 12.86 to 1 | 12.86 | 22 | 4.09 to 1 | 4.09 |
| 8 | 11.25 to 1 | 11.25 | 23 | 3.91 to 1 | 3.91 |
| 9 | 10.00 to 1 | 10.00 | 24 | 3.75 to 1 | 3.75 |
| 10 | 9.00 to 1 | 9.00 | 25 | 3.60 to 1 | 3.60 |
| 11 | 8.18 to 1 | 8.18 | 26 | 3.46 to 1 | 3.46 |
| 12 | 7.50 to 1 | 7.50 | 27 | 3.33 to 1 | 3.33 |
| 13 | 6.92 to 1 | 6.92 | 28 | 3.21 to 1 | 3.21 |
| 14 | 6.43 to 1 | 6.43 | 29 | 3.10 to 1 | 3.10 |
| 15 | 6.00 to 1 | 6.00 | 30 | 3.00 to 1 | 3.00 |

Note (1) The above TORQUE factors and RPM ratios will vary slightly if measured at the common main output gear due to the fact that the freewheels will transmit to the common output gear their highest rate of rotation while in the engaged mode and not their average rate of rotation which is represented above. The effect of this is that pivot/deflection angles of 1 degree the common output gear's RPM ratio with respect to the input shaft/grooved disc will remain at approximately [90 to 1] and its corresponding TORQUE increase factor will remain at approximately [90] assuming a gear ratio of [1/1] between the common output gear and each freewheel gear. At intermediate pivot/deflection angles the respective RPM ratios and TORQUE increase factors will reduce at a slightly faster rate than indicated in [Table A] above, while at pivot/deflection angles of 30 degrees the common output gear's RPM ratio will be approximately [1.8 to 1] and its corresponding TORQUE increase factor will be approximately [1.8] with respect to the input shaft/grooved disc.

At swash plate pivot angles or double yoke/T-joint pivotable shaft embodiment deflection angles below ½ of one degree, the freewheel carrying shafts begin to cease positively engaging the freewheels and thus even though the input shaft/grooved disc continue to rotate the freewheels will effectively stop rotating and accordingly the main output gear to which they are engaged will also stop rotating. In effect all transmission of the input shaft/grooved disc rotation ceases and the swash plate/double yoke/T-joint pivotable shaft embodiments act like an input source RPM disengaging clutch.

Once the pivot/deflection angle starts positively engaging the freewheels at say between ½ of one degree and 1 degree the invented transmission's freewheels provide their highest TORQUE amplification of the input source TORQUE and correspondingly their lowest output RPM with respect to the input source RPM.

Furthermore, in configurations employing multiple pairs of freewheels engaged to the same main output gear (but symmetrically out of phase to each other), each freewheel positively engages the main output gear only when the main concentric shaft to which it is mounted oscillates in such positive direction faster than any other main concentric freewheel shaft at that given time and disengages its main concentric shaft at all other times.

Thus all additional freewheels (over and above the basic two opposed freewheels of any embodiment) provide a supportive effect to one another by increasing their frequency of engagement (at maximum freewheel carrying shaft rotation speed) of the main output gear per each 360 degree rotation of the input shaft/grooved disc.

Thus in the case of a single "four freewheel" swash plate/double yoke/T-joint pivotable shaft embodiment each freewheel will positively engage the main output gear through only 90 degrees [or part thereof as explained under Note (1) above] for each 360 degree rotation of the input shaft/grooved disc before its neighboring freewheel begins to engage the main output gear due to the faster rate of rotation of its concentric main carrying shaft.

Correspondingly, in an embodiment involving two "four freewheel" swash plate/double yoke/T-joint pivotable shaft embodiments engaged to the left and right of a double faced main output gear or a double faced grooved disc and 45 degrees out of phase to each other, each of the eight freewheels will engage the main output gear through only 45 degrees [or part thereof as explained under Note (1) above] for each 360 degree rotation of the input shaft/grooved disc before its neighboring freewheel begins to engage the main output gear due to the faster rate of rotation of its concentric main carrying shaft. This will result in a perfectly smooth and fluent rotation speed of the main output gear at input shaft/grooved disc RPM of well below 500.

Since the angle of pivot/deflection of the swash plate/double yoke/T-joint embodiment can be varied infinitely within the range of between (0) degrees and over (30) degrees so too will the transmission's RPM ratios and TORQUE amplification factors vary infinitely within the range of over [90 to 1] down to below [2 to 1].

Furthermore, the invented transmission remains continuously engaged throughout the entire shifting process. This means that since there are no neutral spots in the shifting process (excepting only when the transmission acts like a clutch at the (0) degree pivot/deflection angle setting) there can be no loss of momentum whatsoever while shifting.

In conclusion the invention provides for an infinitely and continuously variable transmission system which is very compact, has very few and simple to engineer moving parts, has very low friction losses with correspondingly low wear and tear, requires no input shaft disengaging clutch, provides infinite TORQUE and RPM ratios within a range starting from over (90 to 1) down to below (2 to 1) while at the same time it is able to deliver very high TORQUE throughputs without any slippage whatsoever.

I claim:

1. An infinitely and continuously variable transmission system comprising:
    a main frame;
    a rotatable input shaft having a retaining member on a first end thereof;
    a main output gear having at least one toothed surface; and
    at least one drive assembly comprising
        an outer ring member pivotally mounted to the main frame about two opposing first shaft members;
        first and second one-way clutch assemblies mounted on each of the two outer ring first shaft members, each said clutch assembly being freely rotatable in one direction of rotation of its carrying shaft and non-rotatable in the opposite direction of rotation of its carrying shaft and having a toothed gear on its outer perimeter for positively engaging the toothed surface of the output gear, said clutch assemblies being mounted such that they each move the main output gear in the same circular direction as their freely rotatable direction of rotation;
        a swash plate assembly comprising an outer non-rotating portion pivotally coupled to the outer ring member by two second shaft members mounted on an outer perimeter of the non-rotating portion; an inner circular rotating portion mounted concentrically to the outer non-rotating portion; said inner circular rotating portion having a slot formed through its center and a centrally positioned retaining member housing for pivotally mounting the retaining member of the input shaft to thereby force the inner portion to co-rotate with the input shaft while at the same time allowing it to pivot with respect to the input shaft thereby causing the outer portion to oscillate about its shaft axes; wherein the common plane shared by the longitudinal axis of each shaft passes through the point where the longitudinal axis of the retaining member intersects the longitudinal axis of the input shaft and wherein one clutch assembly positively engages the main output gear through the first one-hundred eighty degrees of rotation of the input shaft and the other clutch assembly positively engages the main output gear through the other one-hundred eighty degrees of rotation of the input shaft; and
    pivoting means connected to the inner circular rotating portion of the swash plate assembly and a shifting member for causing the inner circular rotating portion of the swash plate assembly to pivot in response to movement of the shifting member, to thereby vary the torque and revolutions per minute of the transmission system.

2. The transmission system of claim 1 further comprising a pair of opposing third shaft members mounted on an outer perimeter of the non-rotating portion ninety degrees apart from the second shafts and a spider having an inner yoke and an outer yoke, said yokes formed by two sets of double legs set ninety degrees apart and connected to each other through a common hub, the inner yoke of the spider pivotally mounted to the first shafts of the swash plate assembly, the outer yoke of the spider having two protruding opposed main shafts vertically fixed at the end of each leg such that the longitudinal axis of said outer yoke main shafts share the same plane; said two spider main shafts being pivotally mounted to the main frame to allow the spider to pivot with respect to the main frame about the axle of the spider main shafts and third and fourth one-way clutch assemblies concentrically mounted on each of the two spider main shafts and being engaged with the main output gear such that the four clutch assemblies positively engage the main output gear sequentially one at a time through corresponding sequential ninety degree rotations of the input shaft.

3. The transmission system of claim 1 wherein the clutch assemblies are mounted between the main frame and the outer ring member.

4. The transmission system of claim 2 wherein the first and second clutch assemblies are mounted between the main frame and the outer ring member and the third and fourth clutch assemblies are mounted between the spider and the main frame.

5. The transmission system of claim 1 wherein the output gear comprises a double faced gear having a first toothed surface on a first face of the gear a second toothed surface on a second face of the gear and further comprising a second drive assembly co-axially and co-rotatably mounted with said first drive assembly for engaging the second toothed surface of the output gear, said clutch assemblies of said second drive assembly being ninety degrees out of phase with said clutch assemblies of said first drive assembly.

6. The transmission system of claim 2 wherein the output gear comprises a double faced gear having a first toothed surface on a first face of the gear a second toothed surface on a second face of the gear and further comprising a second drive assembly co-axially and co-rotatably mounted with said first drive assembly for engaging the second toothed surface of the output gear, said clutch assemblies of said second drive assembly being forty-five degrees out of phase with said clutch assemblies of said first drive assembly.

7. An infinitely and continuously variable transmission system comprising:
   a main frame;
   a rotatable input shaft having a retaining member on a first end thereof;
   a main output gear having at least one toothed surface; and
   at least one drive assembly comprising
   an outer ring member pivotally mounted to the main frame about two opposed outer ring shaft members;
   first and second spiders each having an inner yoke and an outer yoke, said yokes formed by two sets of double legs set ninety degrees apart and connected to each other through a common hub, the outer yoke of each of the spiders having a pair of protruding opposed main shafts vertically fixed at the end of each leg such that the longitudinal axis of said outer yoke main shafts share the same plane and such that the pair of outer yoke main shafts of said first spider, the pair of outer yoke main shafts of said second spider and the pair of outer ring shaft members are set sixty degrees apart; said spider main shafts being pivotally mounted to the main frame to allow the spider to pivot with respect to the main frame;
   first and second one-way clutch assemblies concentrically mounted on each of the two outer ring shaft members and third, fourth, fifth and sixth one-way clutch assemblies concentrically mounted on each outer yoke main shaft of the first and second spiders, each said clutch assembly being freely rotatable in one direction of rotation of its carrying shaft and non-rotatable in the opposite direction of rotation of its carrying shaft and having a toothed gear on its outer perimeter for positively engaging the toothed surface of the output gear, said clutch assemblies being mounted such that they each move the main output gear in the same circular direction as their freely rotatable direction of rotation;
   an inner ring member concentric with said outer ring member and having first and second pairs of inner ring shafts on an outer perimeter of the inner ring member, said first pair of inner ring shafts being pivotally coupled to the outer ring sixty degrees apart from said first pair of outer ring shaft members and said second pair of inner ring shafts being pivotally coupled to the inner yoke of said second spider ninety degrees apart from said first pair of inner ring shafts;
   a swash plate assembly comprising an outer non-rotating portion pivotally coupled to the inner ring member by a first pair of short shafts mounted on an outer perimeter of the non-rotating portion coaxially with the outer yoke main shafts of the first spider and pivotally coupled to the inner yoke of said first spider by a second pair of short shafts on said outer perimeter of the non-rotating portion ninety degrees apart from said outer yoke main shafts of the first spider; an inner circular rotating portion mounted concentrically to the outer non-rotating portion; said inner circular rotating portion having a slot formed through its center and a centrally positioned retaining member housing for pivotally mounting the retaining member of the input shaft to thereby force the inner portion to co-rotate with the input shaft while at the same time allowing it to pivot with respect to the input shaft thereby causing the outer portion to oscillate about its axes; wherein the common plane shared by the longitudinal axis of each shaft passes through the point where the longitudinal axis of the retaining member intersects the longitudinal axis of the input shaft and wherein the six clutch assemblies positively engage the main output gear sequentially one at a time through corresponding sequential sixty degree rotations of the input shaft; and
   pivoting means connected to the inner circular rotating portion of the swash plate assembly and a shifting member for causing the inner circular rotating portion of the swash plate assembly to pivot in response to movement of the shifting member, to thereby vary the torque and revolutions per minute of the transmission system.

8. The transmission system of claim 7 wherein the output gear comprises a double faced gear having a first toothed surface on a first face of the gear a second toothed surface on a second face of the gear and further comprising a second drive assembly co-axially and co-rotatably mounted with said first drive assembly for engaging the second toothed surface of the output gear, said clutch assemblies of said second drive assembly being thirty degrees out of phase with said clutch assemblies of said first drive assembly.

9. The transmission system of any of claims 1–8 wherein the inner rotating portion of the swash plate assembly is mounted to the outer portion by an intervening main thrusts bearing and further comprising a thrust bearing retention ring concentrically fixedly attached to the non-rotating portion of said swash plate assembly, said retention ring holding the inner rotating portion, the intervening main thrust bearing and the outer non-rotating portion together as an assembly through an auxiliary thrust bearing intervening between the retention ring and the inner rotating portion.

10. An infinitely and continuously variable transmission system comprising:
   a main frame;
   a rotatable input shaft driving a rotating grooved member; and
   at least one drive assembly comprising
   a main output gear having at least one toothed surface;
   a double yoke assembly having a fixed first yoke, a pivotable second yoke opposed to and out of phase with respect to said first yoke and a central cross assembly pivotably connected to the two opposed yokes at their respective fork ends; said fixed yoke having a central shaft rigidly mounted to the main frame at a rear portion thereof to thereby prevent said first yoke from either rotating or being rotatably displaced; said pivotable second yoke having an attached pivotable yoke shaft that cannot rotate but whose free end can be rotatably displaced thereby causing it to oscillate about infinite axes with respect to the fixed yoke to which it is pivotally mounted;

said central cross assembly having a central hollow hub having a first pair of opposed co-axial main shafts radially and rigidly mounted on its outer perimeter in a first axis and rotatably connected to correspondingly axially oriented orifices of the fixed yoke fork ends, said shaft ends being rotatably housed in the main frame and a second pair of opposed co-axial main shafts radially and rigidly mounted on its outer perimeter in a second axis out of phase with the first axis and rotatably connected to the corresponding axially oriented orifices of the pivotable yoke fork ends, all said first and second pair shafts axis being co-planar to each other such that their theoretical extensions intersect each other vertically at the same point as the hub's multidirectional center;

first and second one-way clutch assemblies concentrically mounted on each of the two first main shafts, each said clutch assembly being freely rotatable in one direction of rotation of its carrying shaft and non-rotatable in the opposite direction of rotation of its carrying shaft and having a toothed gear on its outer perimeter for positively engaging the toothed surface of the output gear, said clutch assemblies being mounted such that they each move the main output gear in the same circular direction as their freely rotatable direction of rotation, wherein one clutch assembly positively engages the main output gear through the first one-hundred eighty degrees of rotation of the rotating grooved member and the other clutch assembly positively engages the main output gear through the other one-hundred eighty degrees of rotation of the rotating grooved member;

the rotating grooved member being rotatably mounted on the main frame and connected to a free end of the pivotable second yoke shaft through a first groove which passes diametrically through the grooved member surface facing said pivotable second yoke shaft, the free end of the pivotable second yoke shaft being slidably and rotatably mounted in said first groove; and displacement means connected to a shifting member and the pivotable second yoke shaft for displacing the pivotable second yoke shaft smoothly throughout the length of the groove while the grooved member is rotating in response to movement of the shifting member, to thereby vary the torque and revolutions per minute of the transmission system.

11. The transmission system of claim 10 further comprising an oscillation conversion assembly including a central section having a pair of diametrically opposed, protruding, co-axial third main shafts co-aligned with the second axis and radially fitted on its outer perimeter whose ends are rotatably housed in the main frame wherein the two first main shafts of the central cross assembly and the two third main shafts of the oscillation conversion assembly are co-planar such that their theoretical extensions vertically intersect each other at a point co-incidental to the point of intersection of the first and second pair of main shafts of the central cross assembly; and third and fourth one-way clutch assemblies concentrically mounted on each of the main shafts of the oscillation conversion assembly and being engaged with the main output gear such that the four one-way clutch assemblies positively engage the main output gear sequentially one at a time through corresponding sequential ninety degree rotations of the rotating grooved member.

12. The transmission system of claim 11 having a second oscillation conversion assembly mounted such that the main shafts of the first and second oscillation conversion assemblies are co-planar with each other and with the central cross assembly's first main shafts and are radially and symmetrically positioned at 60 degree intervals with respect to the central cross assembly's first main shafts and each other, wherein the second oscillation conversion assembly is dimensioned such that it clears the first oscillation conversion assembly when they both begin oscillating as a result of the oscillating motion of the pivotable second yoke shaft; and fifth and sixth one-way clutch assemblies concentrically mounted on each of the main shafts of the second oscillation conversion assembly and being engaged with the main output gear such that the six one-way clutch assemblies positively engage the main output gear sequentially one at a time through corresponding sequential sixty degree rotations of the rotating grooved member.

13. The transmission system of claim 12 wherein more than two oscillation conversion assemblies are radially and symmetrically positioned around the central cross assembly's first main shafts such that their main shafts are co-planar and positioned at equal angular intervals with respect to the central cross assembly's first main shafts and are dimensioned to clear each other when they all begin oscillating as a result of the oscillating motion of the pivotable second yoke shaft; and further one-way clutch assemblies concentrically mounted on each of the main shafts of such additional oscillation conversion assemblies and being engaged with the main output gear such that they all positively engage the main output gear sequentially one at a time through corresponding sequential equal rotational arcs of the rotating grooved member.

14. The transmission system of claims 11, 12 or 13 wherein the central section of each oscillation conversion assembly comprises a hollow cylindrical ring having a perimetrical arch shaped radial slot cut-out symmetrically positioned between and sharing the same plane with the two diametrically opposed, protruding, co-axial main shafts radially fitted on its outer perimeter, through which slot the pivotable second yoke shaft, is slidably and rotatably mounted such that it can oscillate within such slot through an arc aligned with and co-planar to the said main shafts.

15. The transmission system of claims 11, 12 or 13 wherein the central section of each oscillation conversion assembly comprises a hollow semi-cylindrically shaped horse shoe having a perimetrical arc shaped radial slot cut-out symmetrically positioned between and sharing the same plane with the two diametrically opposed, protruding, co-axial main shafts radially fitted to the horse shoe ends of its outer perimeter, through which slot the pivotable second yoke shaft is slidably and rotatably mounted such that it can oscillate within such slot through an arc aligned with and co-planar to the said main shafts.

16. The transmission system of claims 11, 12 or 13 wherein the central section of the oscillation conversion assembly comprises an outer hollow cylindrical ring having a perimetrical arc shaped radial slot cut-out symmetrically positioned between and sharing the same plane with the two diametrically opposed, protruding, co-axial main shafts radially fitted on its outer perimeter, through which slot the pivotable second yoke shaft is freely fitted such that it can oscillate within such slot through an arc aligned with and co-planar to the said main shafts, and an inner hollow cylindrical ring having a centrally positioned orifice on its cylindrical shell through which the pivotable second yoke shaft is rotatably mounted such that said orifice is rotatably aligned with the slot cut-out of the outer ring; the inner and outer rings being coaxially and rotatably fitted to each other such that the inner ring freely and centrally rotates with respect to the outer ring.

17. The transmission system of claims 10, 11, 12 or 13 wherein said displacement means comprises an extension arm that can be either screwed-in or screwed-out through a hollow central section of the pivotable second yoke shaft, thereby forcing a pivotably and rotatably fitted sliding bogie attached to the extension arm end to slide radially within a straight second grooved-track of the grooved rotating member which is aligned with and positioned behind the first groove, thereby displacing the pivotable second yoke shaft within the first groove.

18. The transmission system of claims 10, 11, 12 or 13 wherein said displacement means comprises an extension arm that can be either screwed-in or screwed-out through a hollow central section of the pivotable second yoke shaft, thereby forcing a twin flange assembly, whose first flange is rotatably mounted to the extension arm end and slidably fitted within the first groove of the rotating grooved member and whose second flange is rotatably mounted to the pivotable second yoke shaft and pivotally connected to two pivoting bracket arms, said bracket arms being rotatably connected to two co-axial anchoring points lying within the grooved member and running parallel with and on either side of the first groove, to follow an arc-shaped track around the co-axial anchoring points thereby displacing the pivotable second yoke shaft within the first groove.

19. The transmission system of claims 10, 11, 12 or 13 wherein said displacement means comprises an extension arm that can be either screwed-in or screwed-out through a hollow central section of the pivotable second yoke shaft, thereby forcing a geared side of a rack rotatably mounted to the extension arm and to engage gear cage gears rotatably mounted within a slidable gear cage on independent shafts, said gear cage being rotatably mounted around a free end of the pivotable second yoke shaft and slidably mounted within said first groove, and further comprising means for preventing rotation of the rack within the gear cage by sliding in a longitudinal groove of the rack, at least one of said gear cage gears being coaxially and rigidly fixed to twin gears that mesh with twin corresponding gear surfaces that are rigidly fixed upon an inner concave face of the grooved member in coaxial alignment with and running parallel on either side of and outside the first groove, wherein the screwing out of the extension arm causes the rack to rotate the gear cage gears and the twin gears to thereby force the free end of the pivotable yoke shaft to be gradually displaced out of alignment with respect to a central shaft of the grooved member.

20. The transmission system of claims 10, 11, 12 or 13 wherein said displacement means comprises an extension arm that can be either screwed-in or screwed-out through a hollow central section of the pivotable second yoke shaft, thereby forcing a geared side of a rack rotatably mounted to the extension arm end to engage gear cage gears rotatably mounted within a slidable gear cage on independent shafts, said gear cage being rotatably mounted around a free end of the pivotable second yoke shaft and slidably mounted within said first groove, and further comprising means for preventing rotation of the rack within the gear cage by sliding in a longitudinal groove of the rack, at least one of said gear cage gears being coaxially and rigidly fixed to twin gears that mesh with twin corresponding gear surfaces that are rigidly fixed within the first groove in coaxial alignment with and running parallel to the first groove, wherein the screwing out of the extension arm causes the rack to rotate the gear cage gears and the twin gears to thereby force the free end of the pivotable yoke shaft to be gradually displaced out of alignment with respect to a central shaft of the grooved member.

21. The transmission system of claim 10 wherein the first and second clutch assemblies are mounted between the fixed yoke's fork ends and the main frame.

22. The transmission system of claim 11 wherein the first and second clutch assemblies are mounted between the fixed yoke's fork ends and the main frame and each of the third and forth clutch assemblies are mounted between the conversion assembly and the main frame.

23. The transmission system of claim 12 wherein the first and second clutch assemblies are mounted between the fixed yoke's fork ends and the main frame and each of the third and fourth clutch assemblies are mounted between the first conversion assembly and the main frame and each of the fifth and sixth clutch assemblies are mounted between the second conversion assembly and the main frame.

24. The transmission system of claims 10, 11, 12 or 13 wherein the axis of rotation of the rotating grooved member is concentric to the axis of the fixed yoke's central shaft.

25. The transmission system of claim 24 wherein the groove is an arc-shaped groove.

26. The transmission system of claim 25 wherein the center of the arc is the multidirectional center of the central hollow bub.

27. The transmission system of claim 10 wherein the output gear comprises a double faced gear having a first toothed surface on a first face of the gear and a second toothed surface on a second face of the gear and further comprising a second drive assembly co-axially and co-rotatably mounted with said first drive assembly for engaging the second toothed surface of the output gear, said clutch assemblies of said second drive assembly being ninety degrees out of phase with said clutch assemblies of said first drive assembly.

28. The transmission system of claim 11 wherein the output gear comprises a double faced gear having a first toothed surface on a first face of the gear and a second toothed surface on a second face of the gear and further comprising a second drive assembly co-axially and co-rotatably mounted with said first drive assembly for engaging the second toothed surface of the output gear, said clutch assemblies of said second drive assembly being forty-five degrees out of phase with said clutch assemblies of said first drive assembly.

29. The transmission system of claim 12 wherein the output gear comprises a double faced gear having a first toothed surface on a first face of the gear and a second toothed surface on a second face of the gear and further comprising a second drive assembly co-axially and co-rotatably mounted with said first drive assembly for engaging the second toothed surface of the output gear, said clutch assemblies of said second drive assembly being thirty degrees out of the phase with said clutch assemblies of said first drive assembly.

30. The transmission system of claim 10 wherein the rotating grooved member comprises a double faced grooved member and further comprising a second drive assembly co-axially and co-rotatably mounted with said first drive assembly, the main output gear of said first drive assembly and the main output gear of said second drive assembly being co-rotatable, wherein a first face of the double faced grooved member cooperates with said first drive assembly and a second face of the double faced grooved member cooperates with said second drive assembly, said clutch assemblies of said second drive assembly being ninety degrees out of phase with said clutch assemblies of said first drive assembly.

31. The transmission system of claim 11 wherein the rotating grooved member comprises a double faced grooved member and further comprising a second drive assembly co-axially and co-rotatably mounted with said first drive assembly, the main output gear of said first drive assembly and the main output gear of said second drive assembly being co-rotatable, wherein a first face of the double faced grooved member cooperates with said first drive assembly and a second face of the double faced grooved member cooperates with said second drive assembly, said clutch assemblies of said second drive assembly being forty-five degrees out of phase with said clutch assemblies of said first drive assembly.

32. The transmission system of claim 12 wherein the rotating grooved member comprises a double faced grooved member and further comprising a second drive assembly co-axially and co-rotatably mounted with said first drive assembly, the main output gear of said first drive assembly and the main output gear of said second drive assembly being co-rotatable, wherein a first face of the double faced grooved member cooperates with said first drive assembly and a second face of the double faced grooved member cooperates with said second drive assembly, said clutch assemblies of said second drive assembly being thirty degrees out of phase with said clutch assemblies of said first drive assembly.

33. An infinitely and continuously variable transmission system comprising:

a main frame;

a rotatable input shaft driving a rotating grooved member; and at least one drive assembly comprising a main output gear having at least one toothed surface;

a T-joint pivotable shaft assembly having a first main shaft rotatably mounted to the main frame in a first axial orientation, said first main shaft being allowed to pivot with respect to the main frame but not being otherwise displaceable;

a second pivotable and rotatably displaceable shaft having a first end pivotably mounted at a mid section of the first main shaft through a central cross assembly, and a second free end that can be rotatably displaced to cause the second pivotable shaft to oscillate about infinite axes with respect to the main frame;

first and second one-way clutch assemblies concentrically mounted on each of the first axially-oriented sections of the first shaft, each said clutch assembly being freely rotatable in one direction of rotation of its carrying section of the first shaft and non-rotatable in the opposite direction of rotation of its carrying section of the first shaft and having a toothed gear on its outer perimeter for positively engaging the toothed surface of the output gear, said clutch assemblies being mounted such that they each move the main output gear in the same circular direction as their freely rotatable direction of rotation, wherein one clutch assembly positively engages the main output gear through the first one-hundred eighty degrees of rotation of the rotating grooved member and the other clutch assembly positively engages the main output gear through the other one-hundred eighty degrees of rotation of the rotating grooved member; and the grooved member being rotatably mounted on the main frame and connected to the free end of the second pivotable shaft through a first groove which passes diametrically through the grooved member surface facing said second pivotable shaft, such free end of the second pivotable shaft being slidably and rotatably mounted in said first groove through a rotatable sliding shoe; and displacement means connected to a shifting member and the shoe of the second shaft for displacing the second shaft smoothly throughout the length of the first groove while the grooved member is rotating in response to movement of the shifting member, to thereby vary the torque and revolutions per minute of the transmission system.

34. The transmission system of claim 33 further comprising an oscillation conversion assembly including a central section having a pair of diametrically opposed, protruding, co-axial second main shafts aligned in a second axial orientation and radially fitted on its outer perimeter whose ends are rotatably housed in the main frame in said second axial orientation, wherein the two ends of the first main shaft and the two second main shafts of the oscillation conversion assembly are co-planar such that their theoretical extensions vertically intersect each other at the central mid-point of the first main shaft; and third and fourth one-way clutch assemblies concentrically mounted on each of the second main shafts of the oscillation conversion assembly and being engaged with the main output gear such that the four one-way clutch assemblies positively engage the main output gear sequentially one at a time through corresponding sequential ninety degree rotations of the rotating grooved member.

35. The transmission system of claim 34 having a second oscillation conversion assembly mounted such that the second main shafts of the first oscillation conversion assembly and the third main shafts of the second oscillation conversion assembly are co-planar with each other and with the shaft ends of the first main shaft and are radially and symmetrically positioned at 60 degree intervals with respect to the first main shaft and each other, wherein the second oscillation conversion assembly is dimensioned such that it clears the first oscillation conversion assembly when they both begin oscillating as a result of the oscillating motion of the second pivotable shaft; and fifth and sixth one-way clutch assemblies concentrically mounted on each of the third main shafts of the second oscillation conversion assembly and being engaged with the main output gear such that the six one-way clutch assemblies positively engage the main output gear sequentially one at a time through corresponding sequential sixty degree rotations of the rotating grooved member.

36. The transmission system of claim 35 wherein more than two oscillation conversion assemblies are radially and symmetrically positioned around the shaft ends of the first main shaft such that their main shafts are co-planar and positioned at equal angular intervals with respect to the shaft ends of the first main shaft and are dimensioned to clear each other when they all begin oscillating as a result of the oscillating motion of the second pivotable shaft; and further one-way clutch assemblies concentrically mounted on each of the main shafts of such additional oscillation conversion assemblies and being engaged with the main output gear such that they all positively engage the main output gear sequentially one at a time through corresponding sequential equal rotational arcs of the rotating grooved member.

37. The transmission system of claims 34, 35 or 36 wherein the central section of each oscillation conversion assembly comprises a hollow cylindrical ring having a perimetrical arc shaped radial slot cut-out symmetrically positioned between and sharing the same plane with the two diametrically opposed, protruding, co-axial main shafts radially fitted on its outer perimeter, through which slot the second pivotable shaft is slidably and rotatably mounted such that it can oscillate within such slot through an arc aligned with and co-planar to the said main shafts.

38. The transmission system of claims 34, 35 or 36 wherein the central section of each oscillation conversion assembly comprises a hollow semi-cylindrically shaped horse shoe having a perimetrical arc shaped radial slot cut-out symmetrically positioned between and sharing the same plane with the two diametrically opposed, protruding, co-axial main shafts radially fitted to the horse shoe ends of its outer perimeter, through which slot the second pivotable shaft is slidably and rotatably mounted such that it can oscillate within such slot through an arc aligned with and co-planar to the said main shafts.

39. The transmission system of claims 34, 35 or 36 wherein the central section of each oscillation conversion assembly comprises an outer hollow cylindrical ring having a perimetrical arc shaped radial slot cut-out symmetrically positioned between and sharing the same plane with the two diametrically opposed, protruding, co-axial main shafts radially fitted on its outer perimeter through which slot the second pivotable shaft is freely fitted such that it can oscillate within such slot through an arc aligned with and co-planar to the said main shafts, and an inner hollow cylindrical ring having a centrally positioned orifice on its cylindrical shell through which the second pivotable shaft is rotatably mounted such that said orifice is rotatably aligned with the slot cut-out of the outer ring; the inner and outer rings being coaxially and rotatably fitted to each other such that the inner ring freely and centrally rotates with respect to the outer ring.

40. The transmission system of claims 35 or 36 wherein the clutch assemblies are mounted between their corresponding conversion assemblies and the main frame.

41. The transmission system of claims 33, 34, 35 or 36 wherein the central cross assembly is a rigid cross assembly comprising a yoke rigidly mounted to the first end of the second pivotable shaft and having its opposed orifices rotatably mounted to the ends of a pair of diametrically opposed coaxial stub shafts rigidly and vertically fixed to the mid point of the first main shaft.

42. The transmission system of claims 33, 34, 35 or 36 wherein the central cross assembly is a rigid cross assembly comprising a flattened first end of the second pivotable shaft which is pivotably mounted to the first main shaft through a horizontal slot centrally located in the mid section of the first main shaft, and wherein the two shafts are held in place through a centrally located pin shaft that passes through two opposed vertical orifices centrally located on either side of the first main shaft's horizontal slot and an intervening vertical orifice centrally located on the flattened first end of the second pivotable shaft.

43. The transmission system of claims 33, 34, 35 or 36 wherein the central cross assembly is a pivotable cross assembly comprising a short pivotable central shaft having a flattened central section which is rotatably fitted through a vertical slot centrally located in the mid section of the first main shaft by way of a pin shaft that passes through two opposed horizontal orifices centrally located on either side of the first main shaft's vertical slot and an intervening horizontal orifice centrally located on the flattened section of the short central shaft; and a hollow cylindrical section rigidly mounted to the first end of the second pivotable shaft such that the second pivotable shaft extends radially and vertically outward from a point of the cylindrical section's outer perimeter lying at the mid point of the cylindrical section's length, the cylindrical section being rotatably mounted to the ends of the short pivotable central shaft by two diametrically opposed orifices lying on the cylindrical section's outer perimeter and whose theoretical central axis intersects the cylindrical section's longitudinal axis vertically and is co-planar with the second pivotable shaft's axis.

44. The transmission system of claims 33, 34, 35 or 36 wherein the central cross assembly is a pivotable cross assembly comprising two parallel circular plates having central horizontal orifices perimetrically connected to each other by two vertically intervening parallel and diametrically opposed plates each fitted with a radially and outwardly protruding co-axial stub shaft, said cross assembly being rotatably fitted over the mid point of the first main shaft which is flange shaped and has a central horizontal orifice, wherein the central pivotable cross assembly and first main shaft are held in place by a pin shaft fitted through the orifices of the two parallel circular plates and the intervening central orifice of the first main shaft; and a hollow cylindrical section rigidly mounted to the first end of the second pivotable shaft such that the second pivotable shaft extends radially and vertically outward from a point of the cylindrical section's outer perimeter lying at the mid point of the cylindrical section's length, the cylindrical section being rotatably mounted to the ends of the central pivotable cross assembly by way of two diametrically opposed orifices lying on the cylindrical section's outer perimeter and whose theoretical central axis intersects the cylindrical section's longitudinal axis vertically and is co-planar with the second pivotable shaft's axis.

45. The transmission system of claims 33, 34, 35 or 36 wherein the displacement means comprises a threaded shaft which is vertical to the grooved member's axis of rotation and runs through the entire diameter of the rotating grooved member within a second straight squared cross-section groove lying directly behind and radially aligned with the first arc shaped groove, said threaded shaft being rotatable in either direction, said rotation forcing a carriage threadably mounted to the threaded shaft and having an outer body slidably mounted in the second squared cross-section groove to slide up or down the squared cross-section groove; wherein the rotatable sliding shoe mounted to the second free end of the second pivotable shaft is connected to the threadably mounted carriage through at least one pivotable bracket arm and the rotation of the threaded shaft causes the threadably mounted carriage to shift thereby forcing the second pivotable shaft to be gradually displaced out of alignment with respect to the grooved member's central shaft.

46. The transmission system of claim 45 further comprising a counterweight carriage and wherein a first section of the threaded shaft is threaded in one direction and a second section is threaded in the other direction and the threadably mounted carriage occupies said first section and said counter-weight carriage occupies the second section, and the threadably mounted carriage and the threadably mounted counter-weight carriage move apart as the threaded shaft is rotated in one direction and move together as the threaded shaft is rotated in the opposite direction, thereby balancing any vibrations.

47. The transmission system of claim 46 wherein the first and second sections of the threaded shaft each occupy one half of the length of the threaded shaft.

48. The transmission system of claim 47 wherein the thread pitch of the first section is different than the thread pitch of the second section.

49. The transmission system of claim 33 wherein the output gear comprises a double faced gear having a first toothed surface on a first face of the gear and a second toothed surface on a second face of the gear and further comprising a second drive assembly co-axially and co-rotatably mounted with said first drive assembly for engaging the second toothed surface of the output gear, said clutch assemblies of said second drive assembly being ninety degrees out of phase with said clutch assemblies of said first drive assembly.

50. The transmission system of claim 34 wherein the output gear comprises a double faced gear having a first toothed surface on a first face of the gear and second toothed surface on a second face of the gear and further comprising a second drive assembly co-axially and co-rotatably mounted with said first drive assembly for engaging the second toothed surface of the output gear, said clutch assemblies of said second drive assembly being forty-five degrees out of phase with said clutch assemblies of said first drive assembly.

51. The transmission system of claim 35 wherein the output gear comprises a double faced gear having a first toothed surface on a first face of the gear and a second toothed surface on a second face of the gear and further comprising a second drive assembly co-axially and co-rotatably mounted with said first drive assembly for engaging the second toothed surface of the output gear, said clutch assemblies of said second drive assembly being thirty degrees out of phase with said clutch assemblies of said first drive assembly.

52. The transmission system of claim 33 wherein the rotating grooved member comprises a double faced grooved member and further comprising a second drive assembly co-axially and co-rotatably mounted with said first drive assembly, the main output gear of said first drive assembly and the main output gear of said second drive assembly being co-rotatable, wherein a first face of the double faced grooved member cooperates with said first drive assembly and a second face of the double faced grooved member cooperates with said second drive assembly, said clutch assemblies of said second drive assembly being ninety degrees out of phase with said clutch assemblies of said first drive assembly.

53. The transmission system of claim 34 wherein the rotating grooved member comprises a double faced grooved member and further comprising a second drive assembly co-axially and co-rotatably mounted with said first drive assembly, the main output gear of said first drive assembly and the main output gear of said second drive assembly being co-rotatable, wherein a first face of the double faced grooved member cooperates with said first drive assembly and a second face of the double faced grooved member cooperates with said second drive assembly, said clutch assemblies of said second drive assembly being forty-five degrees out of phase with said clutch assemblies of said first drive assembly.

54. The transmission system of claim 35 wherein the rotating grooved member comprises a double faced grooved member and further comprising a second drive assembly co-axially and co-rotatably mounted with said first drive assembly, the main output gear of said first drive assembly and the main output gear of said second drive assembly being co-rotatable, wherein a first face of the double faced grooved member cooperates with said first drive assembly and a second face of the double faced grooved member cooperates with said second drive assembly, said clutch assemblies of said second drive assembly being thirty degrees out of phase with said clutch assemblies of said first drive assembly.

55. The transmission system of any of claims 10, 11, 12, 13, 21, 22, 23, 27, 28, 29, 30, 31, 32, 33, 34, 35, 36, 49, 50, 51, 52, 53 or 54 wherein the grooved member comprises a grooved disc.

56. The transmission system of any of claims 11, 12, 13, 34, 35 or 36 wherein the co-axial main shafts of any of the oscillation conversion assemblies are not evenly or symmetrically fitted with respect to the first axis of the central cross assembly or with respect to the first main shaft.

57. The transmission system of any of claims 10, 11, 12, 13, wherein the pivotable second yoke is ninety degrees out of phase with respect to said first yoke.

58. The transmission system of any of claims 33, 34, 35 or 36 wherein the second pivotable shaft is mounted at the midsection of the first main shaft such that the second pivotable shaft can pivot ninety degrees out of phase with respect to the first shaft.

59. Apparatus for providing an infinitely and continuously variable transmission system comprising:

a main assembly having at least one pair of co-axial diametrically opposed one-way clutch assemblies carried by corresponding pairs of diametrically opposed assembly carrying shafts interconnected through a central hub assembly, the carrying shafts being mounted symmetrically and radially around a multi-directional center of the central hub assembly, the axes of said carrying shafts sharing the same plane with each other and with the central hub's multi-directional center, the one-way clutch assemblies being engaged in one rotational direction and disengaged in the opposite rotational direction of their carrying shafts and being uni-directionally meshed to a common rotatable output gear, and means for rotatably oscillating the carrying shafts at gradually variable oscillation arcs, thereby causing the respective clutch assemblies to smoothly rotate the common output gear at correspondingly variable rotation speeds.

* * * * *